United States Patent
Oh et al.

[11] Patent Number: 6,137,761
[45] Date of Patent: Oct. 24, 2000

[54] DISC LOADING AND UNLOADING APPARATUS OF AN OPTICAL DISC PLAYER

[75] Inventors: Teak Seung Oh, Seoul; Jeong Yeol Yang, Kunpo, both of Rep. of Korea

[73] Assignee: LG Electronics Inc., Seoul, Rep. of Korea

[21] Appl. No.: 08/948,073

[22] Filed: Oct. 9, 1997

[30] Foreign Application Priority Data

| Oct. 10, 1996 | [KR] | Rep. of Korea | 96-45060 |
| Oct. 10, 1996 | [KR] | Rep. of Korea | 96-45061 |
| Oct. 10, 1996 | [KR] | Rep. of Korea | 96-45062 |
| Oct. 10, 1996 | [KR] | Rep. of Korea | 96-45063 |
| Oct. 10, 1996 | [KR] | Rep. of Korea | 96-45064 |
| Oct. 10, 1996 | [KR] | Rep. of Korea | 96-45065 |
| Oct. 10, 1996 | [KR] | Rep. of Korea | 96-45066 |
| Oct. 10, 1996 | [KR] | Rep. of Korea | 96-45067 |
| Oct. 10, 1996 | [KR] | Rep. of Korea | 96-45068 |

[51] Int. Cl.$^7$ .................................................. G11B 17/04
[52] U.S. Cl. .......................................... 369/77.1; 369/75.2
[58] Field of Search .................................... 369/75.1–77.1

[56] References Cited

U.S. PATENT DOCUMENTS

| 4,470,136 | 9/1984 | Takahashi et al. | 369/77.1 |
| 4,627,042 | 12/1986 | Hara | 369/77.1 |
| 4,674,079 | 6/1987 | Agostini | 369/77.1 |
| 4,979,160 | 12/1990 | Araki | 369/75.2 |
| 5,038,337 | 8/1991 | Muramatsu et al. | 369/77.1 |
| 5,136,570 | 8/1992 | Takai et al. | |
| 5,173,894 | 12/1992 | Kido | 369/77.1 |
| 5,187,695 | 2/1993 | Schindler et al. | 369/37 |
| 5,255,255 | 10/1993 | Kaneda et al. | |
| 5,292,222 | 3/1994 | Malagrino, Jr. et al. | 414/786 |
| 5,543,022 | 8/1996 | Nguyen et al. | 204/298.15 |
| 5,544,148 | 8/1996 | Nakamichi | 369/192 |

FOREIGN PATENT DOCUMENTS

| 60-201566 | 10/1985 | Japan . |
| 6-168445 | 6/1994 | Japan . |
| 7-147046 | 6/1995 | Japan . |
| 9-293306 | 11/1997 | Japan . |

OTHER PUBLICATIONS

Gutman (Product Engineering) pp.71–75, "18 Ways To Control Backlash in Gearing" Oct. 26, 1959.

*Primary Examiner*—William Klimowicz
*Attorney, Agent, or Firm*—Finnegan, Henderson, Farabow, Garrett & Dunner, L.L.P.

[57] ABSTRACT

A disc loading and unloading apparatus of a optical player comprises a base plate, a divided loading plate moving along the base plate, a driving device for moving the loading plate to the conveying object, an ejecting device operatively connected with the driving device for unloading the disc, a disc holding device fixed to the base plate for holding both sides of the disc, a clamping device for clamping the disc, and an intercepting device for intercepting the multi-insertion of the disc, and a pick-up base.

7 Claims, 80 Drawing Sheets

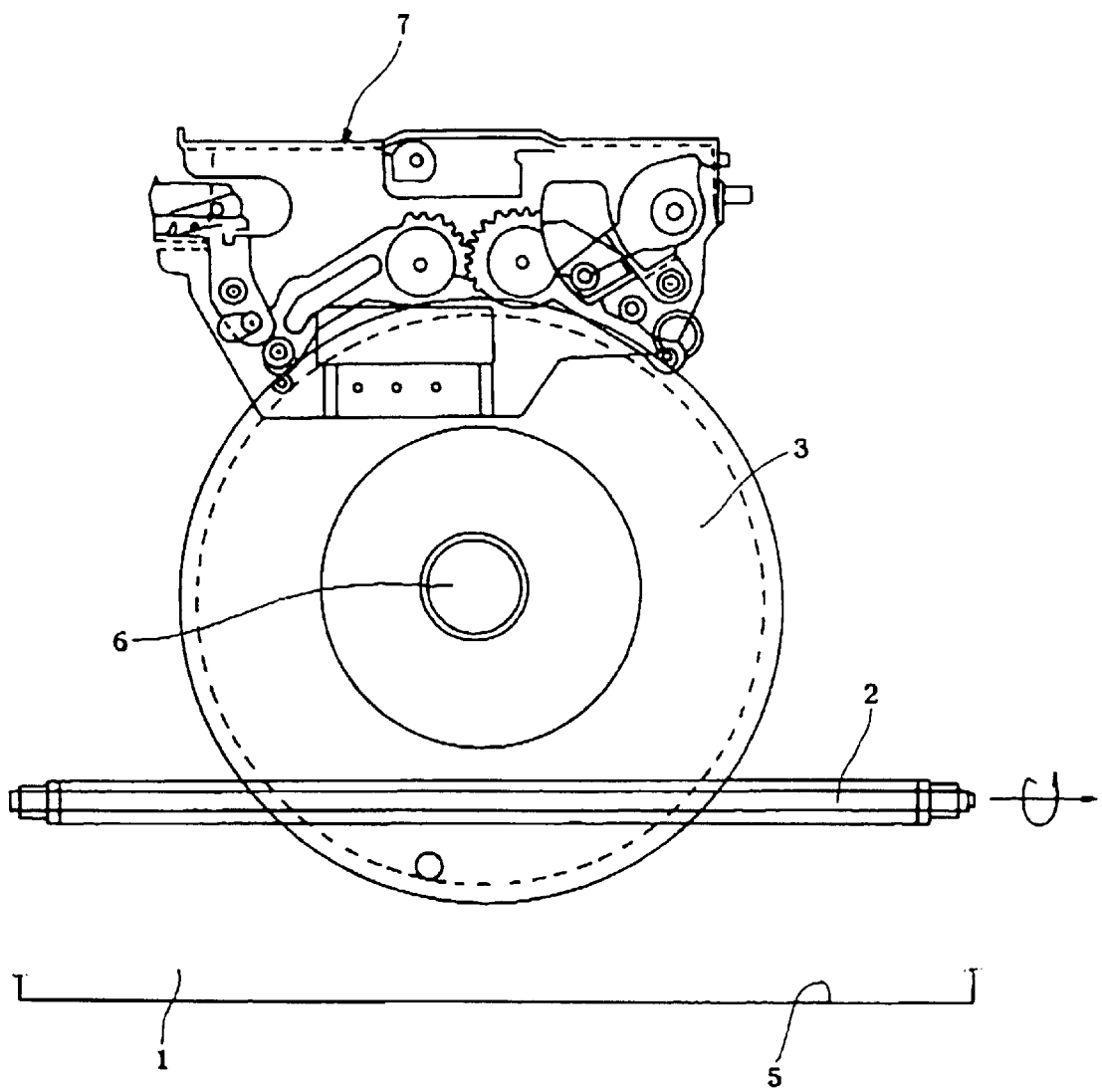
FIG · 2
PRIOR ART

FIG · 4
PRIOR ART
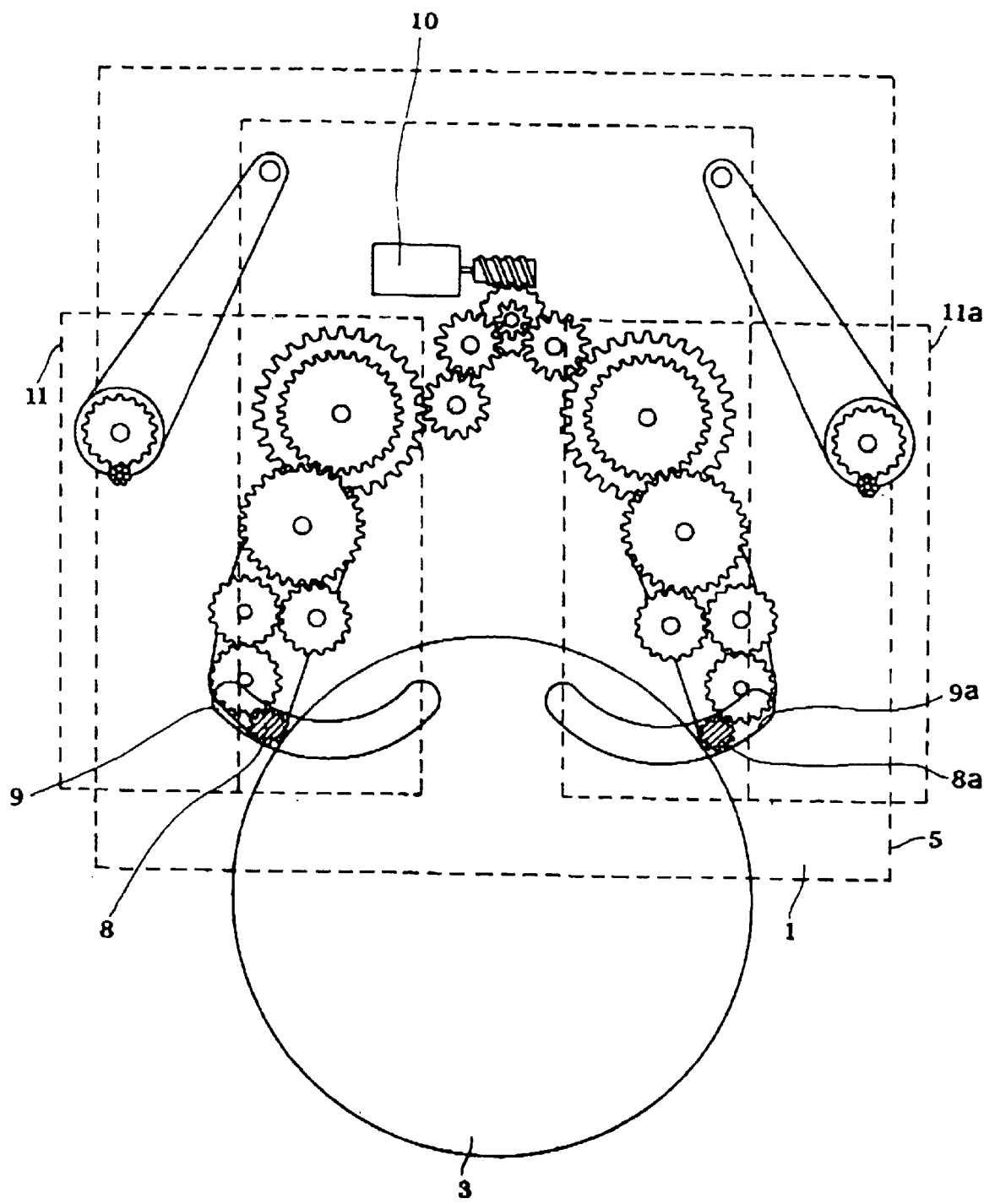

FIG · 6
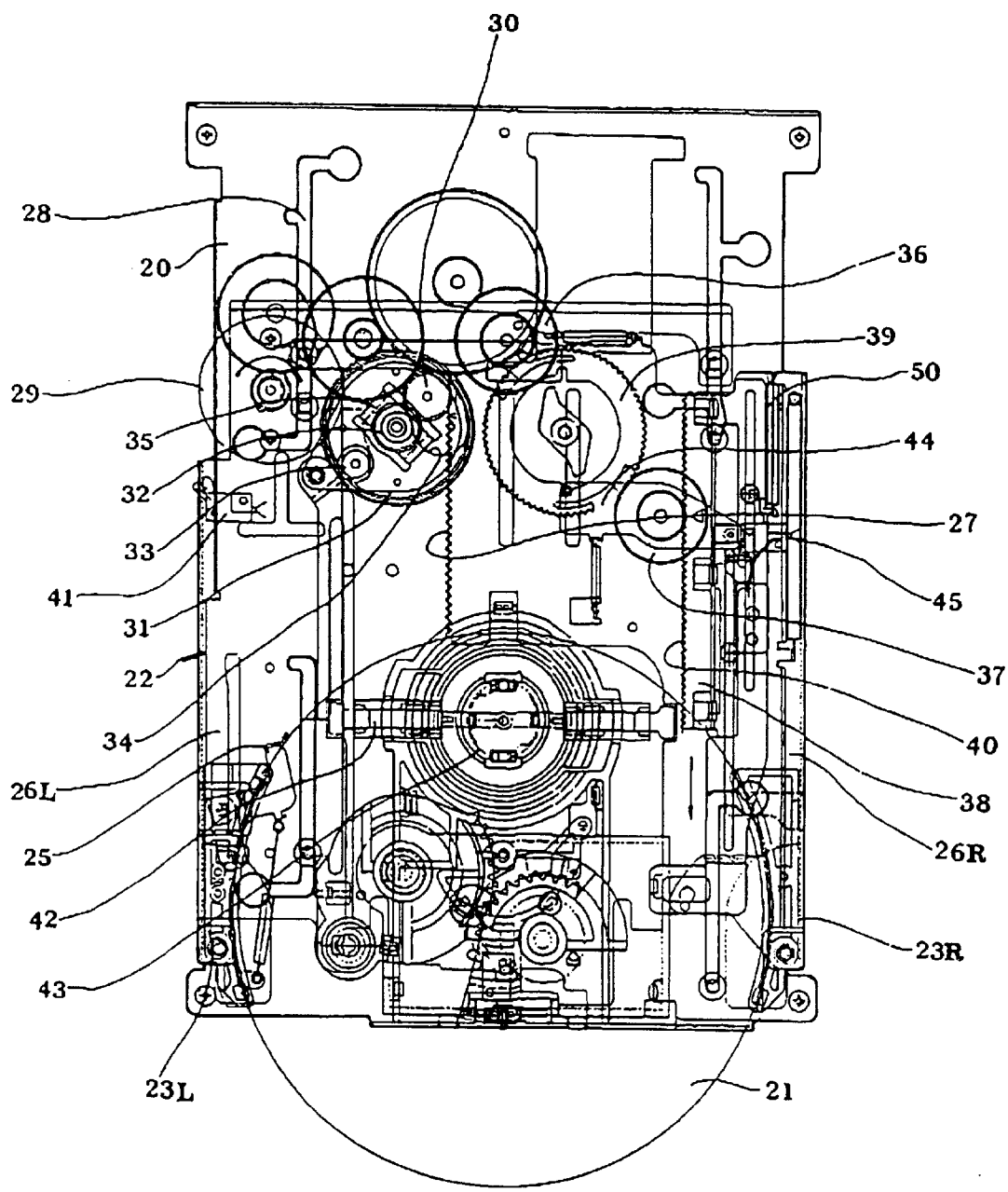

FIG·7
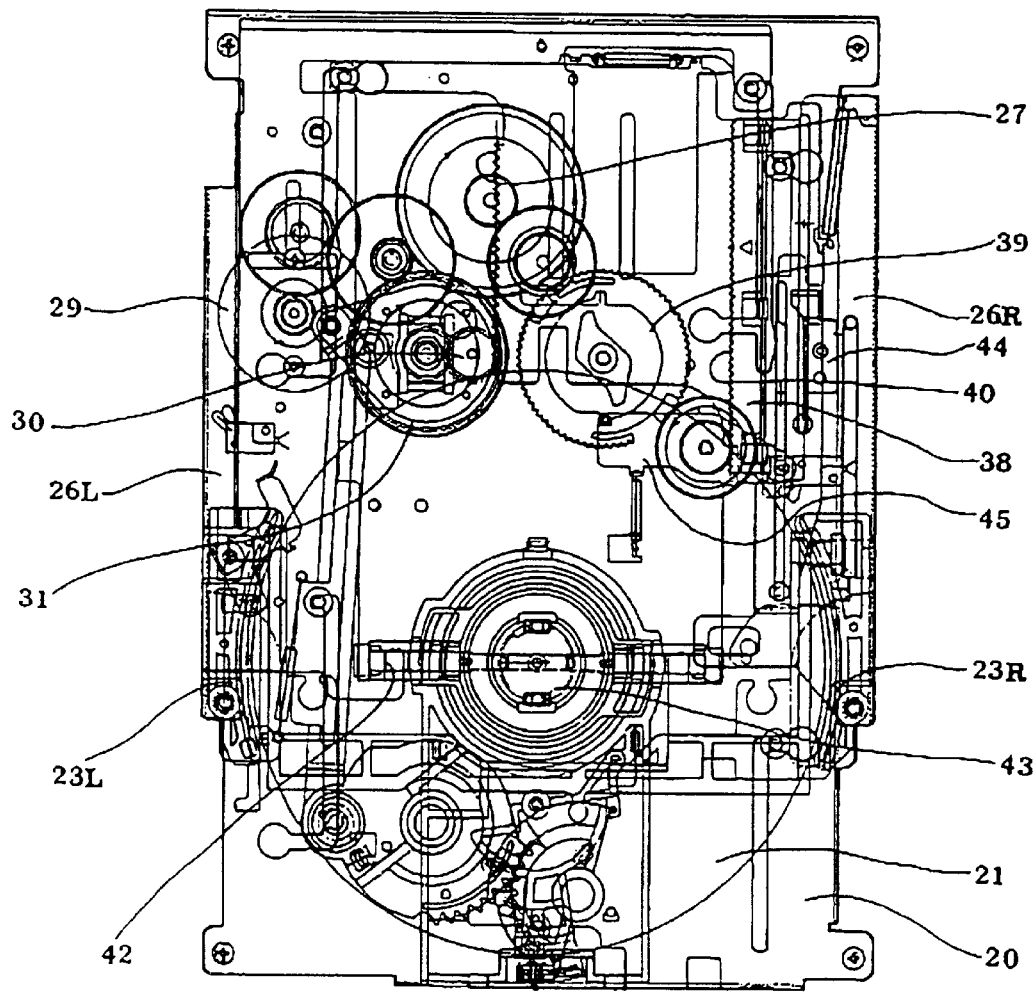

FIG · 8
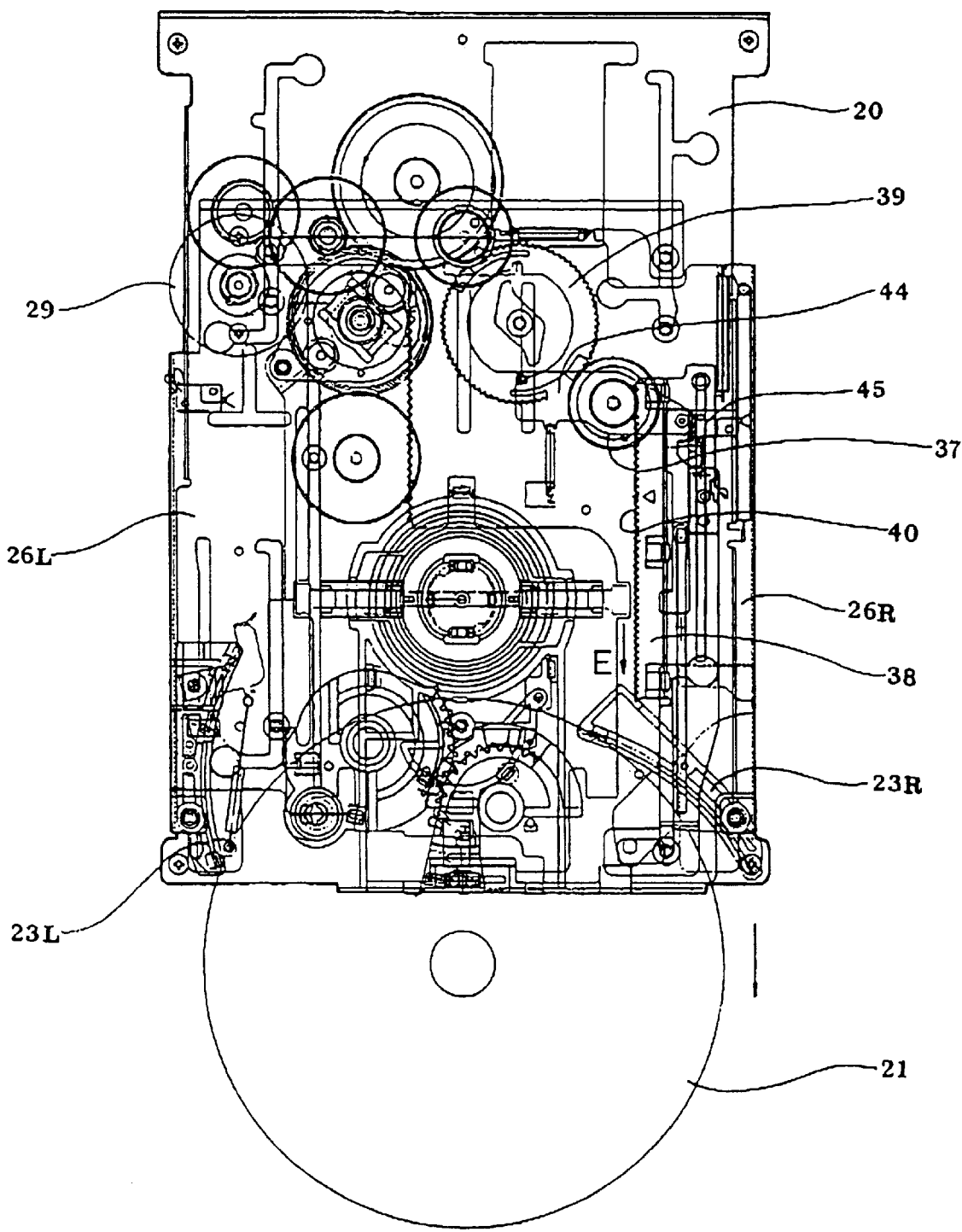

FIG · 11

FIG · 16
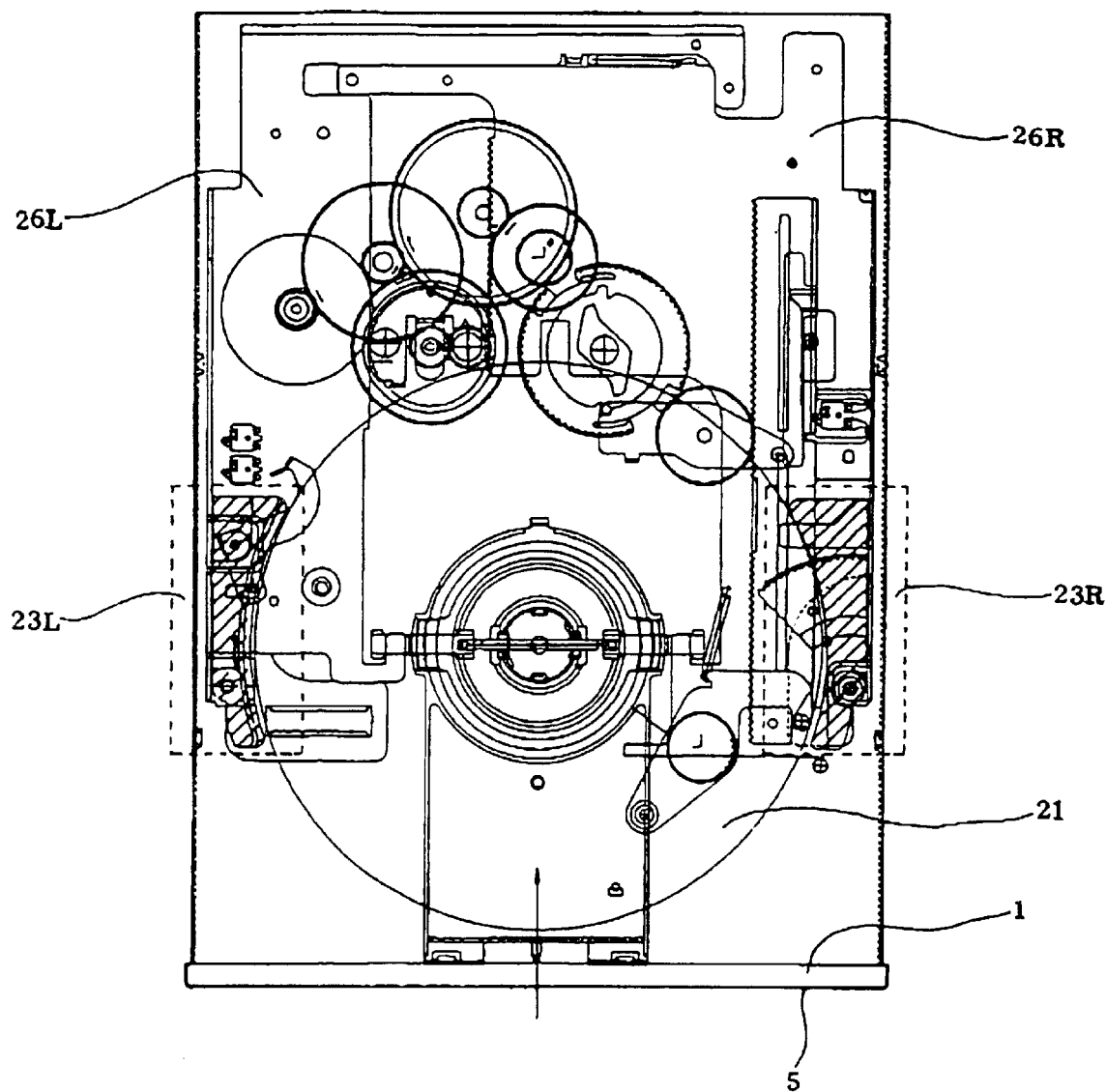

FIG · 17A
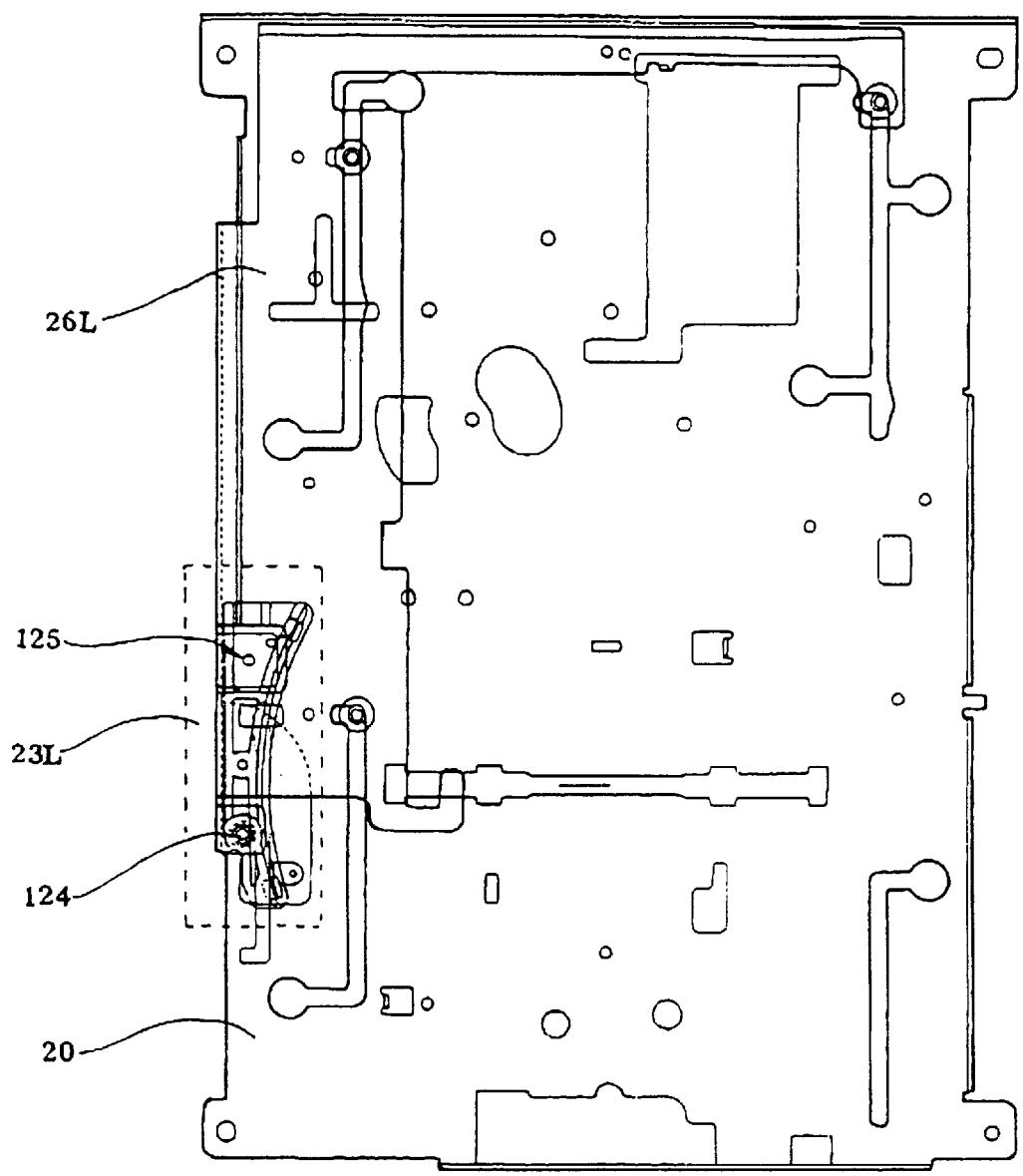

FIG · 18A
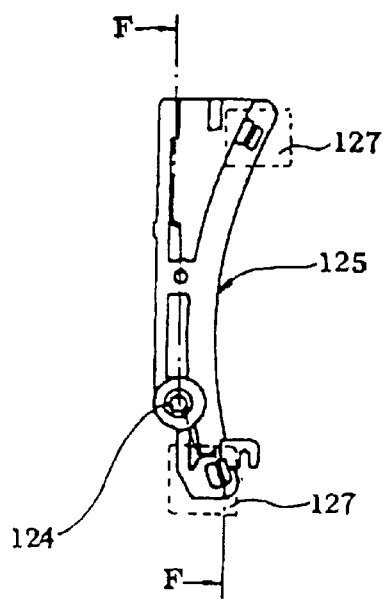
FIG · 18B
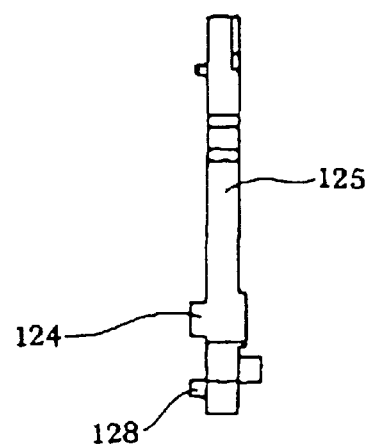
FIG · 18C
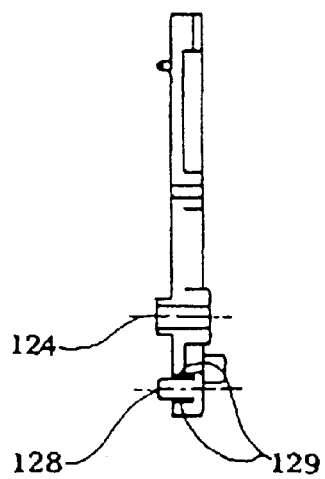
FIG · 18D
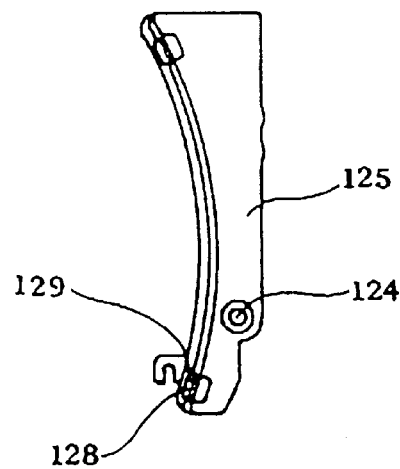

FIG · 20
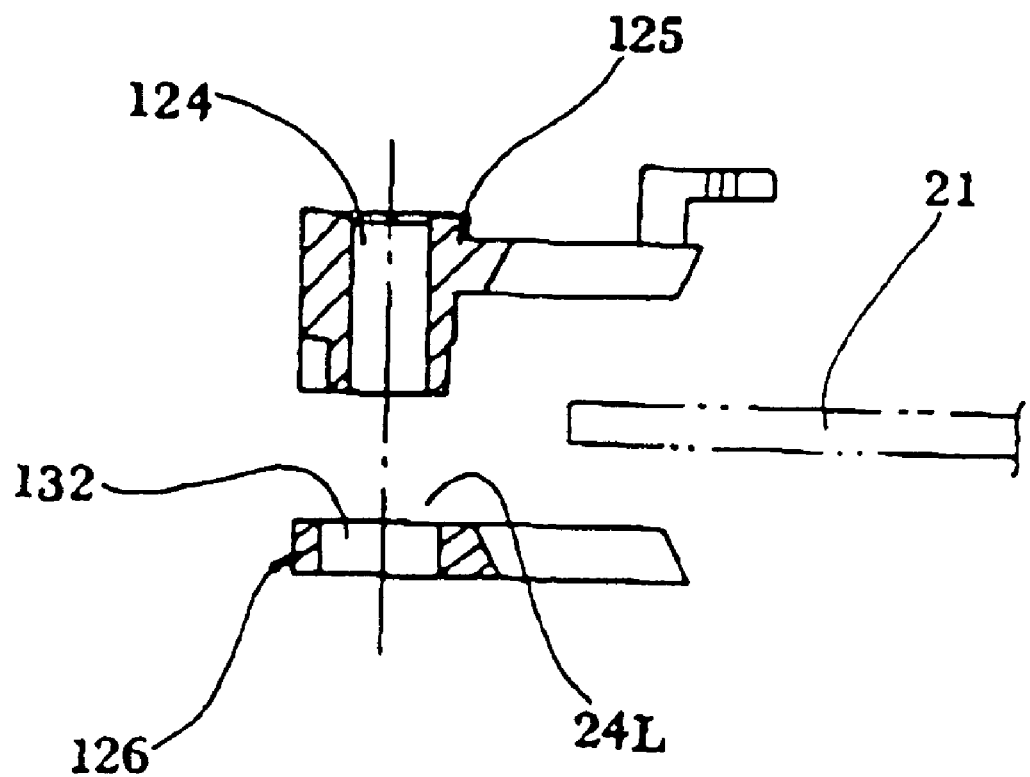

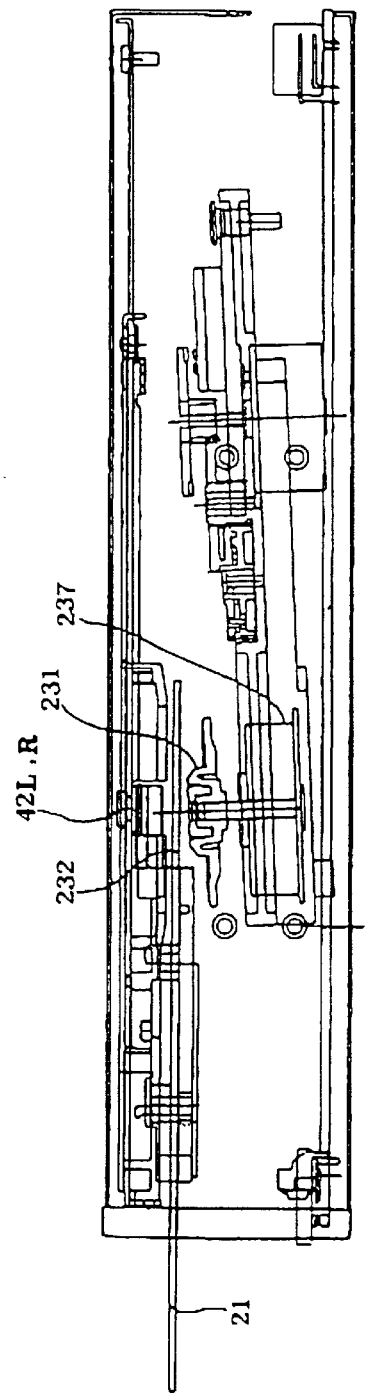
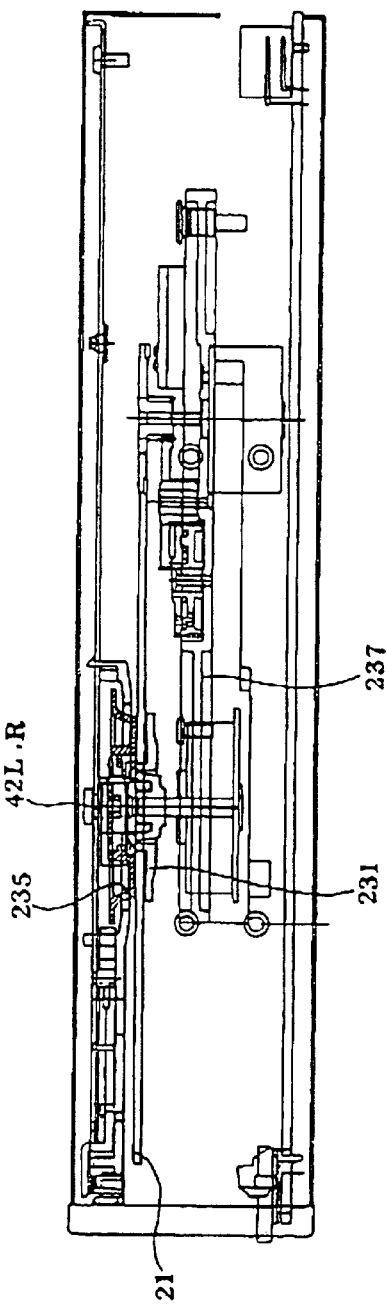

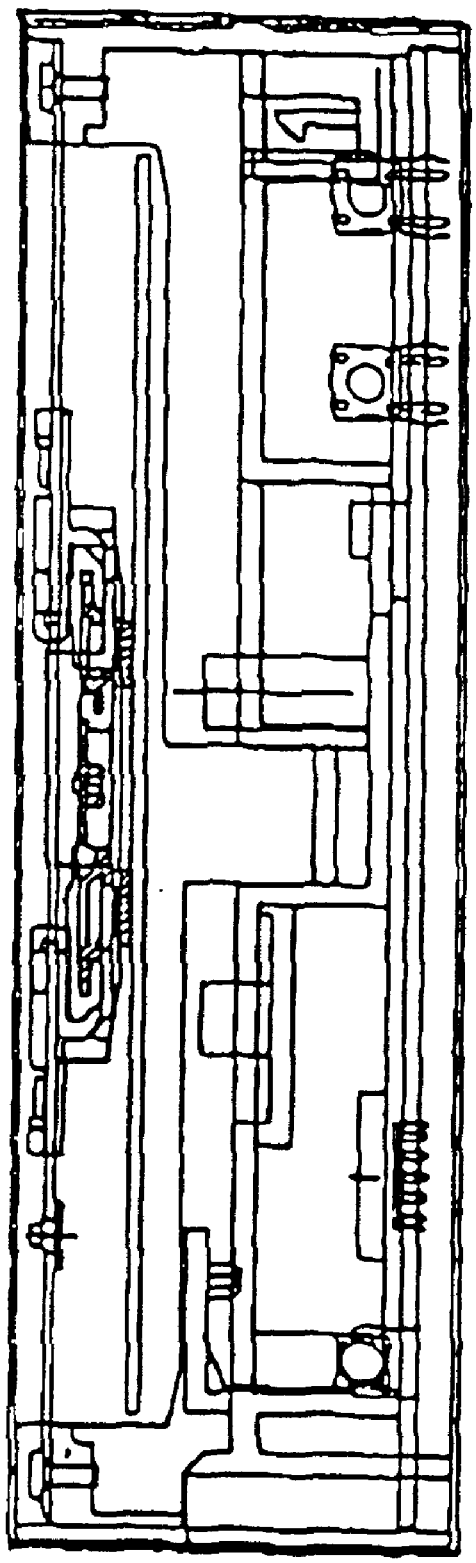
FIG · 26B

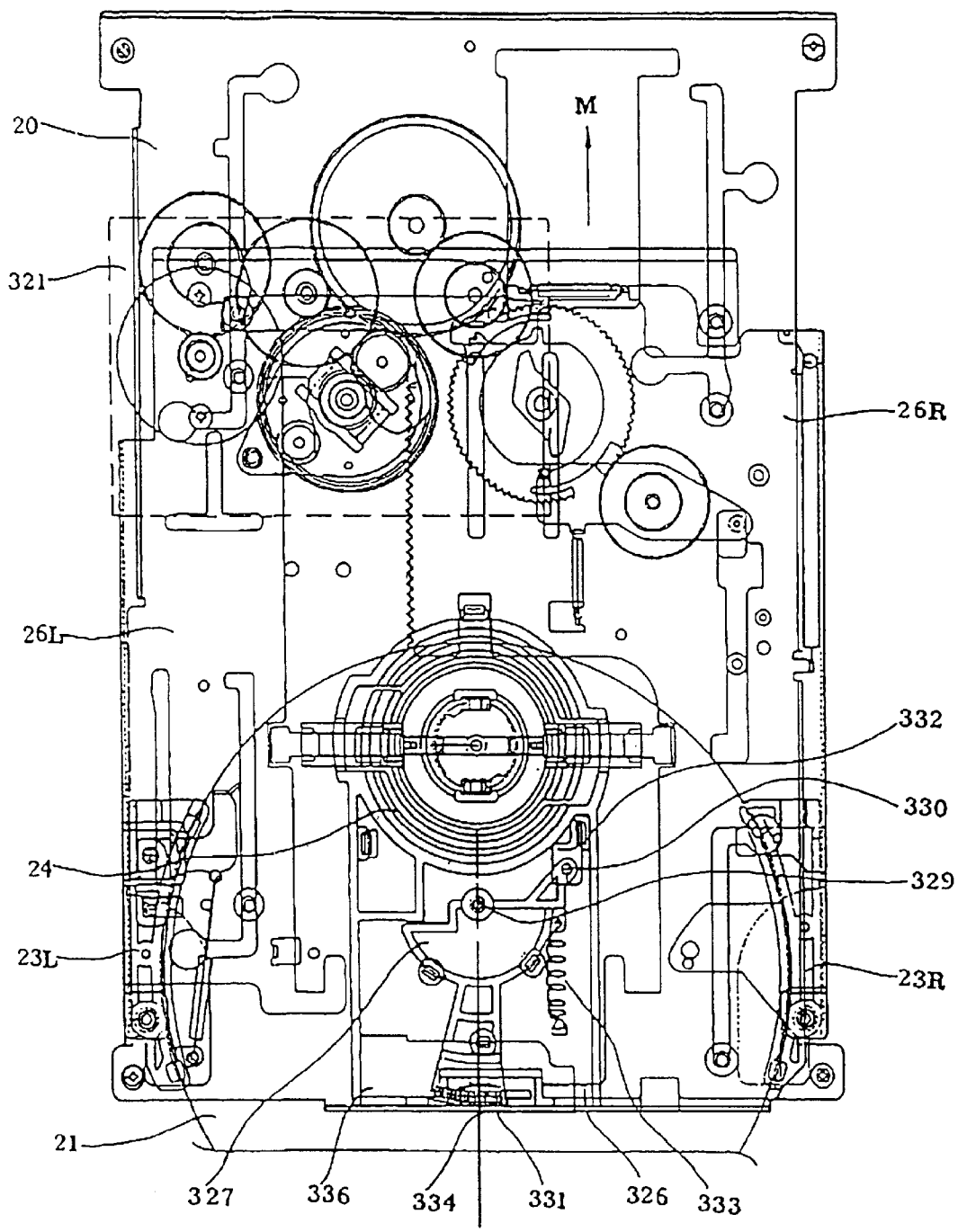
FIG·29A

FIG·33
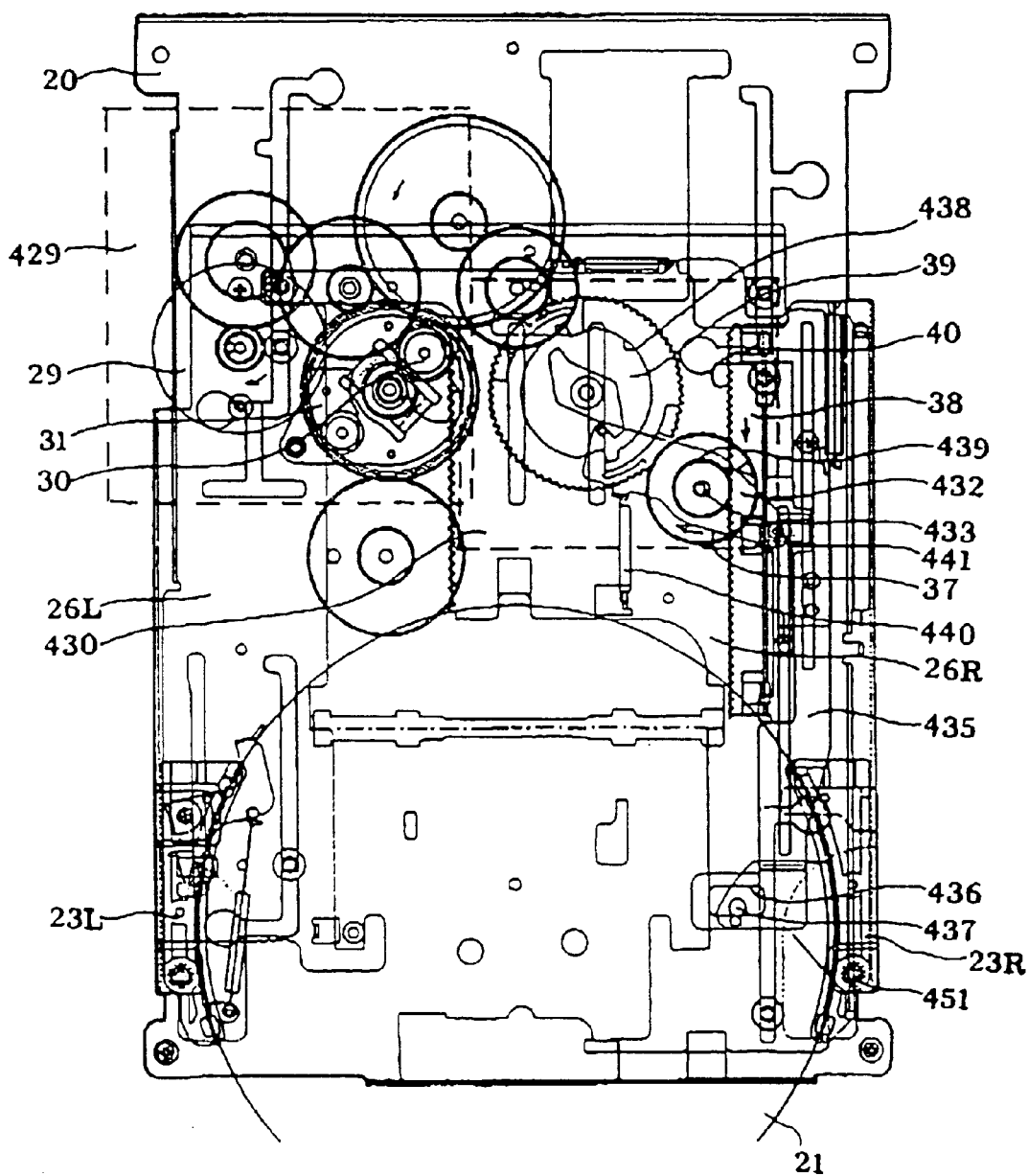

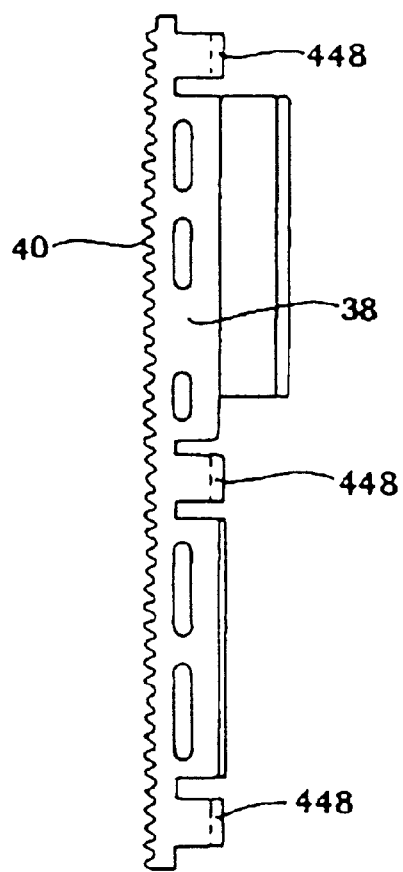
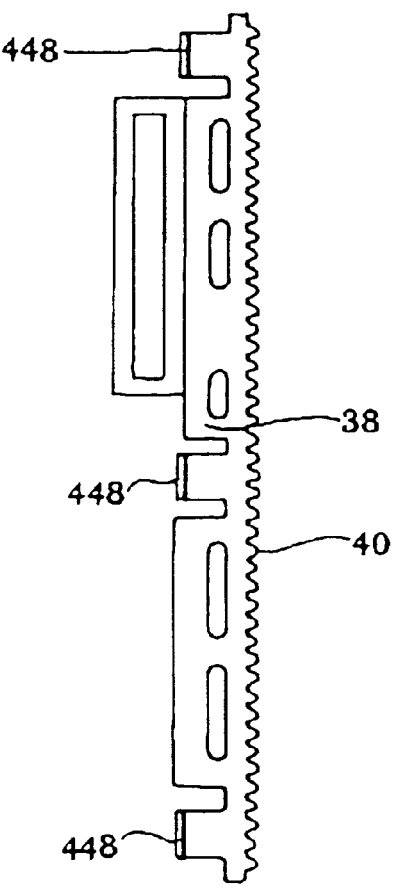
FIG · 34A  FIG · 34B

FIG · 35
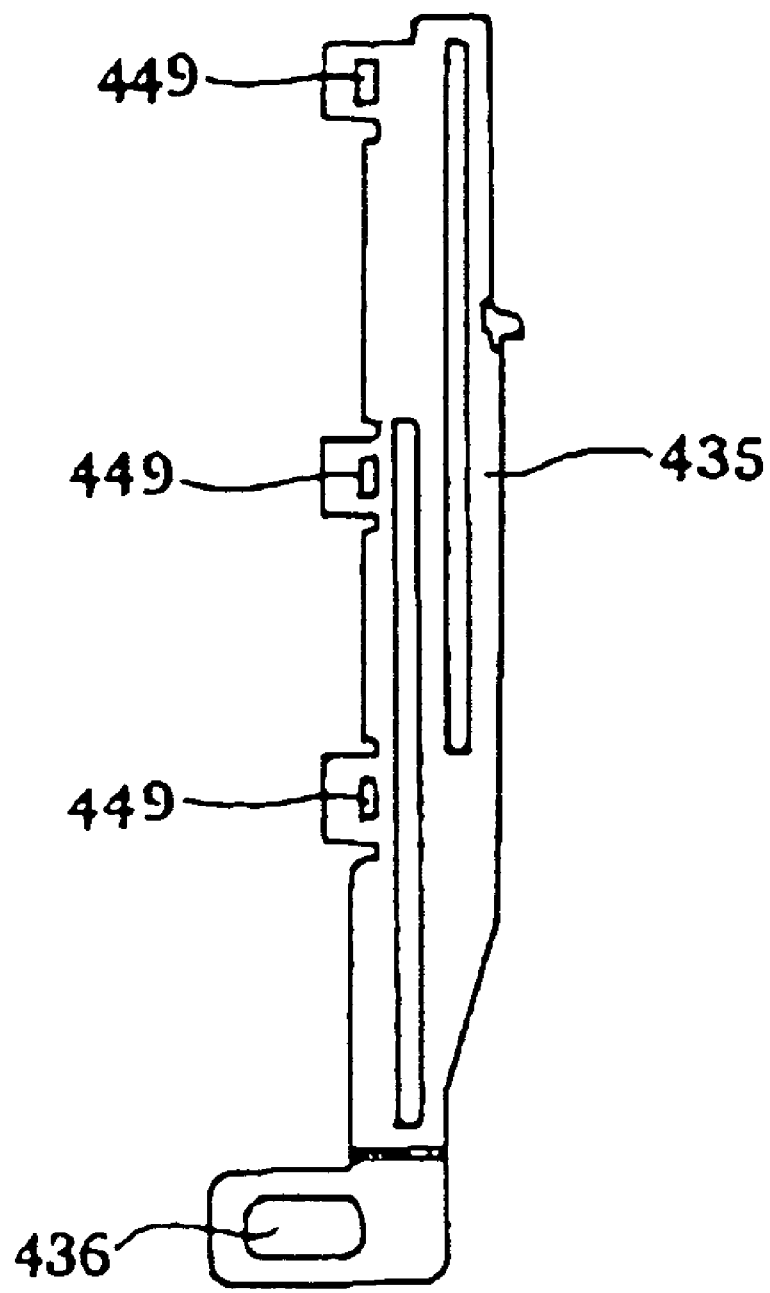

FIG · 36
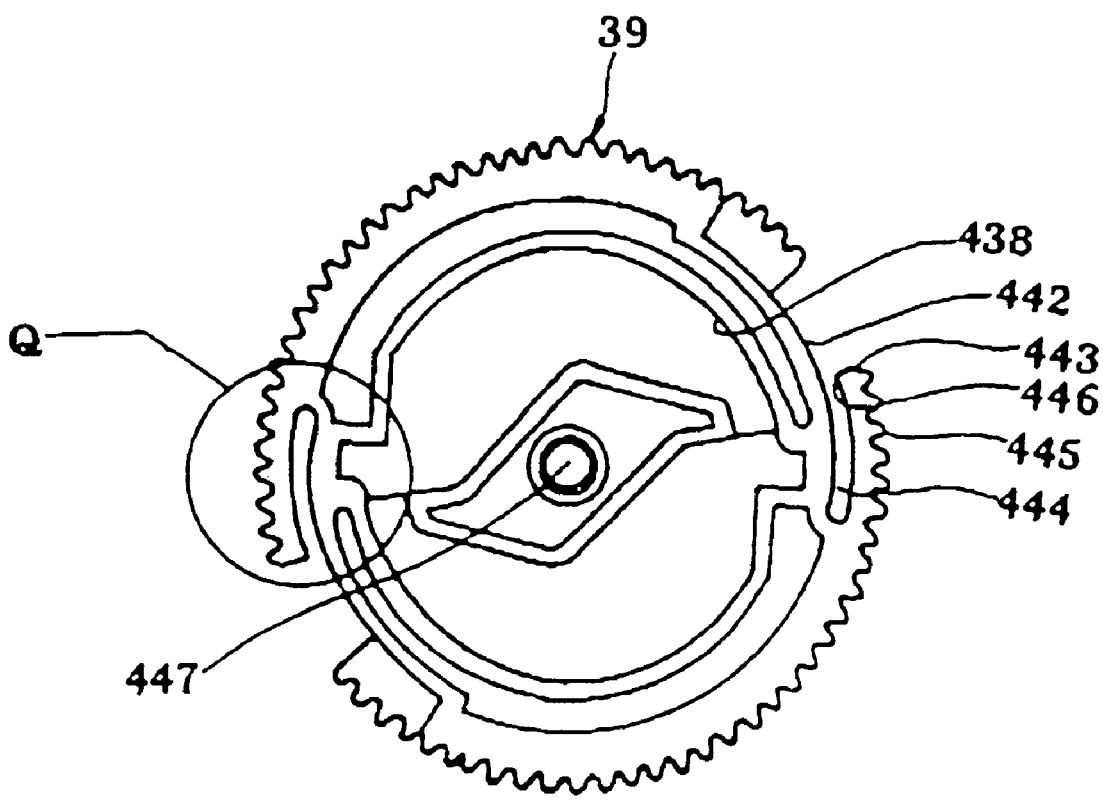

FIG·46
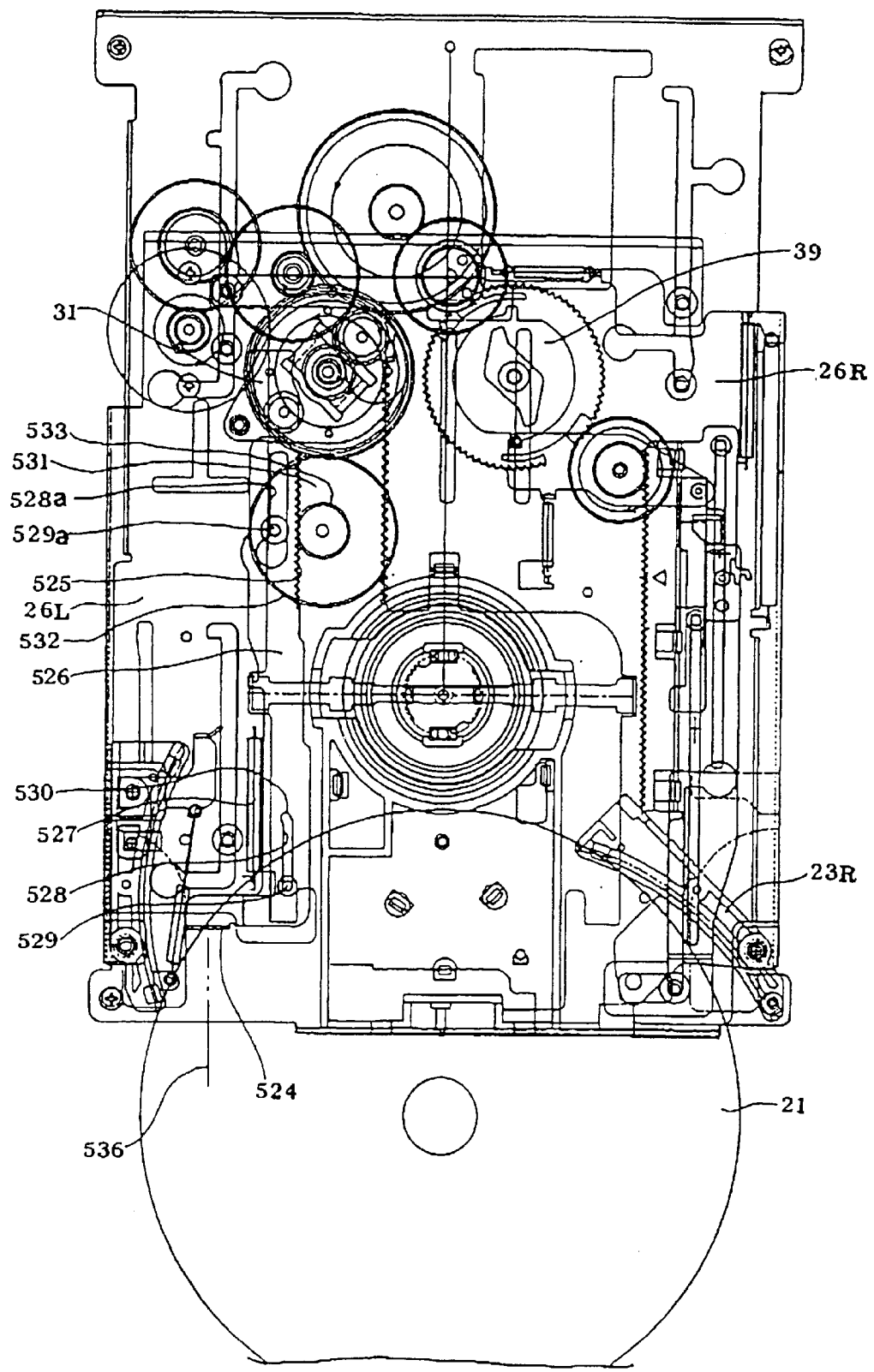

FIG · 47
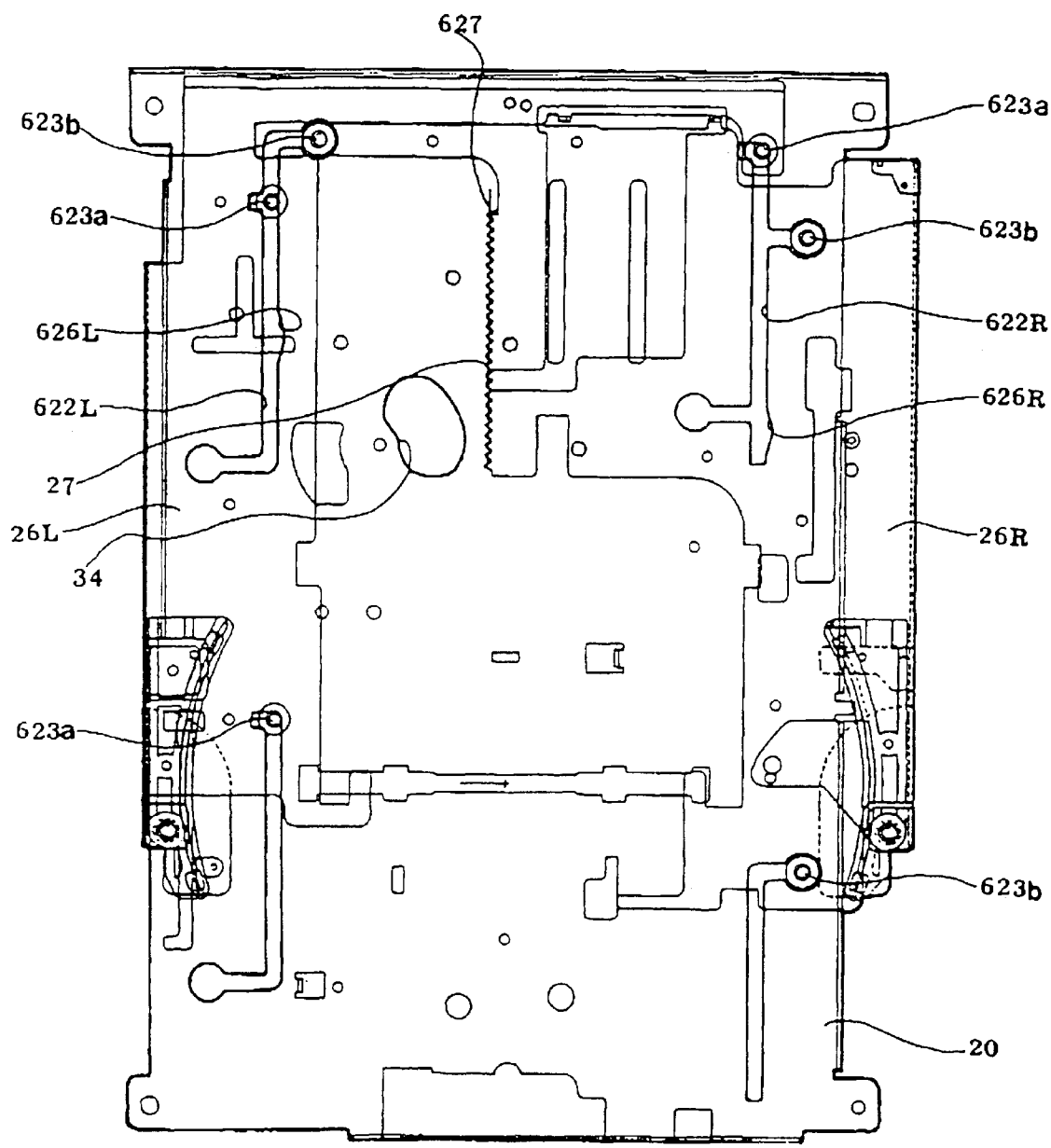

FIG · 48
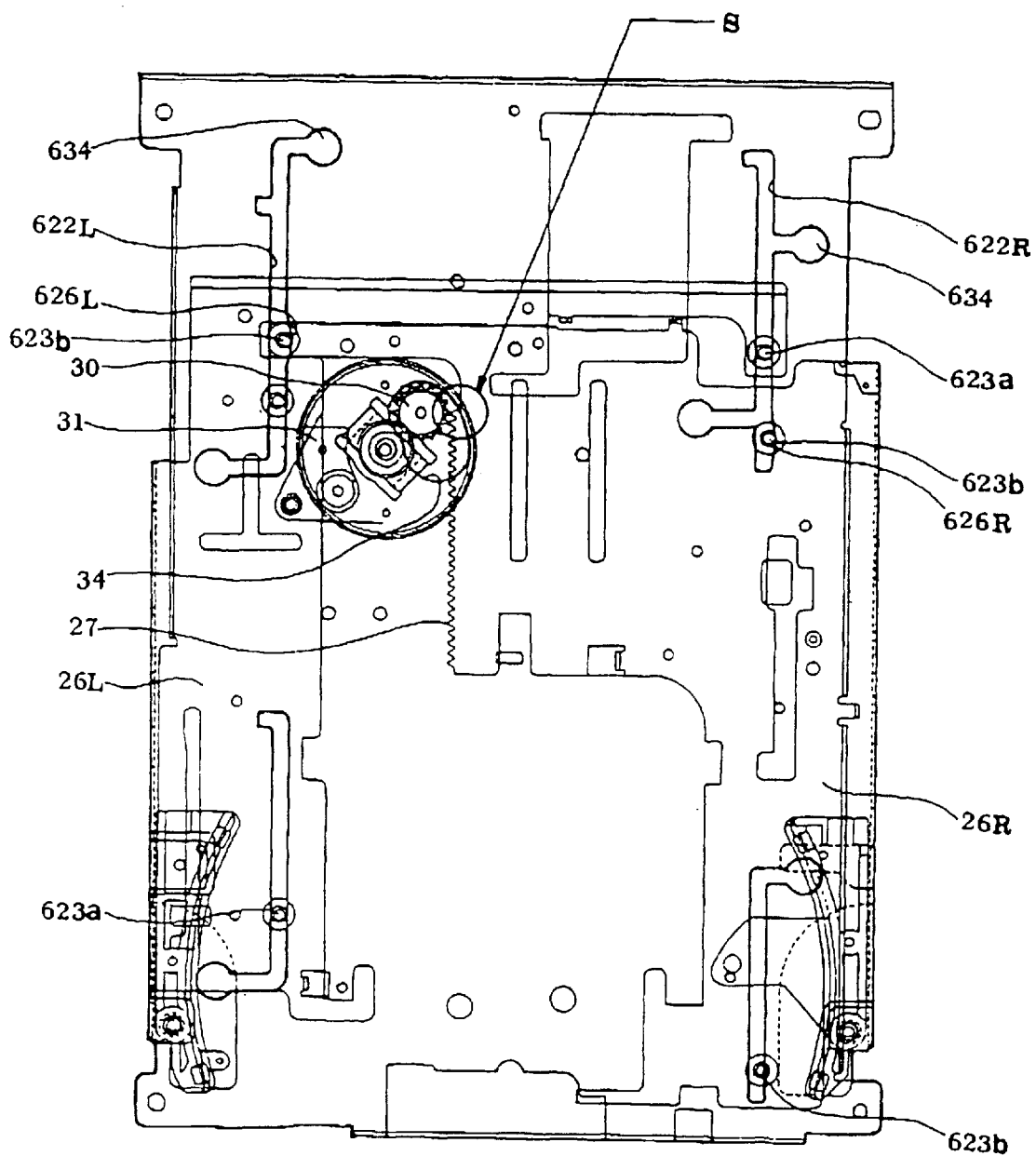

FIG·49
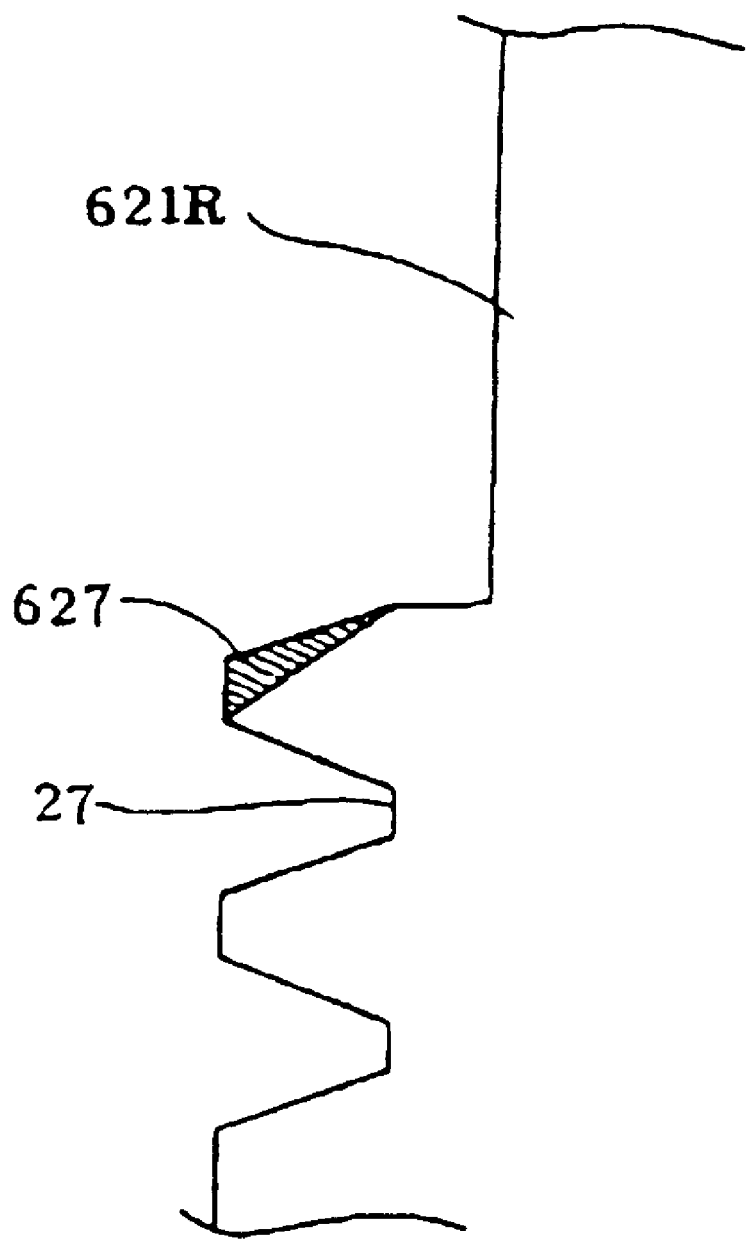

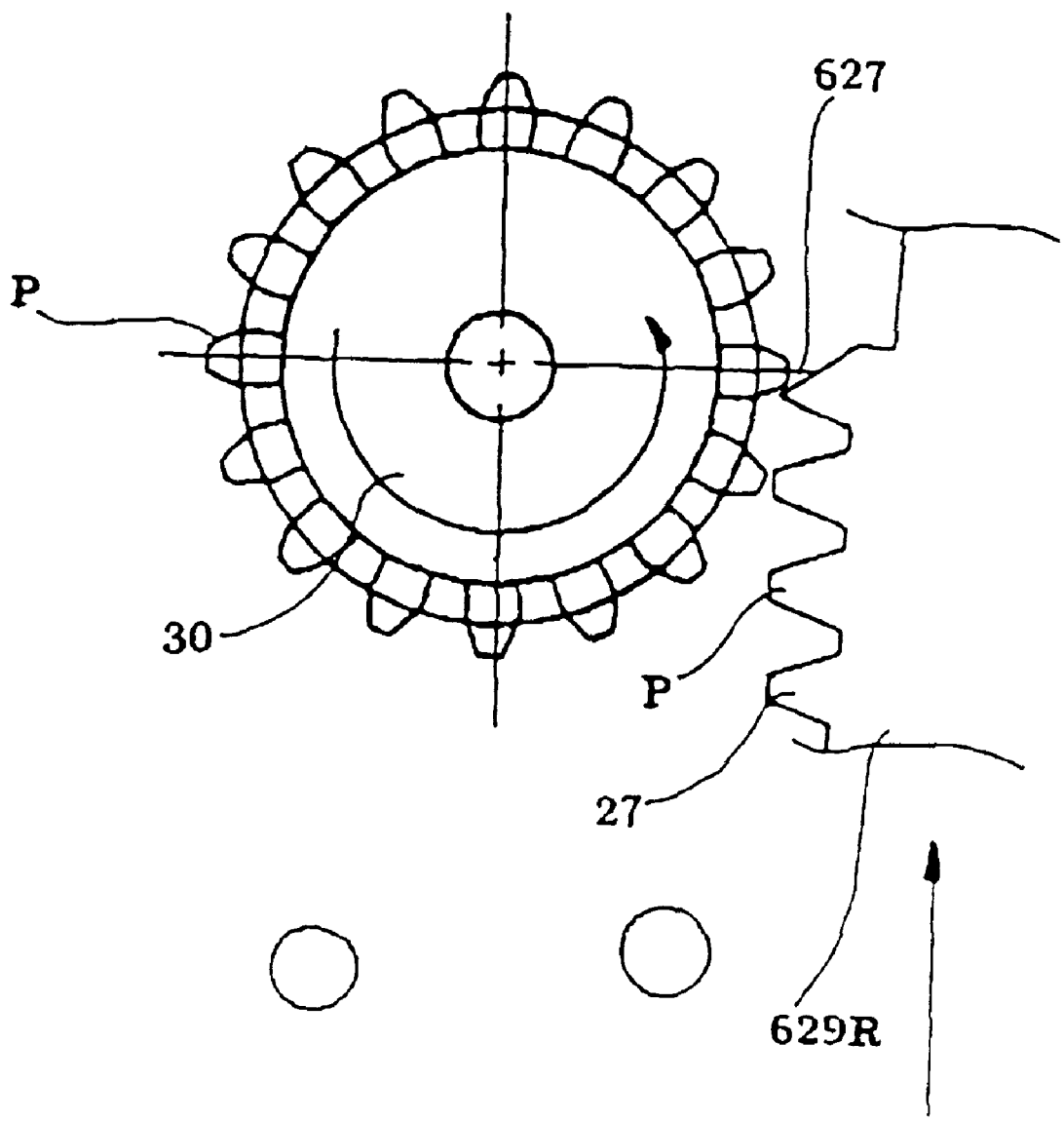
FIG·50

FIG · 51B
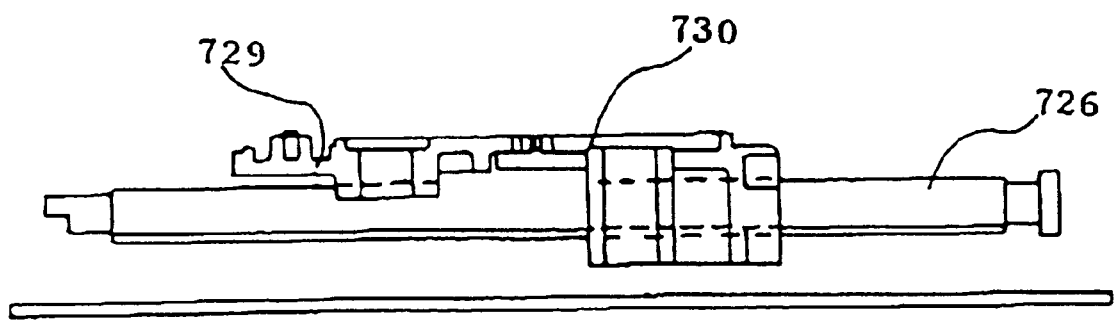

FIG·53A
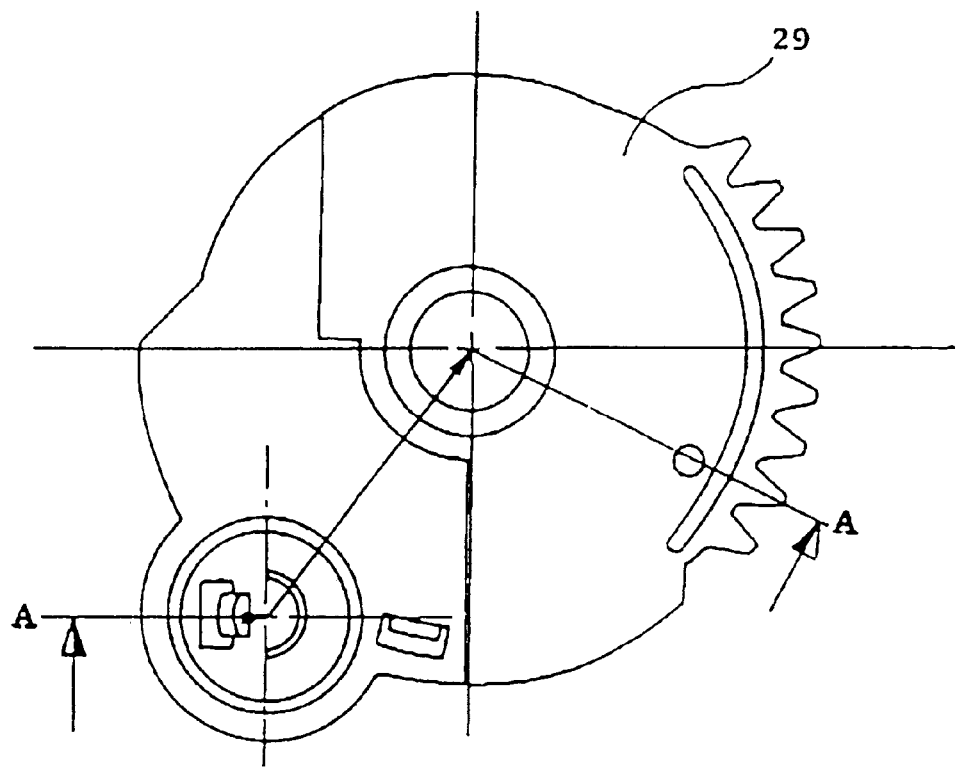
FIG·53B
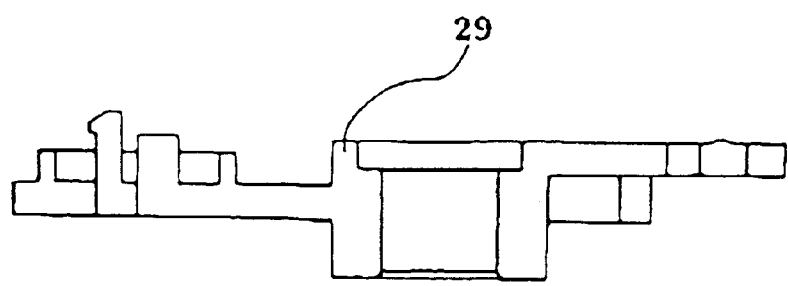

FIG · 54A
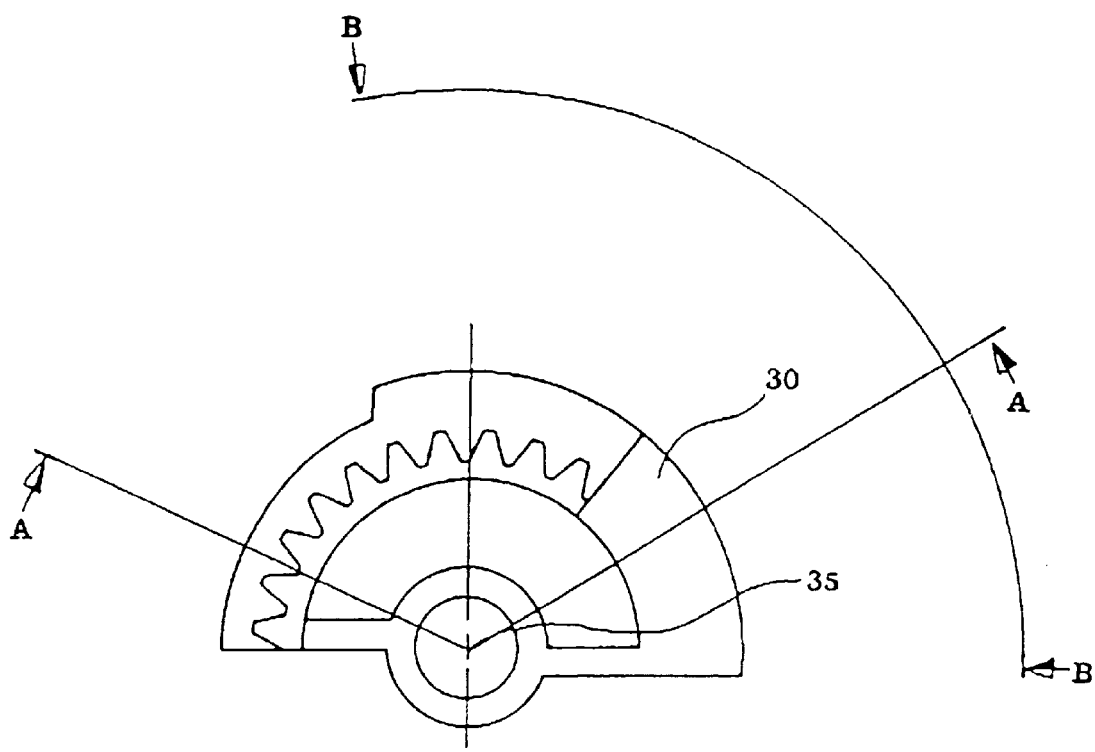

FIG · 54B
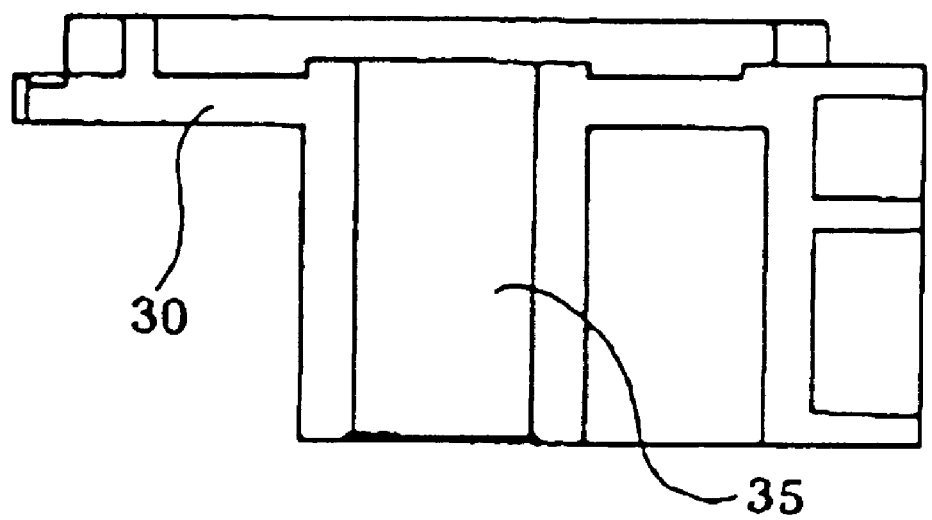

FIG · 55A
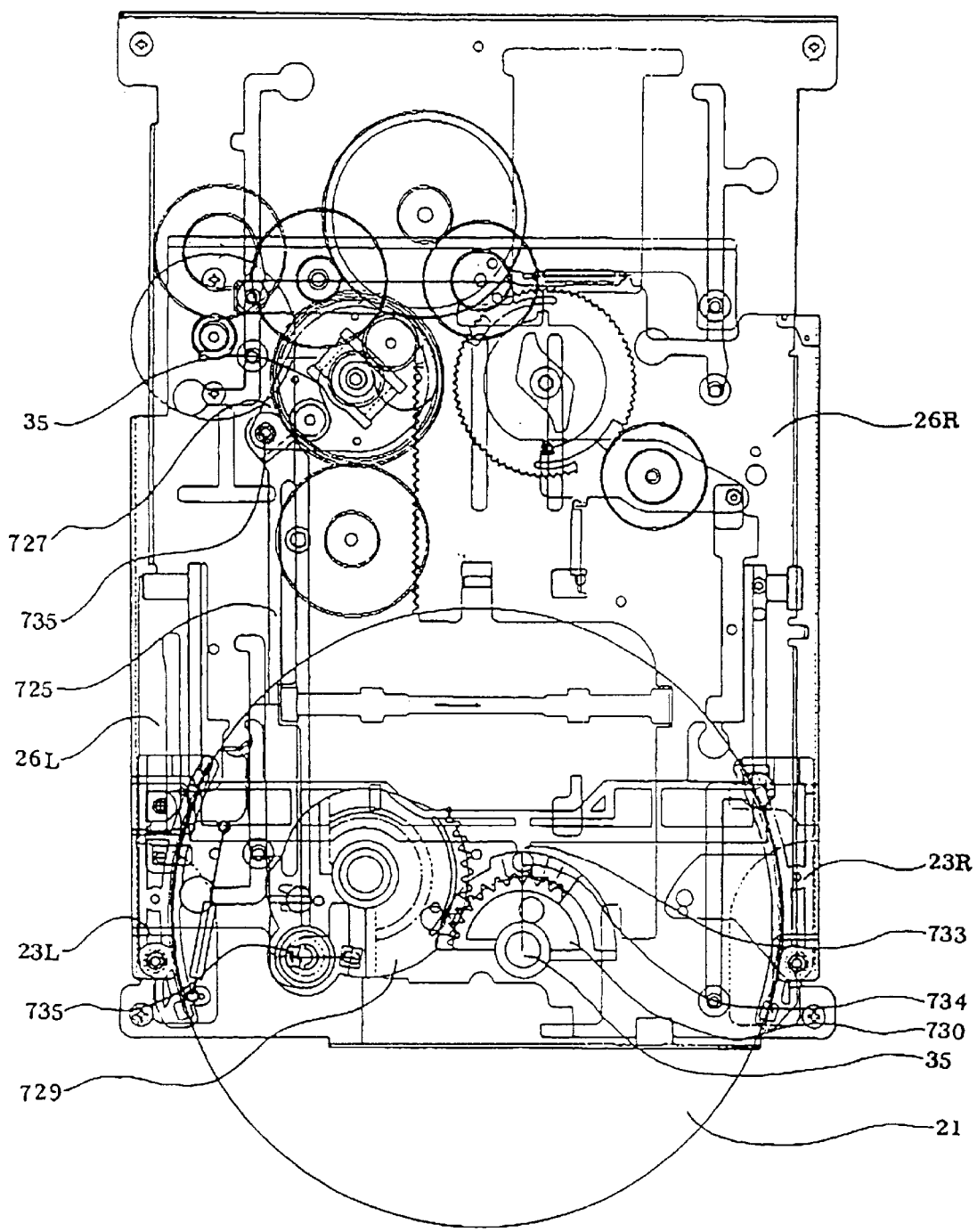

FIG · 56B
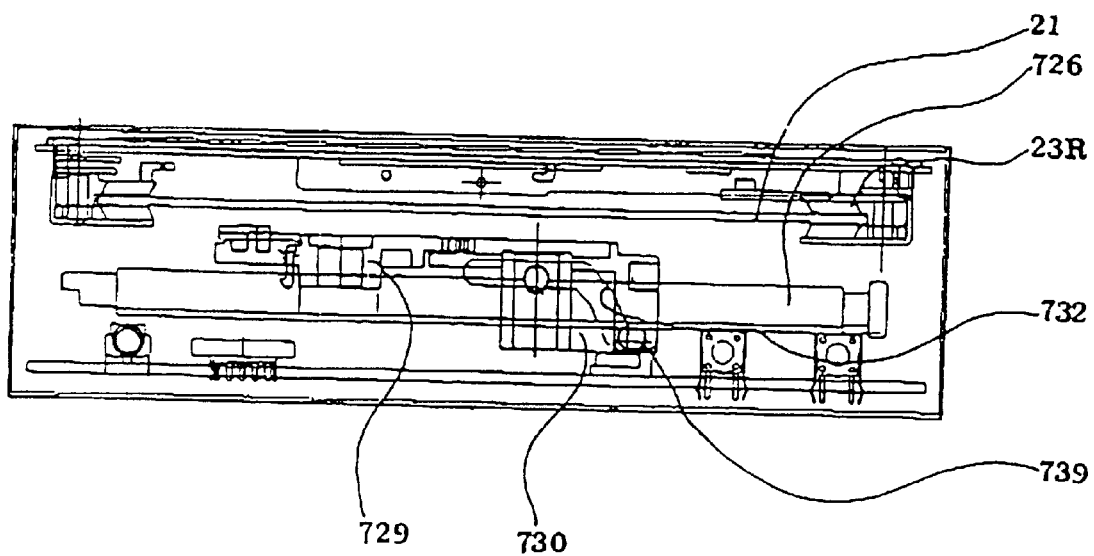

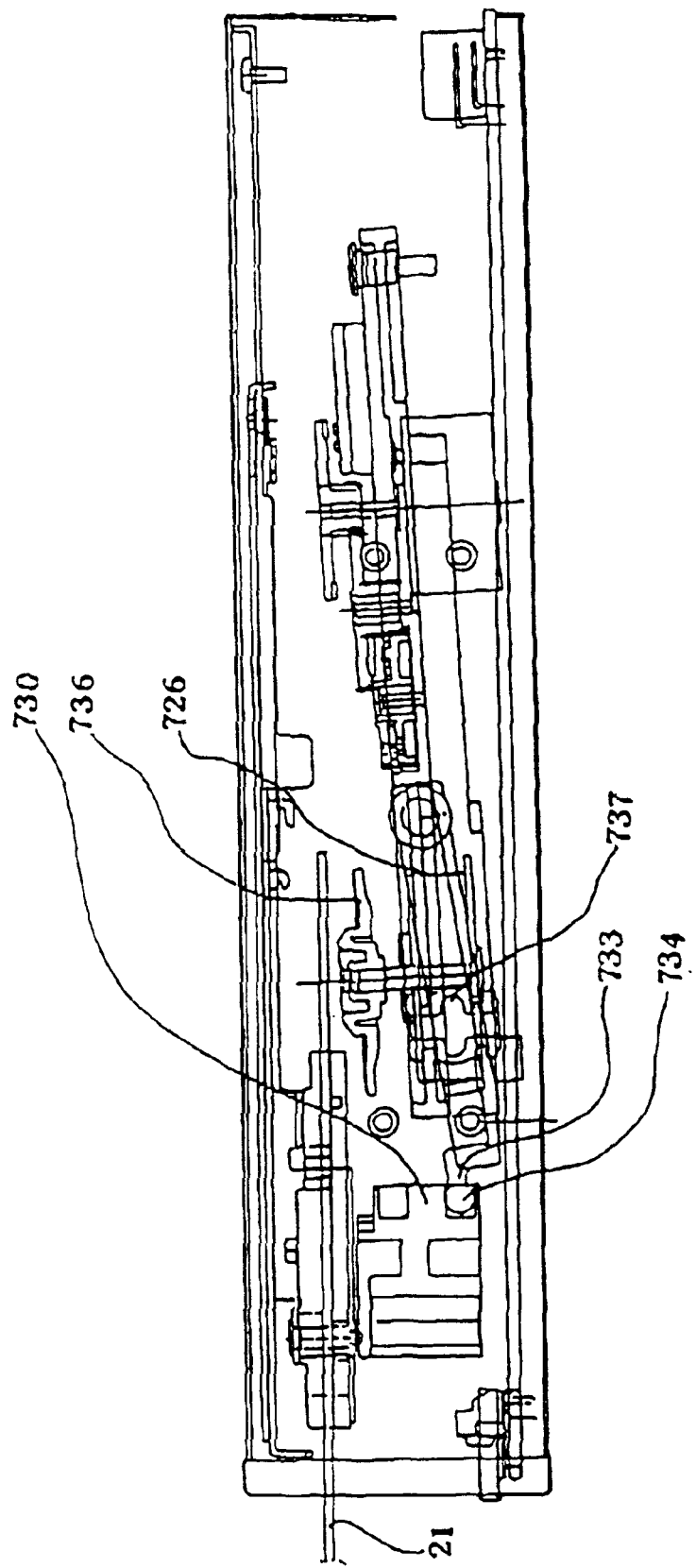

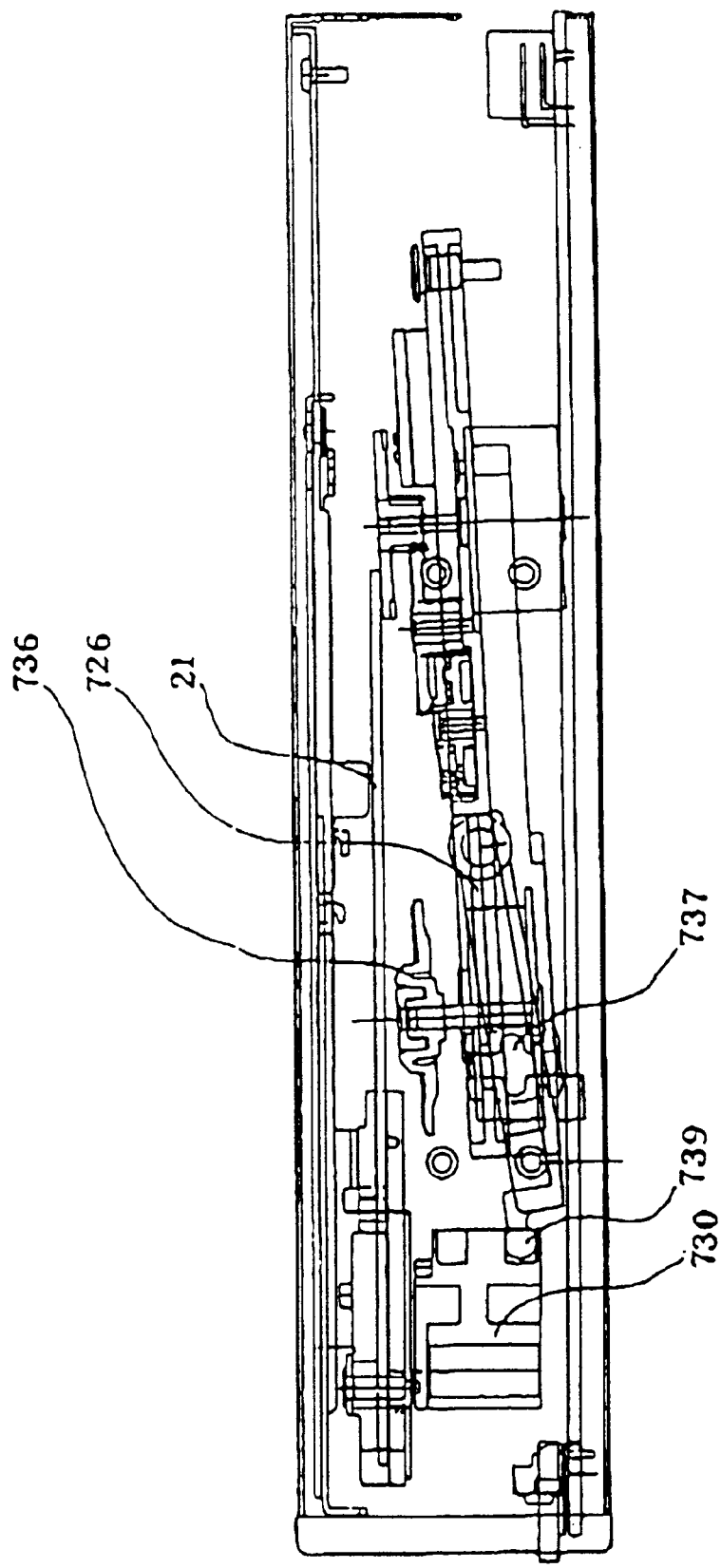

DISC LOADING AND UNLOADING APPARATUS OF AN OPTICAL DISC PLAYER

BACKGROUND OF THE INVENTION

1. Field of the Invention

The present invention relates to a loading and un-loading apparatus of a compact disc player or a digital video disc, etc., and more particularly to a direct loading and un-loading apparatus of a optical disc player.

2. Description of the Invention

The most general technique for loading the disc is to set the disc on the tray which is inserted into the optical disc player.

The loading apparatus using the tray includes the tray driving unit and pick-up driving unit. Further, various elements are operately connected with the tray driving unit and the pick-up driving unit for the selected mode, so that the disc cannot be damaged for loading mode and the mis-operation such as the break away from the path is prevented. In other words, the tray itself prevents the damage of disc and the mis-loading.

In the tray loading type, however, the operation becomes complicated, because the empty tray is ejected and then the tray on which the disc is set is loaded again. U.S. Pat. No. 5,136,570 discloses the disc ejecting structure. FIGS. 1A–B and 2 are drawings showing this patent. As shown in figures, a trans-roller 2 is mounted within the interior disc housing 1 in the transverse direction and a plurality of detecting elements 4, 4a are mounted within thereof to detect the position of the disc. By this detecting elements 4, 4a, the disc having various radius is loaded.

In the above apparatus, when the disc 3 is inserted into the disc port 4 by pushing the disc 3, the disc 4 is directly moved and set on the turntable, not using the tray. If the disc 3 is un-loaded, disc guiding unit 7 ejects the disc from the apparatus by the turning friction force of the trans-roller 2. Therefore, there is a problem that the disc 3 is damaged by the friction between the disc 3 and the trans-roller 2.

Other disc loading apparatus is disclosed in U.S. Pat. No. 5,255,255. As shown in FIGS. 3 and 4, this patent relates to the direct disc loading apparatus. Disc loading rollers 8, 8a are mounted within the disc housing 1 and moving along the path depending on the position of the disc 3. Symmetrical right and left rollers 8, 8a are adhered on the side of the disc 3 and the guide rails 9, 9a guide the roller 8, 8a. Symmetrical right and left driving gear units 11, 11a having the several gears engaged each other transmit the turning effect of the loading motor into the rollers 8, 8a. The disc position detecting member detects the position of the disc to control the loading motor.

In the above disc loading apparatus, when the disc 3 is inserted into the player, the disc position detecting member detects the position of the disc 3 to transmit the detection signal into the controlling unit, then the controlling unit controls the loading motor 10 and determines the rotation direction of the rollers 8, 8a to stop the loading motor 10 before disc clamping step. For un-loading mode, when the driving signal is inputted into the loading motor 10 to rotate the loading motor in the reverse direction of the loading direction, the operately connected gears are slit in opposite direction and make the movement of the rollers 8, 8a along the rails 9, 9a to eject the disc 3 by the turning friction force of the rollers 9, 9a. At that time, the position of the rollers 9, 9a moving along the rails 9, 9a is dependent upon the size and position of the disc 3.

In above apparatus, thus, it is possible to load the disc 3 into the player without the disc delivering device, but the disc is easily abraded because of the repeat use of the disc. In addition, the clamping error is generated by the break away from the path for loading mode. Further, when the loading speed is increased, since a plurality of gears are engaged each other, the loading apparatus is easily damaged and then the error is easily generated. This means that this loading apparatus is not an appropriate high quality loading apparatus.

SUMMARY OF THE INVENTION

An object of the present invention is to provide a disc loading apparatus in which the operation is easy, the disc is not damaged, and mis-loading is not generated.

Another object of the present invention is to provide a disc holding device to stabilize the centering of the pick-up after loading for substandard disc.

Another object of the present invention is to provide a disc clamping device which mounts the disc loading apparatus in the player.

Another object of the present invention is to provide a device for preventing multiple insertions of discs into the player.

Another object of the present invention is to provide an ejecting device of the disc loading apparatus by transmitting the power of driving unit into the loading plate.

Another object of the present invention is to provide a device for removing the deadlock of the disc.

Another object of the present invention is to provide a device for stabilizing the operation of loading plate guiding the disc.

Another object of the present invention is to provide a device for controlling the clamping timing of a pick-up base and a disc clamper without other driving units.

In order to achieve these objects, according to one aspect of the present invention comprises base plate, a loading plate driving member for driving the loading plate, along the base plate, and an ejecting loading the disc, the disc holding device for holding both side of the disc to load the disc, the clamping device for clamping the disc during the operation of member for ejecting the disc.

BRIEF DESCRIPTION OF THE DRAWINGS

FIG. 2 is a view showing the structure of the conventional disc loading apparatus.

FIG. 4 is a view showing the structure of the conventional disc loading apparatus.

FIG. 6 is a view showing the structure of the disc loading apparatus according to the present invention.

FIG. 7 is a view showing the loading state of the disc of the loading apparatus.

FIG. 8 is a view showing the un-loading state of the disc of the loading apparatus.

FIG. 16 is a view showing the structure of the loading apparatus according to the present invention.

FIGS. 17A–17C are views showing the structure of the disc holding device according to the present invention.

FIGS. 18A–18D are views showing the structure of the upper holder of the disc holding device according to the present invention.

FIG. 20 is a partially combined view of the upper holder and the lower holder.

FIG. 25 is a side view of the FIG. 24A.

FIGS. 26A and 26B are a plan view and a front view indicating the clamped state of the clamping device.

FIG. 27 is a side view of the FIG. 26A.

FIGS. 29 and 29B are a plan view and a front view of the disc multi-insertion intercepting device.

FIG. 33 is a plan view of the ejecting device of the loading apparatus.

FIGS. 34A and 34B are a plan view and a lower side view of ejecting lever of the ejecting device.

FIG. 35 is a plan view of ejecting lever holder of the ejecting device.

FIG. 36 is a plan view of the driving cam of the ejecting device.

FIG. 46 is a plan view showing the operation of the deadlock removing device.

FIG. 47 is a plan view of the loading plate according to the present invention.

FIG. 48 is a plan view showing one embodiment of the disc loading apparatus.

FIG. 49 is a view showing one example of the deadlock removing device.

FIG. 50 is a detailed view of FIG. 48.

FIGS. 51A and 51B are a plan view and a sectional view of the pick-up/down device.

FIGS. 53A is a plan view showing the structure of the timing gear of the up/down device.

FIG. 53B is a sectional view taken along the line A—A.

FIG. 54A is a view showing the structure of the driven gear of the up/down device.

FIG. 54B is a sectional view taken along the line A—A.

FIGS. 55A and 55B are a plan view and a front view showing the structure of the up/down device.

FIGS. 56A, 56B, and 56C are a plan view, a front view, and a side view showing the setting state of the pick-up base.

FIGS. 57A, 57B, and 57C are a plan view, a front view, and a side view showing the initial state of the disc loading.

DETAILED DESCRIPTION OF THE INVENTION

Figure 1A:
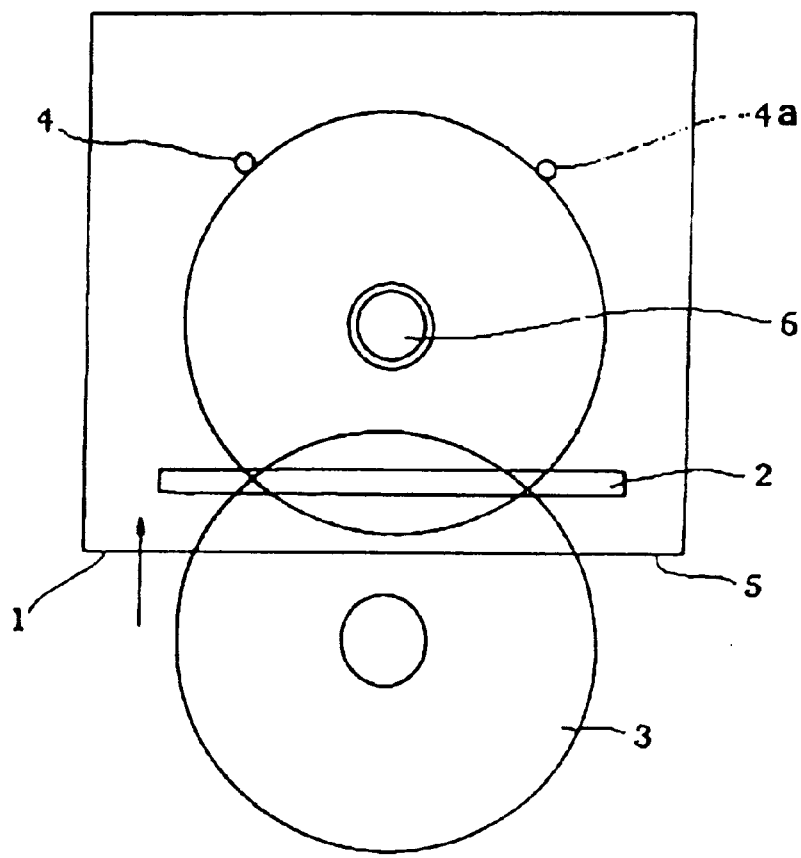
FIGS. 1A and 1B are views showing the loading state of the conventional disc loading apparatus.
Figure 1B:
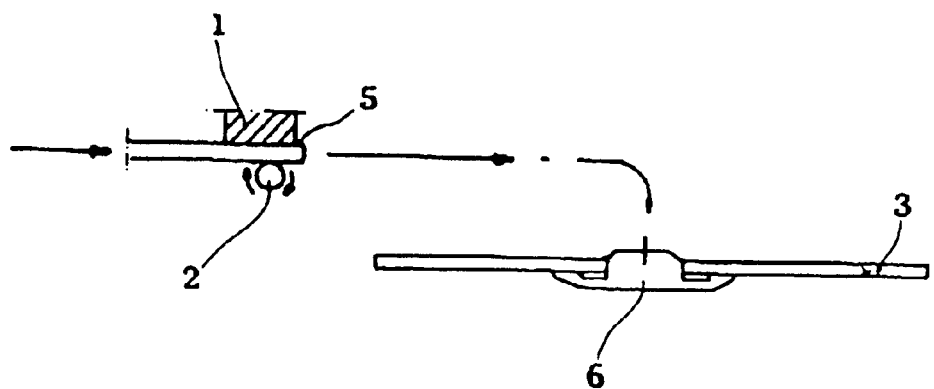
Figure 3:
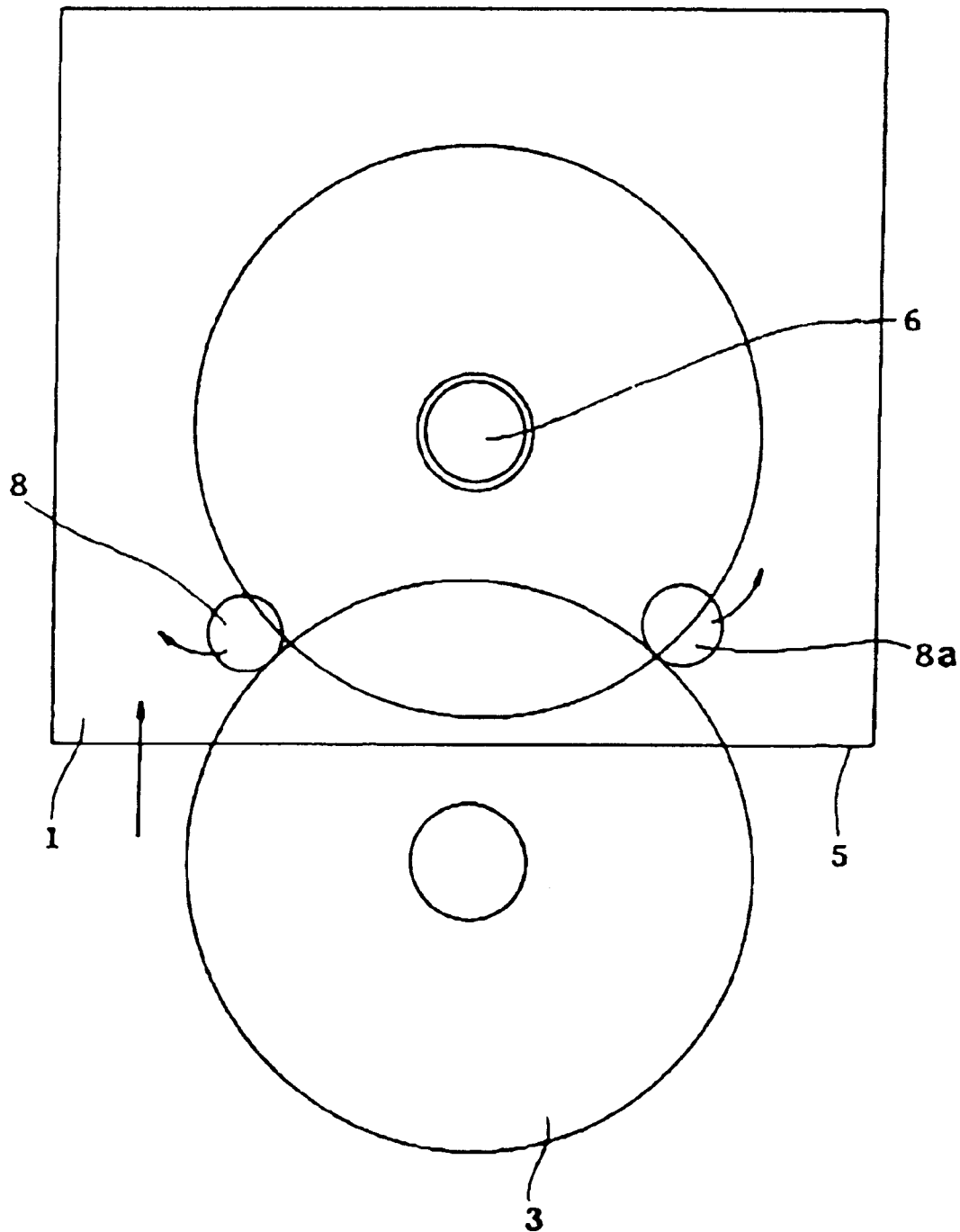
FIG. 3 is a view showing the loading state of the conventional disc loading apparatus.

The preferred embodiment of the present will be described accompanying with the drawings.

FIGS. 6–15 are views showing the embodiment of the disc loading apparatus.

The disc loading apparatus comprises the disc holding member to be set to the base plate body 20 to hold both side of the disc 21 and load it, the loading plate 22, for conveying the held disc in plane, which is varied for execution mode, the driving member for moving the loading plate 22 to the desired position, the ejecting member to be operately connected with the driving member to eject the disc from the player.

The disc holding member includes holders 23L, 23R for holding the disc during moving the along the loading plate 22, disc guiding grooves 24L, 24R formed in the holders 23L, 23R, and a disc detector 25 for detecting the set of the guided disc 21. The holder 23L, 23R are amounted in first and second carriers 26L, 26R of the loading plate 22 and the disc is fixed into the disc guiding grooves 24L, 24R to determine the inner curvature.

The disc holding plate 22 comprises the first carrier 26L conveying the disc shucked by the holders 23L, 23R to the predetermined position along the base plate 20 and the second carrier 26R, including a rack gear 27 engaged with a moving gear of the driving unit, to be operately connected with the first carrier 26L. The first and second carriers 26L, 26R are is set in a guide track 28 of the base plate 20 for guide.

The driving member of the loading plate 22 includes a loading motor 29 and a stay gear 31 including a moving gear 30 contacted with inner side of the rack gear 27 of the second carrier 26R. The power of the loading motor 29 is indirectly transmitted to the stay gear 31 through a intermediate gear. The moving gear 30 is fixed in the stay gear 31, a center gear 32 for transmitting the power into the moving gear 30 and a roller 33 contacted with first carrier 26L in plane are mounted in the coaxial shaft of the moving gear 30. Further, the moving gear 30 is guided in the track 34 of the base plate 20 and set a rotor 35 to be rotating by the variation of first carrier 26L applied through the roller 33.

The ejecting member comprises a cam gear 39 intermittently engaged with the gear 36 of the driving unit for the set mode to transmit the power into the eject lever through a gear 37 and the eject lever 38 engaged with the gear of the cam gear 39 through the rack 40 and controlled by the cam curve to unload the disc. In the base plate, further, a plurality of sensors 41 for sensing the position of the disc are set certain position.

Figure 5A:
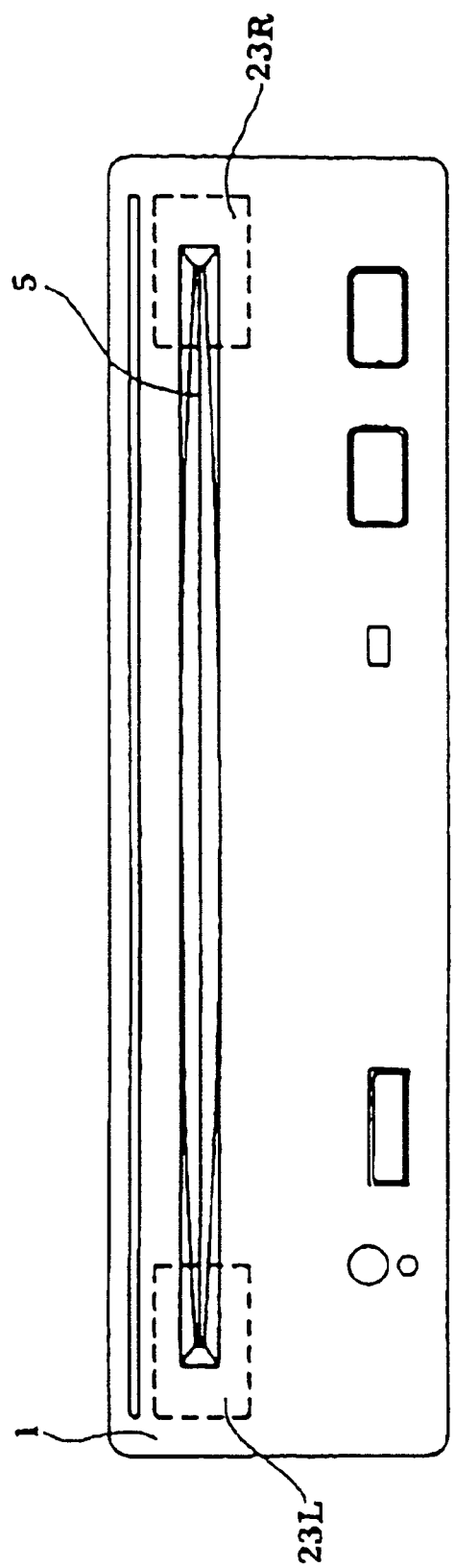
FIG. 5A is a front view of the housing of the disc loading apparatus according to the present invention.
Figure 5B:
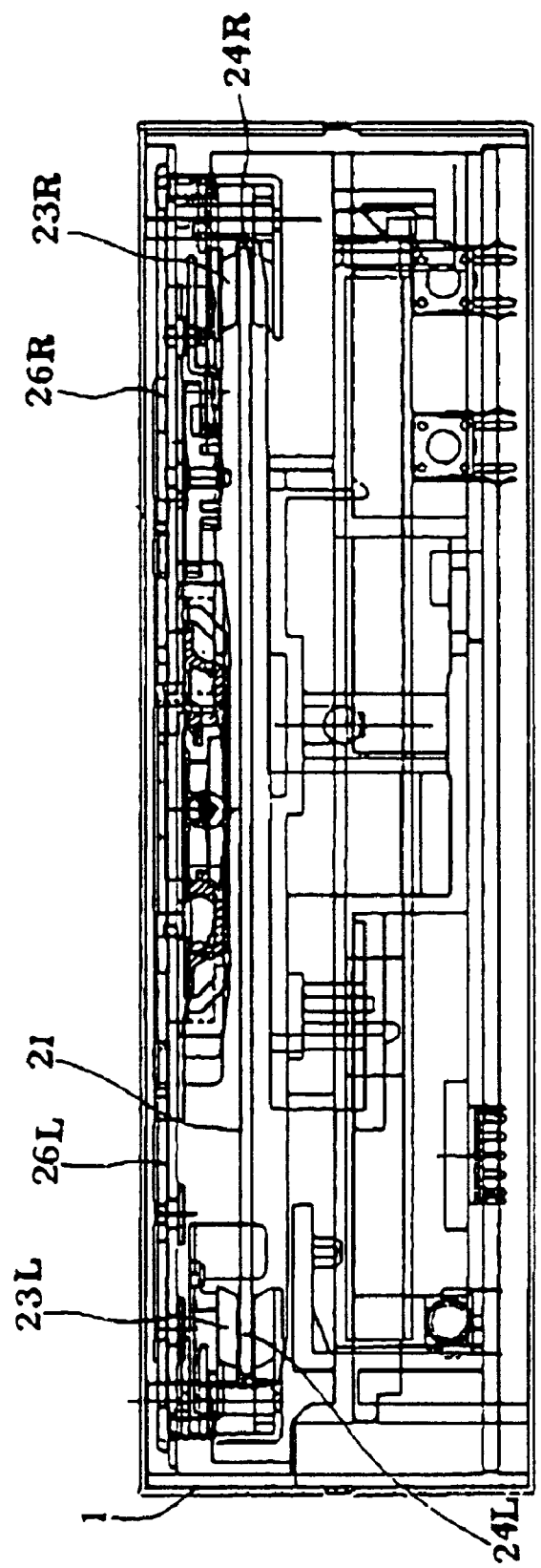
FIG. 5B is a sectional view of the housing of the disc loading apparatus according to the present invention.

In the disc loading apparatus, as shown in FIG. 5, the loading/unloading of the disc is executed by a disc port 5 mounted in the disc housing 1. FIG. 6 indicates the initial state of the disc loading apparatus and FIG. 7 indicates the loaded state of the disc.

In the disc holder 23L, 23R of the holding apparatus, the guiding grooves 24L, 24R contacted with outer side of the disc 21 are formed, so that the disc 21 is fixed in the guiding grooves 24L, 24R. The inner curvature is adjusted to the size of the disc in the standard of the disc guiding grooves 24L, 24R to retain of the fixing state of the disc 21. Further, the holding device is moving to the base plate 20 along the first and second carriers 26L, 26R of the loading plate 22.

As shown in FIGS. 9–15, the loading plate 22 conveys the fingered disc 21 by the holding device through the divided first and second carriers 26L, 26R for several dynamic steps. The first and second carriers 26L, 26R are split or contracted along the track 28 of the base plate 30, so that the disc 21 is clamped or released by clamp assembly 43. When the second carrier 26R is engaged with the moving gear 30 mounted in the stay gear 31 of the driving unit which is also engaged with the rack gear 27, it is operately connected with the first carrier 26L in the rotation direction. Thus, the operately connected first and second carriers 26L, 26R are moving along the guide track 28 on the base plate 20. During movement of the first and second carrier 26L, 26R, a catch 42 of the clamp assembly 43 and the safety device are operated.

The driving unit transmits the power of the loading motor 29 into the first carrier 26L, the second carrier 26R, and the eject lever 38. When the first and second carriers 26L, 26R are moving in the right and left directions, the variation of the first and second carriers 26L, 26R are transmitted into the stay gear 31 including the moving gear 30 and then the moving gear 30 and the roller 33 are rotated by the rotor 35. As a result, the power of the loading motor 29 may be transmitted into the first and second carriers 26L, 26R. That is, the turning effect of the loading motor 29 is transmitted into the moving gear 30 through the center gear 32 of the stay gear 31. When the first carrier 26L is split by the roller 33 in the left direction and the variation of the first carrier 26L is transmitted into the rotor 35, the moving gear 30 is pushed by the rotor 35 and then engaged with the rack gear 27 of the second carrier 26R. Further, the second carrier 26R is split in the right direction during the moving gear 30 is moving along the track 34 of the base plate 20. The width of the track 34 of the moving gear 30 is the same the maximum split of the first carrier 26L. Further, cam gear 39 makes the linear movement of the eject lever 38 for every rotation.

When the cam gear 39 is rotated, the eject lever 38 is moving in the forward direction and pushing the holder 23R to eject the disc because the gear 37 engaged with the cam gear 39 is also engaged with the rack 40 of the eject lever 38. At that time, the second carrier 26L loses the power and is returned in the initial state by an elastic member 50.

The disc process of the present disc loading apparatus comprises four steps in the standard of the movement of the moving plate, as shown in FIGS 9–12.

Figure 9:
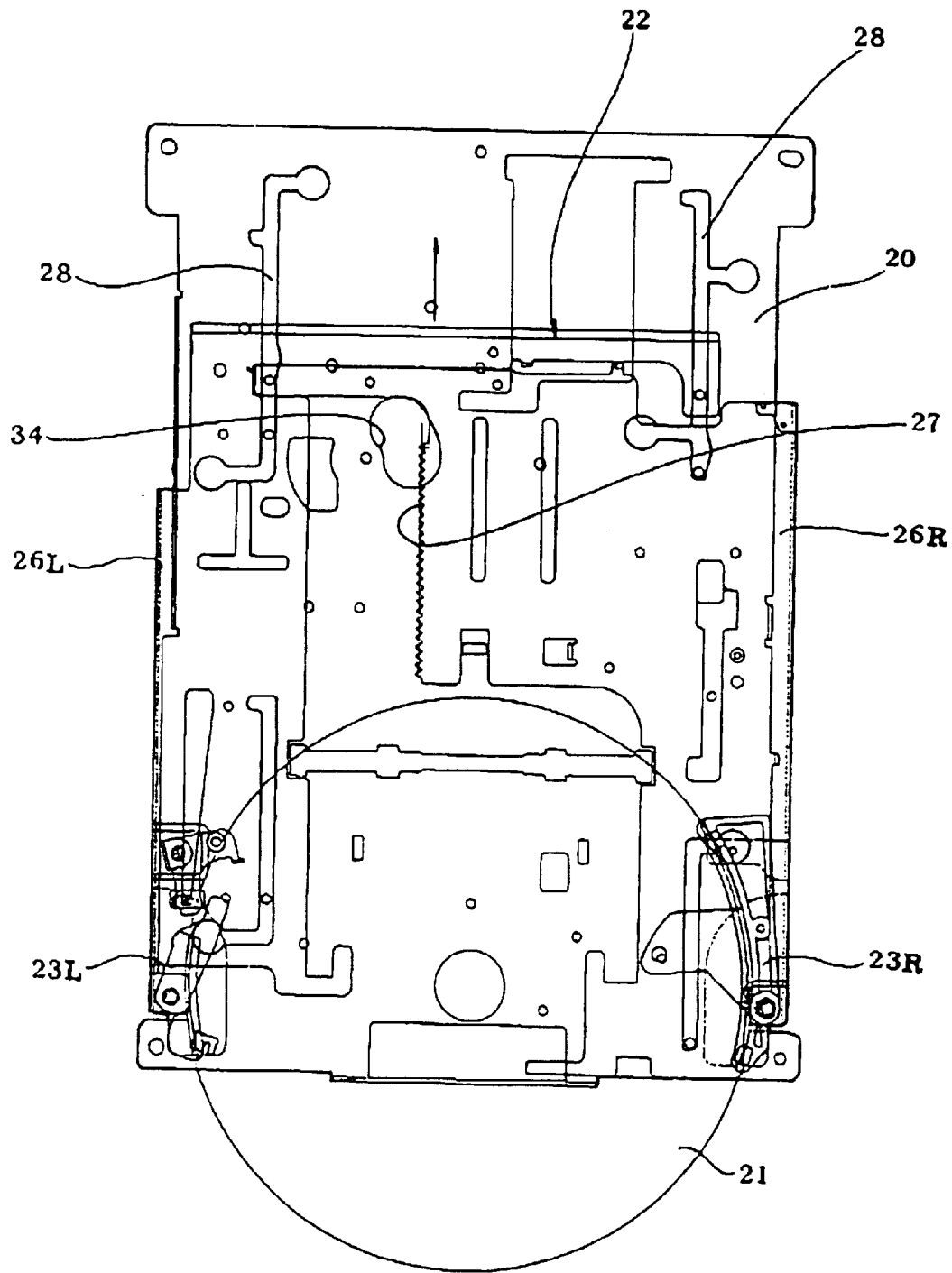
FIGS. 9–15 are views the disc loading and un-loading processes of disc loading apparatus.

The first loading step is the initial step that the disc 21 is inserted into the disc port 5 of the disc housing 1. When the disc is inserted into the disc port 5, as shown in FIGS. 6 and 9, the disc 21 is guided is the guiding grooves 24L, 24R of the holders 23L, 23R at both sides of the disc port 5.

Figure 10:
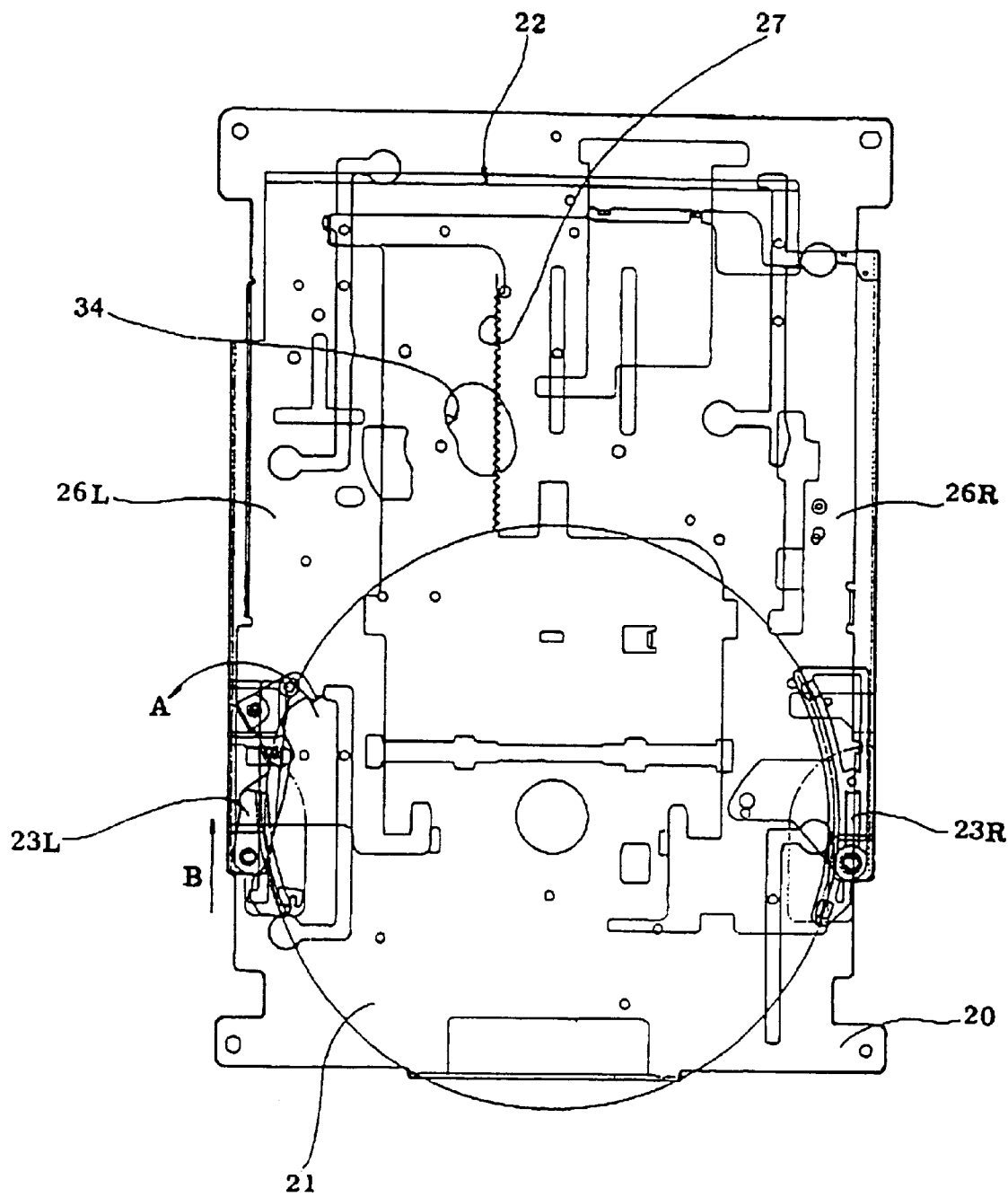

The second loading step is loading start step. As shown in FIG. 10, when the disc is pushed for insertion, the disc 21 is fixed in the holders 23L, 23R and the detector 25. At the same time, the disc detector 25 is rotated in the A-direction, i.e., counterclockwise, and the holder is linearly moving in the B-direction.

Figure 11:
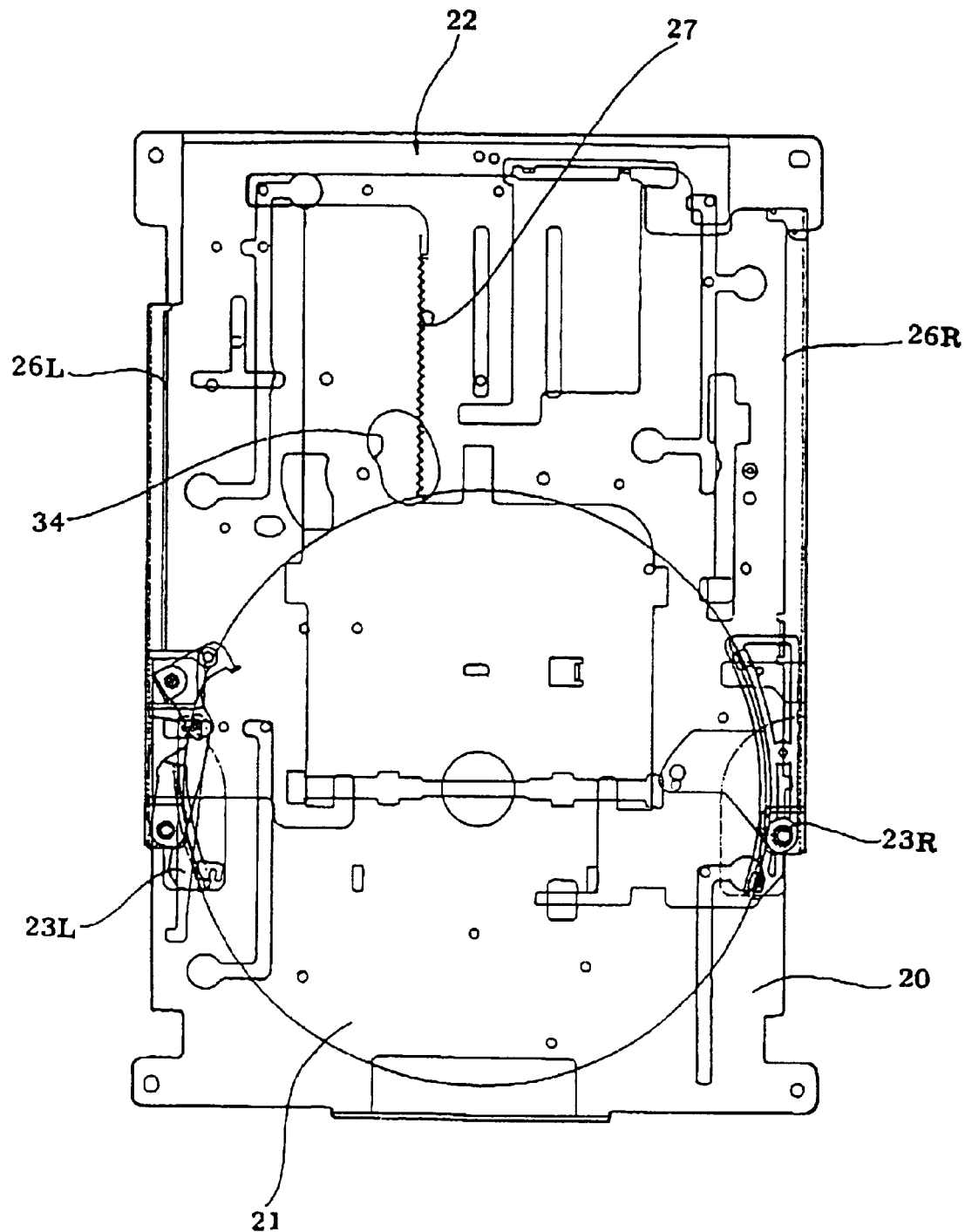

In the third loading step, when the first and second carriers 26L, 26R are simultaneously moving and the engaged moving gear 30 and rack gear 27 are rotated in the second loading step, the gear of the loading motor 29 is rotated clockwise if the side bending unit of the first carrier 26L pushes the disc position detecting sensor 41 to apply the electrical signal into the loading motor 29. When the fist and second carriers 26L, 26R are moved, at that time, the disc is reached in the center of the turntable. As shown in FIG. 11, further, the cam gear 39 is not operated and pick-up base is retained in the down state for loading mode.

Figure 12:
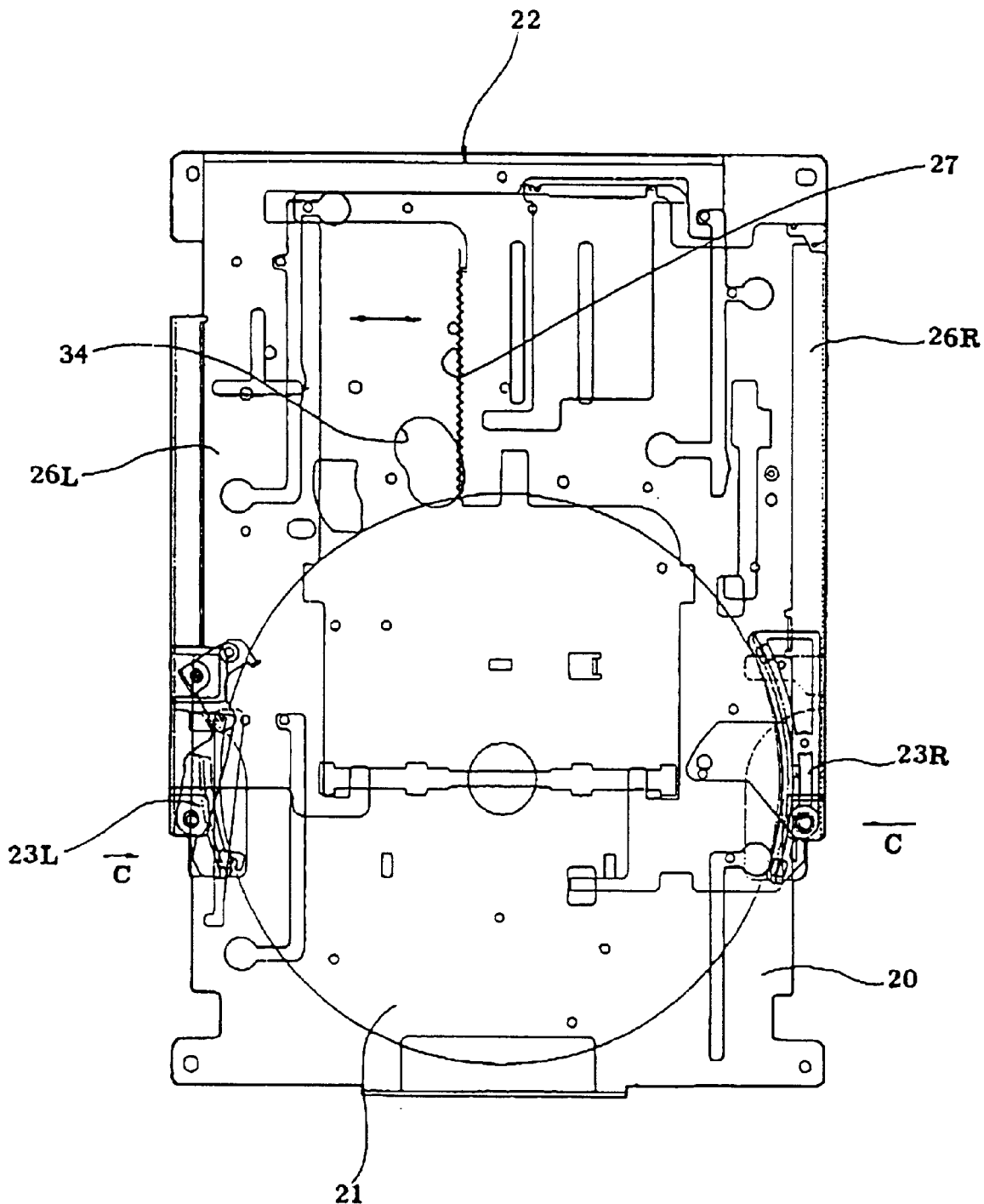

In the fifth loading step, as shown in FIGS. 7 and 12, the fist and second carriers 26L, 26R are split in the right and left directions and the catch is also split in the right and left directions. Further, the pick-up base is raised in the up-state, and at the same time, the clamp assembly 42 becomes in the free state, so that disc 21 is clamped in the turntable for operation of the player.

Figure 13:
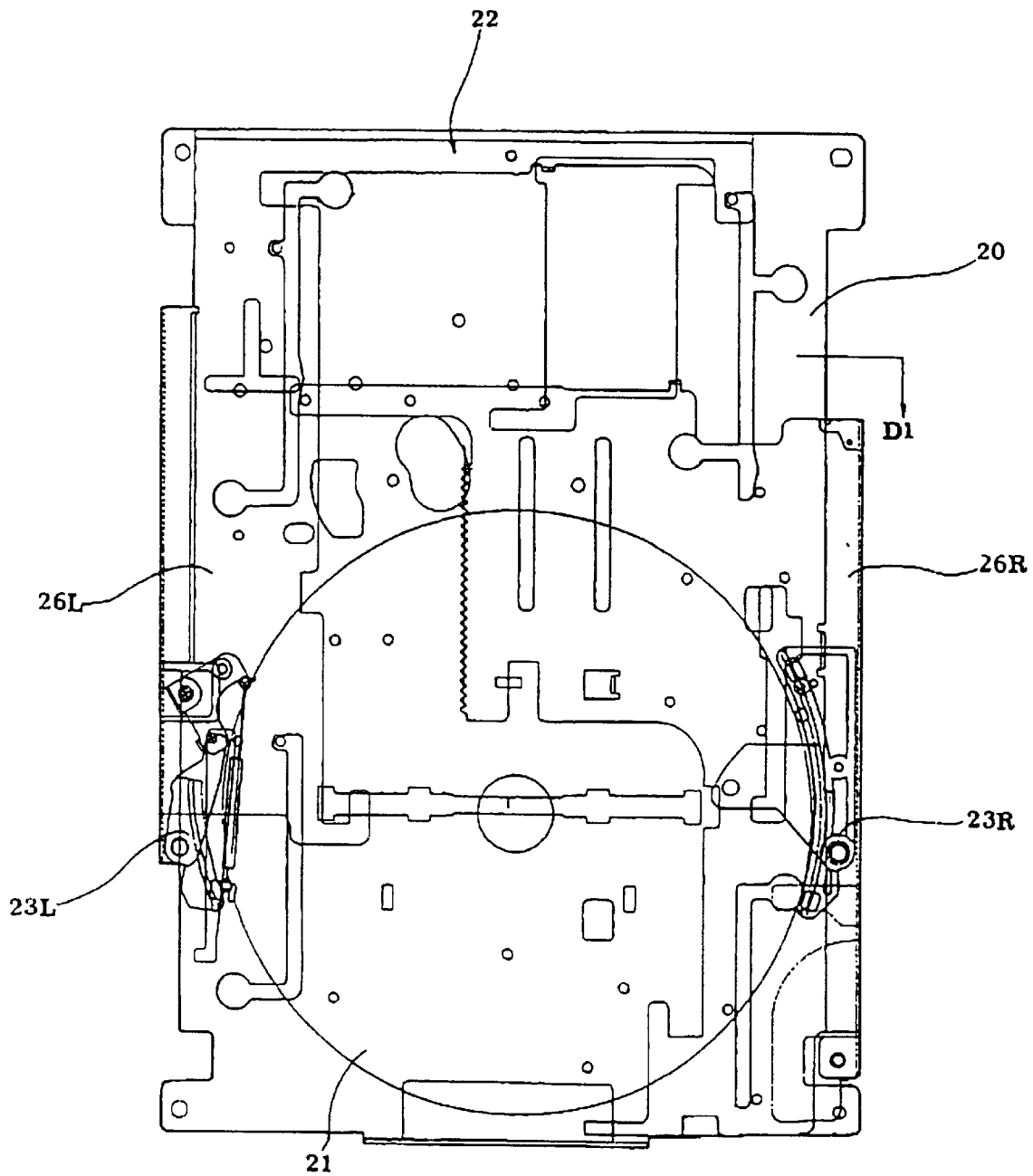
Figure 14:
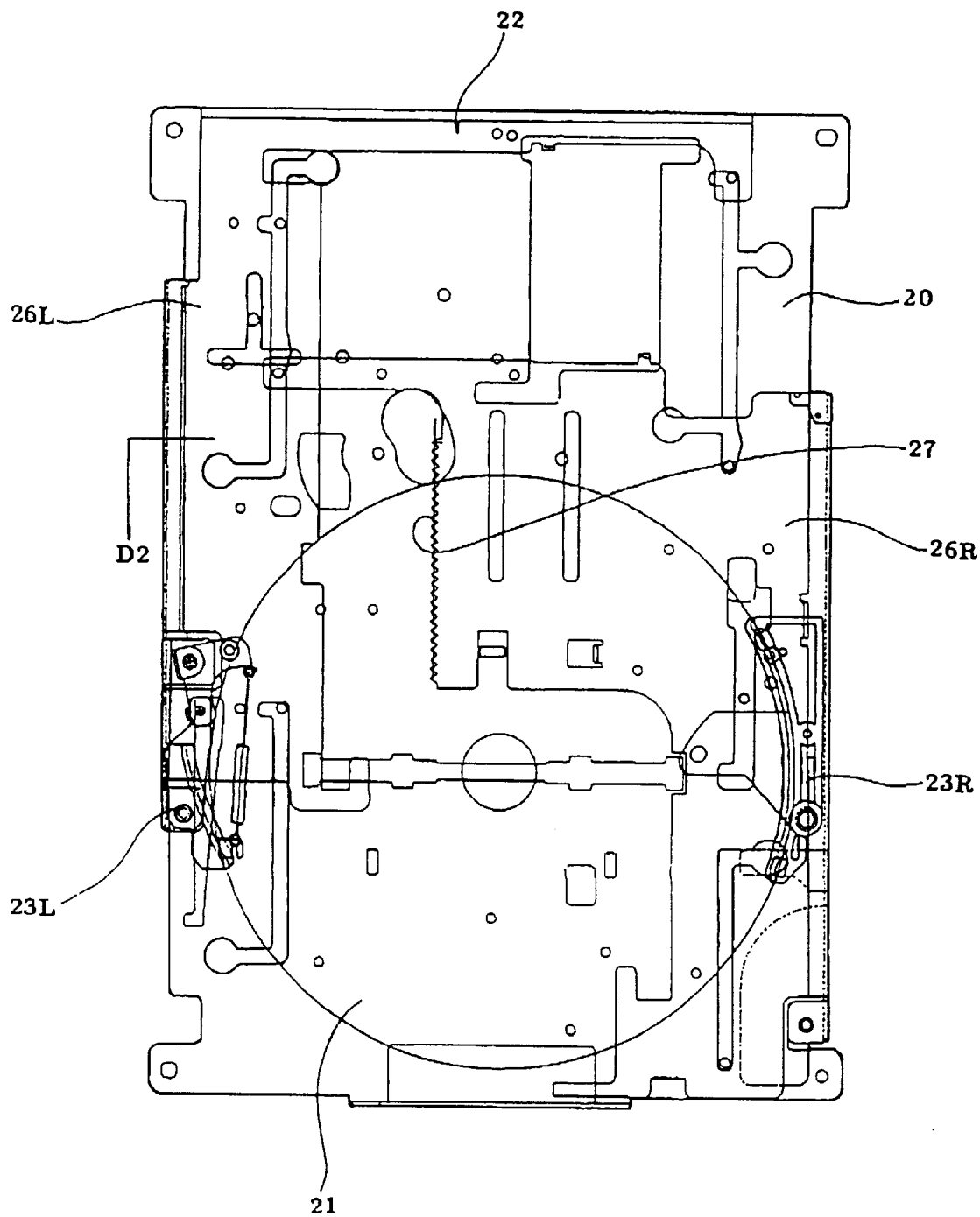

The unloading step comprises four ejecting step, as shown in FIGS 12–15. In the first ejecting step, as shown in FIG. 12, the ejecting key is operated to rotate the loading motor counterclockwise. In the ejecting second step, the first and second carriers 26L, 26R are moved in the C-direction by the rotation of the loading motor in the first ejecting step, so that the holders 23L, 23R of the holding device mounted in the first and second carriers 26L, 26R are adhered on the outer peripheral of the disc 21 to hold the disc 21. Subsequently, the disc catch 42 is also moving in the C-direction, and at the same time the clamp assembly 43 becomes the up-state along the slope. As result, the clamp assembly 43 is separated from the disc, as shown in FIG. 13.

In ejecting third step, the first and second carriers 26L, 26R are moving down in the D1, D2 directions which is the front direction. At that time, a lever trigger 44 is rotated clockwise by the elastic plate 45 of the second carrier 26R, so that the cam gear 39 is operately connected with the gear 37 by engaging with the gear 36 if the fixed shaft of the lever trigger 44 at the left end of the lever trigger 44 hits the Z-shaped upper portion of the cam gear 37.

Figure 15:
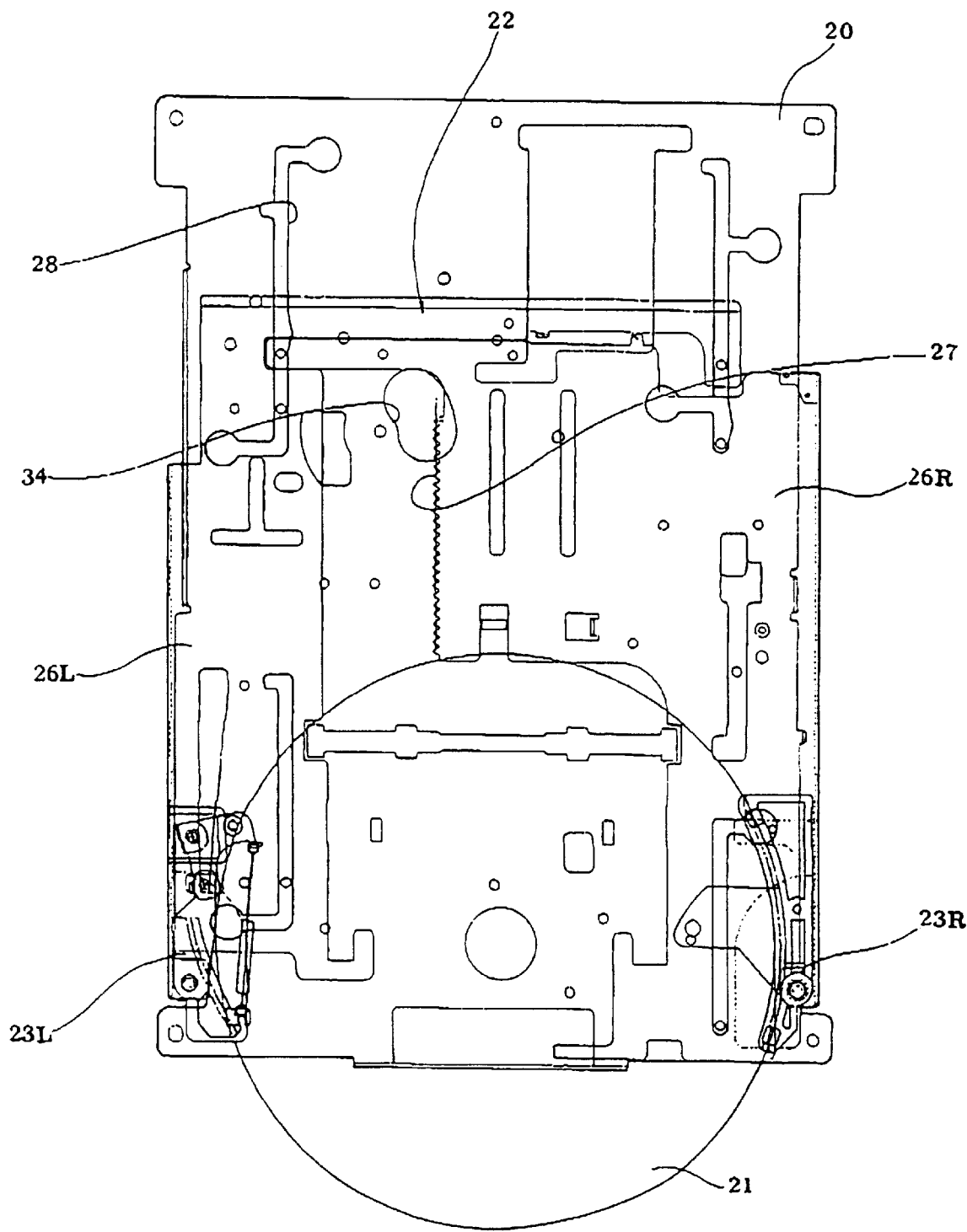

In the ejecting four step, the disc 21 is ejected by the rotation of the cam gear 39. When the cam gear 39 is rotating about 180° counterclockwise, the eject lever 38 having the rack 40 is moving in the E-direction by the rotation of the gear 37, as shown in FIG. 8. At that time, the eject lever 38 pushes the holder 23R of the holding device, so that the disc 21 is ejected, as shown in FIG. 15.

In the present invention, as described above, since the disc 21 on the holders 23L, 23R are loaded along the base plate for the loading mode without the tray, the face of the disc 21 can not be damaged. Further, since the path of the disc 21 is determined by the loading plate, the mis-loading is not generated except the case of the break away from the path or the abnormality of the apparatus.

Hereinafter, the disc holding device will be described in detail accompanying FIGS. 16–21.

Figure 17B:
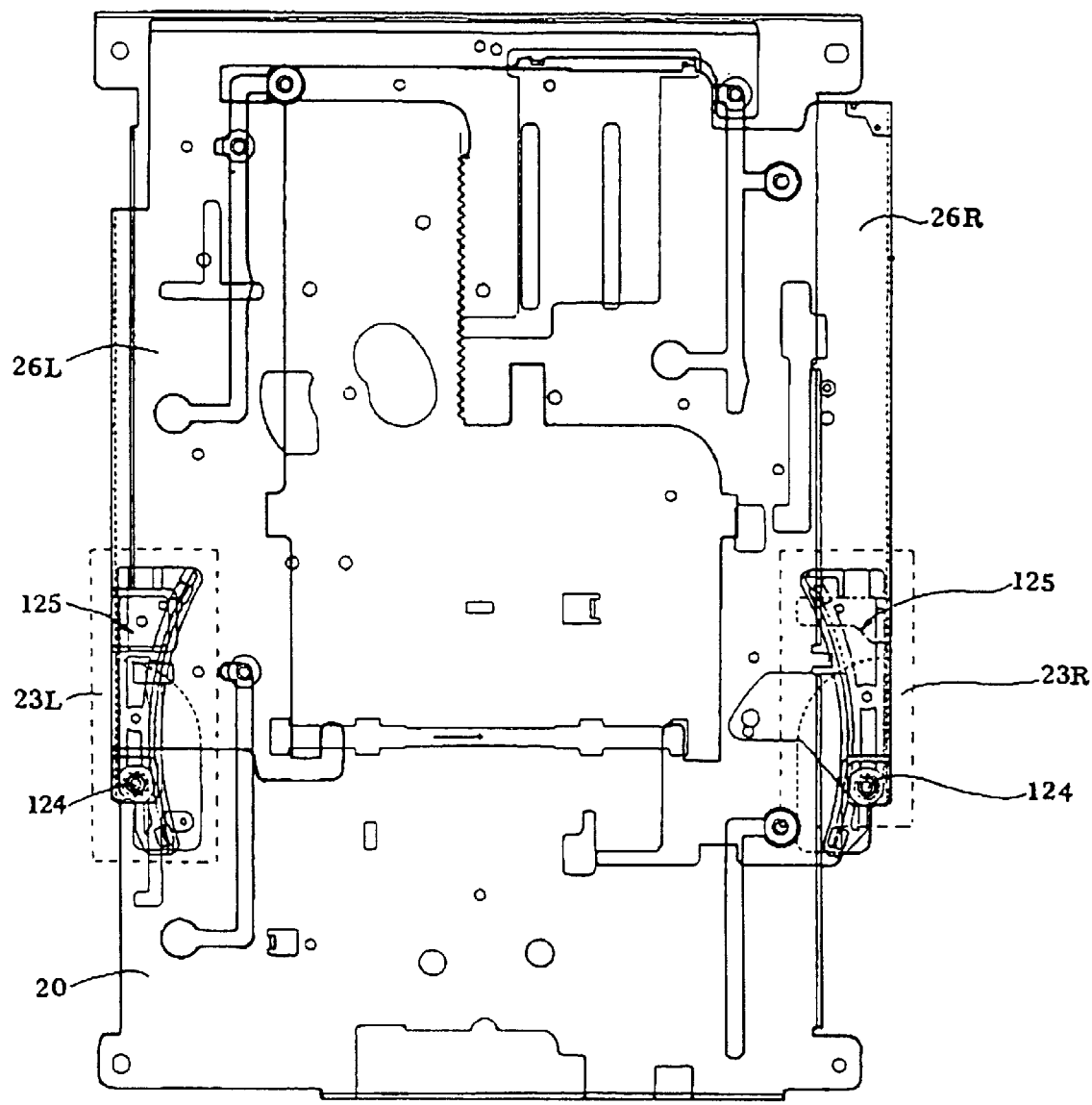
Figure 17C:
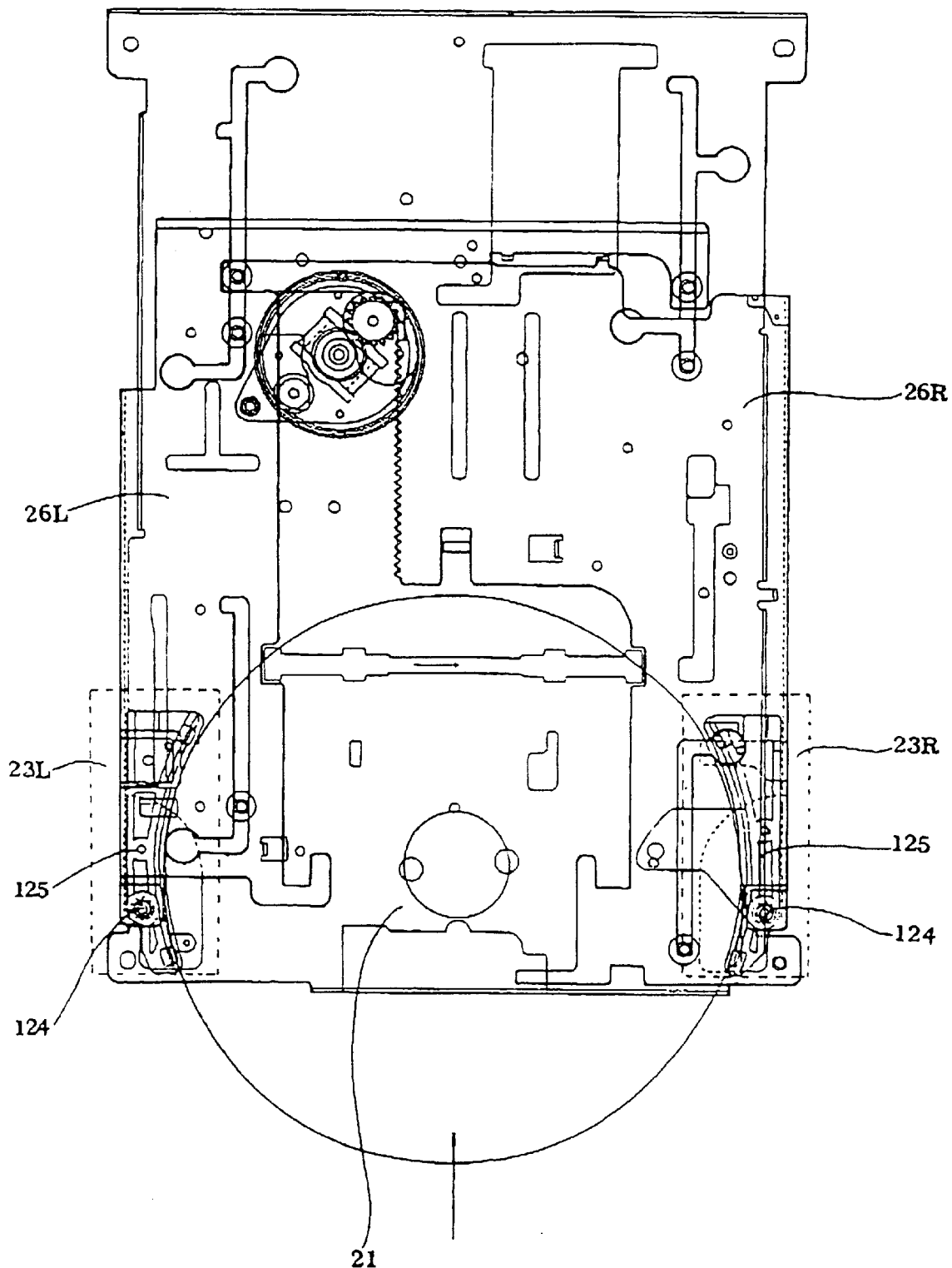
Figure 19A:
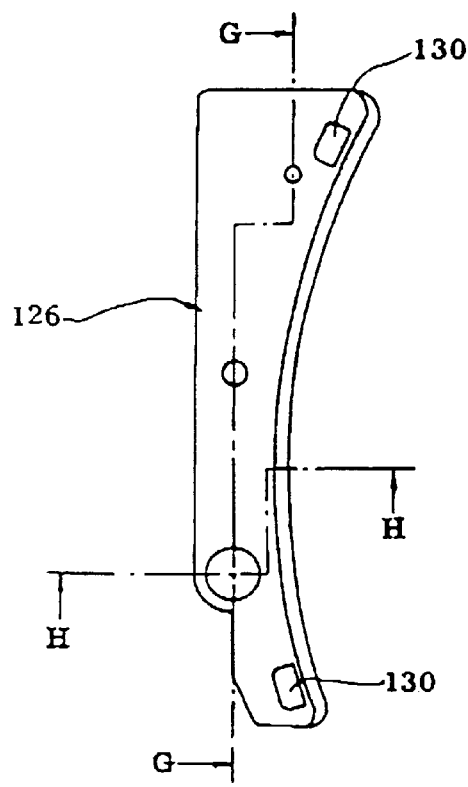
FIGS. 19A–19C are views showing the structure of the lower holder of the disc holding device according to the present invention.
Figure 19B:
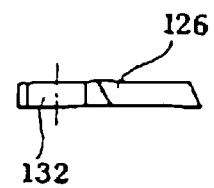
Figure 19C:
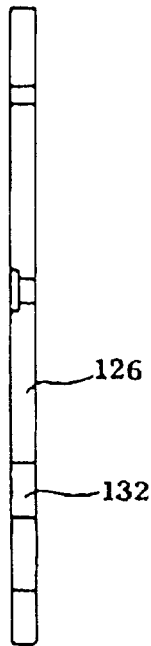
Figure 21:
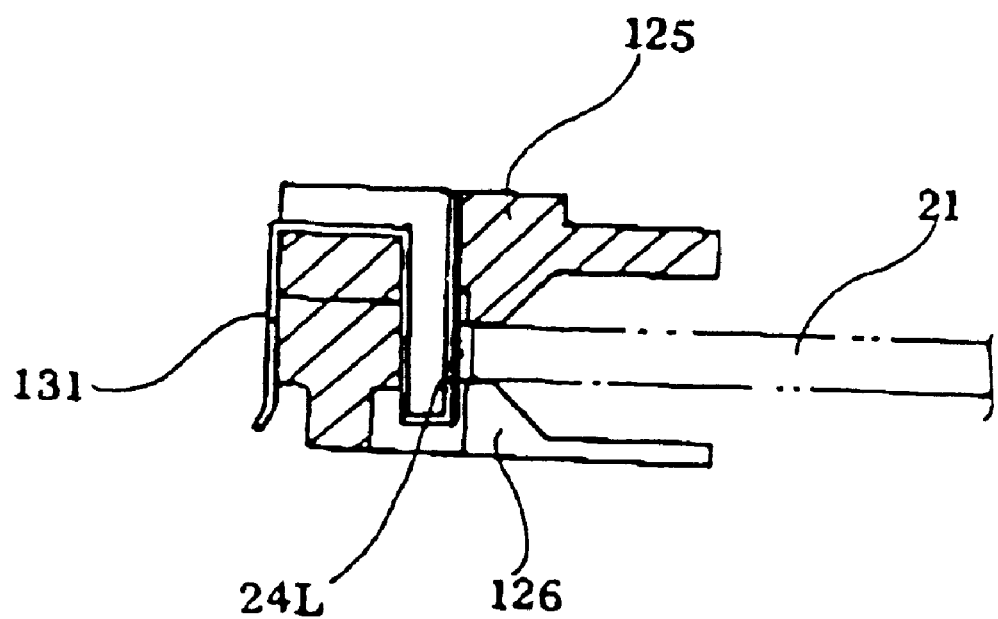
FIG. 21 is a view showing other embodiment of the disc holding device according to the present invention.

The disc holding device of the present invention is mounted in both entrance of the disc port 5 of the first and second carriers 26L, 26R, as shown in FIGS. 17A–C

As shown in FIGS. 18A–D and 19A–C, the holding devices 23L, 23R comprise the upper holder 125 including the boss 124 combined with the first and second carriers 26L, 26R, the lower holder 126 forming the disc guiding groove 24L by fitting it the upper holder 125 through the guiding groove 132, and the elastic disc supporting unit 127 for supporting the side of the disc 21 guided between the upper and lower holders 125, 126.

The elastic disc supporting unit 127 includes a elastic supporting slice 128 in the upper holder 125, a elastic operating space 129 causing the variation of the elastic supporting slice 128, and a elastic member 131 mounted at the inner side of the guiding groove 24L, as shown in FIGS. 19A–21. In the lower holder 126, the movable space 130 is formed at the position corresponding to the elastic supporting slice 128, so that the elastic supporting slice 128 is guided. The elastic supporting unit 127 is smaller than the width of the dice 21. The disc holding advice is symmetrically mounted in the left and right of the housing. Also, the disc holding advice can be mounted in the one side.

The disc holding device mounted on the first and second carriers 26L, 26R are moving in plane. The holding devices 23L, 23R guide the disc passing the disc port 5 and then stabilize the guided disc 21. This holding device holds only the disc 21 of predetermined size. For example, when the standard disc size is 12 mm, the width of both holder is determined approximately 120 mm to hold both side of the disc 21 and guide it in the first and second carriers 26L, 26R.

If the size of the disc is out of the standard size, the holding device does not hold the disc 21 perfectly. For example, the disc is shaken in case of smaller disc than the standard size and the disc is not held in case of the larger disc. In the present invention, only the disc 21 passing the disc port 5 is held by the holding device.

As shown in FIGS. 18A–D and 19A–C, the disc holding device includes the upper and lower holder 125, 126. When the upper and lower holder 125, 126 are combined, as shown in FIG. 20, these form the disc guiding groove 24L to guide the disc 21 of which both sides are supported by the elastic supporting unit 127.

When the disc 21 is reached holding device 23L, 23R through the disc port 5, the disc 21 is guided in the disc guiding grooves 24L, 24R. At that time, the elastic supporting slice 128 of the upper holder 125 is contacted with the side of the disc 21 and pressed in the outer direction of the elastic operation space 129, so that the elastic supporting slice 128 is adhered to the side of the disc 21. At that time, the elastic supporting slice 128 is guided in the moving space 120 of the lower holder 126.

The pressure of the elastic supporting slice 128 restricts the snake of the disc 21 for the correct loading. This pressure for supporting the disc 21 presses the both side of the disc 21. Further, it is possible to press the one side of the disc 21. For example, the elastic supporting slice 127 is formed only one holder, so that the elastic supporting slice 127 presses the disc 21 into the holder which does not have the elastic supporting slice 127.

In the present invention, the width between the right and left of the holding devices 23L, 23R are at most 120 mm for standard disc of 120 mm.

The disc holding device of the present invention holds the disc to prevent the shake of the disc 21 by the elasticity. Further, since the holding point of the holding device is variable, the disc is always held even for a bad disc.

Hereinafter, the disc clamping device of the present invention will be described accompanying with FIGS. 22A–27.

The clamping device operately connected with the driving unit is mounted in the disc loading apparatus.

The disc clamping device comprises the planetary gear unit to be rotated along the first and second carriers 26L, 26R for transmitting the power of the driving unit to the first and second carriers 26L, 26R, the fingers 223L, 223R at the ends of the first and second carriers 26L, 26R which are moving by the rotation of the planetary gear unit, and the clamper catches 42L, 42R receiving the transverse variation of the first and second carriers 26L, 26R through the fingers 223L, 223R for clamping the disc 21 to the turntable or restricting the clamp assembly 232 again.

A line gear 225 of the planetary gear unit is rotated by the power of the driving unit. At the left end of the planetary gear unit, which is rotatable, the roller 33 internally contacted with the side end of the first carrier 26L is mounted. At the right end, the moving gear 30 internally contacted with the rack 27 of the second carrier 26R is elastically supported. Further, in the central bussing 226 integrated with the rotating plate 228, the line gear 225 is assembled, so that the planetary gear unit is fixed in the base plate 20.

The first and second carrier 26L, 26R is moving along a plurality of rails 230 formed in the base plate 20 to operate the fingers 223L, 223R. The clamper catches 42L, 42R are symmetrically formed in the transverse rail 227 formed at the central region of the base plate 20 in both direction and elastically supported by the elastic member 223 in the central direction of the clamp assembly 232. Further, the clamper catches 42L, 42R include the guide groove 234 for guiding the fingers 223L, 223R and the holder 236, penetrating the rail 227 of the base plate 20, for holding the clamp assembly 232 at the its lower part. The holder 236 is formed at the symmetric position of the clamp assembly 232 in the transverse direction.

Figure 22A:
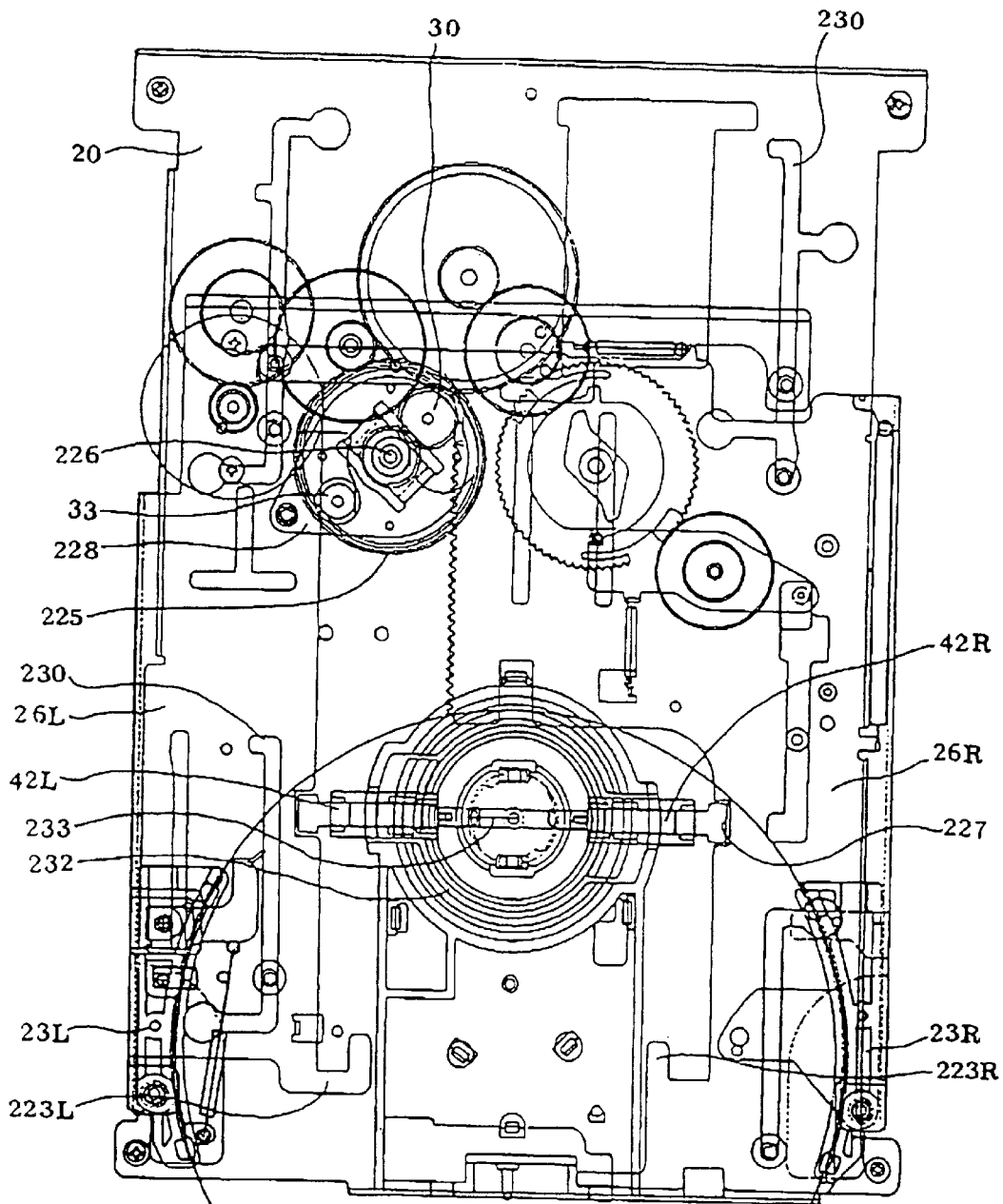
FIG. 22A is a front view of the initial state of the clamping device according to the present invention.
Figure 22B:
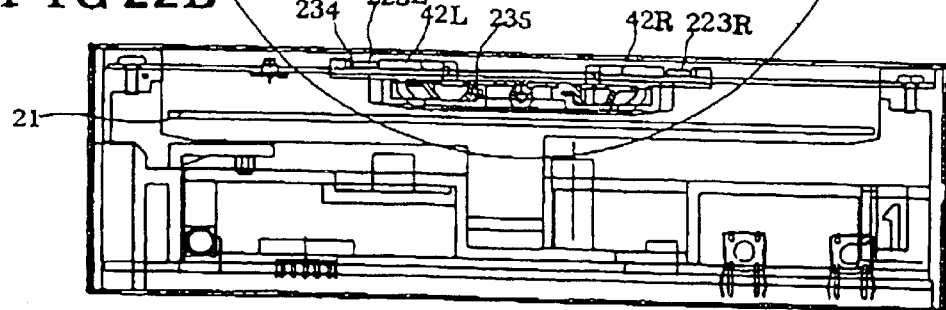
FIG. 22B is a sectional view of the initial state of the clamping device according to the present invention.
Figure 23A:
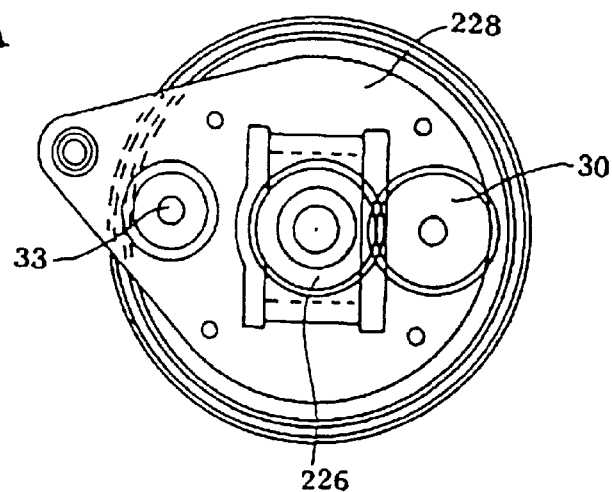
FIGS. 23A, 23B, and 23C are a assembling view, a decomposition view, and a sectional view of the planetary gear of the clamping device.
Figure 23B:
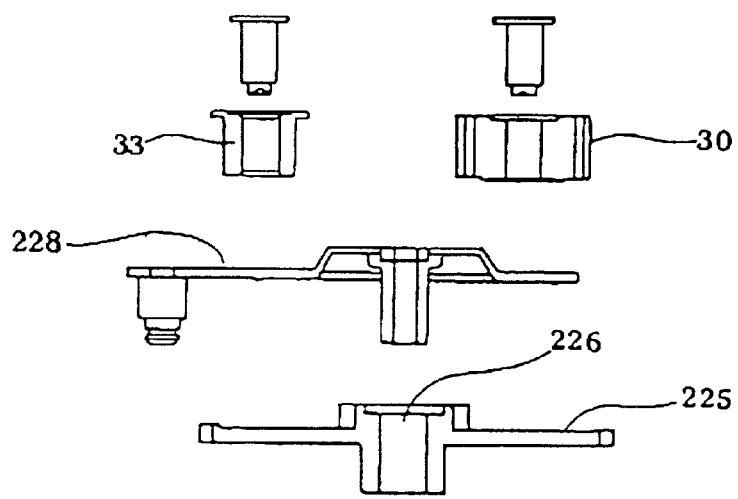
Figure 23C:
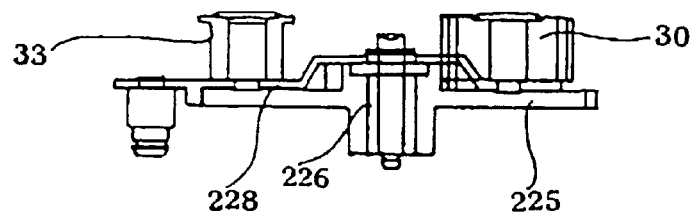

FIG. 22 is view showing one example of the disc loading apparatus having the disc clamping device. Specially, FIG. 22A is a plan view of the disc loading apparatus and FIG. 22B is a front view before disc clamping, i.e., the disc inserted state in the initial loading step. The clamp assembly 232 of the clamping device is chucked to the holder 236 of the clamper catches 42L, 42R at the central region of the base plate 20, the fingers 223L, 223R of the first and second carriers 26L, 26R are positioned at the lower part of the base plate 20. That is, the fingers 223L, 223R are perfectively separated from the clamper catches 42L, 42R.

Figure 24A:
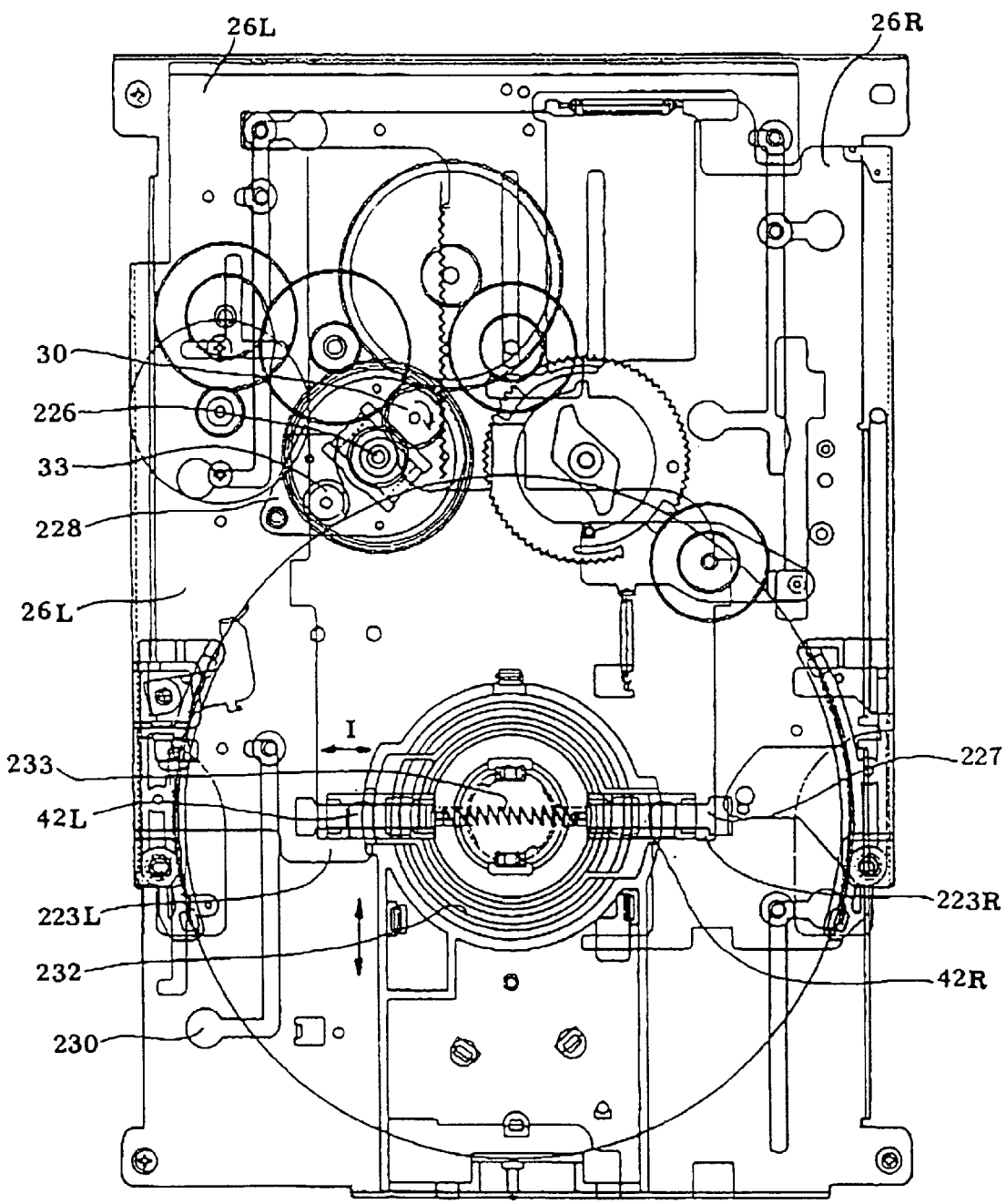
FIGS. 24A and 24B are a plan view and a front view indicating the clamping state of the clamping device.
Figure 24B:
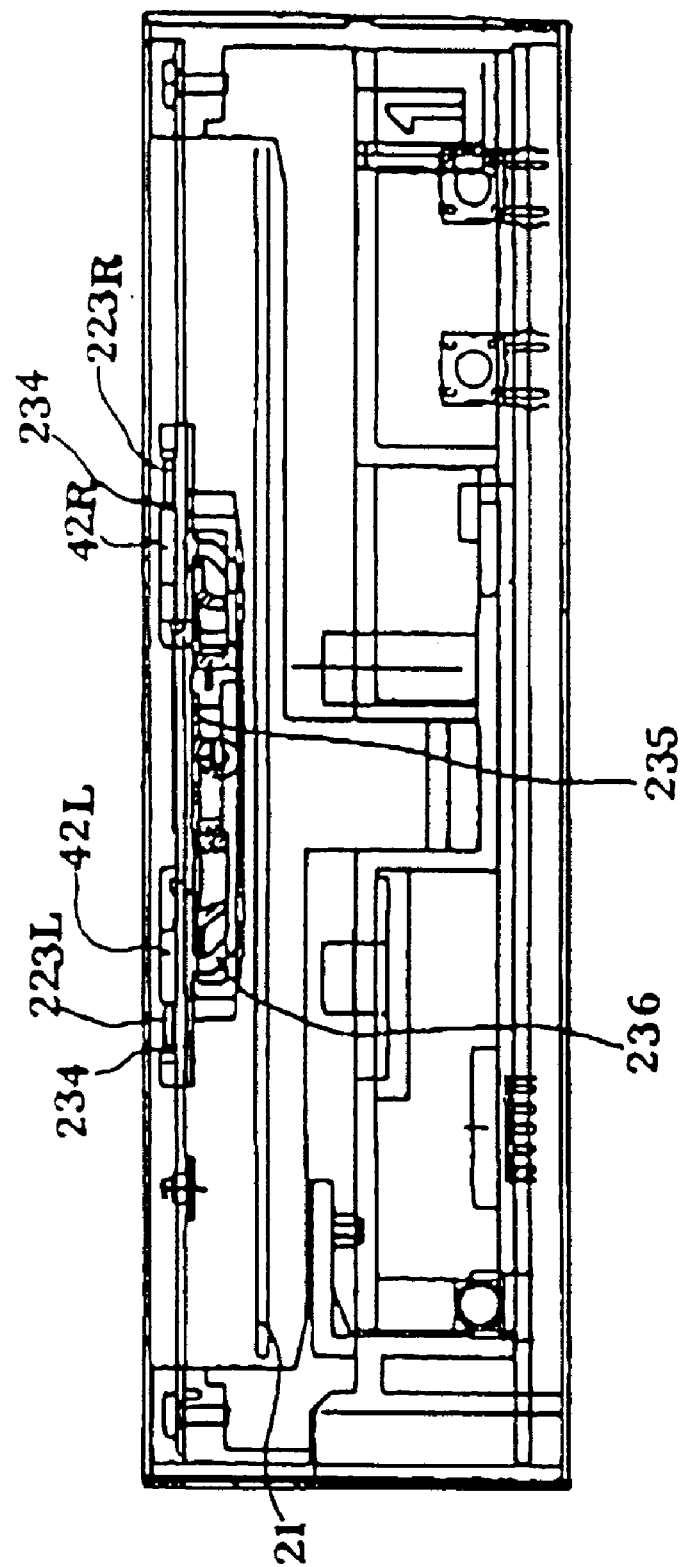

FIG. 24 indicates the loading step before the loading is finished. In this step, the disc is centering in the clamp assembly 232, but the clamp assembly 232 is chucked to the holder 236. Accordingly this step means the clamping waiting state.

In the clamping waiting state, however, the ends of the fingers 223L, 223R enter the guide groove 234 of the clamper catches 42L, 42R because the first and second carriers 26L, 26R are loaded to the longitudinal end of the rail 230 having movable variation by the rotation of the planetary gear. Further, the clamper catches 42L, 42R if there is the movement of the fingers. 223L,223R in the I-direction.

Figure 26A:
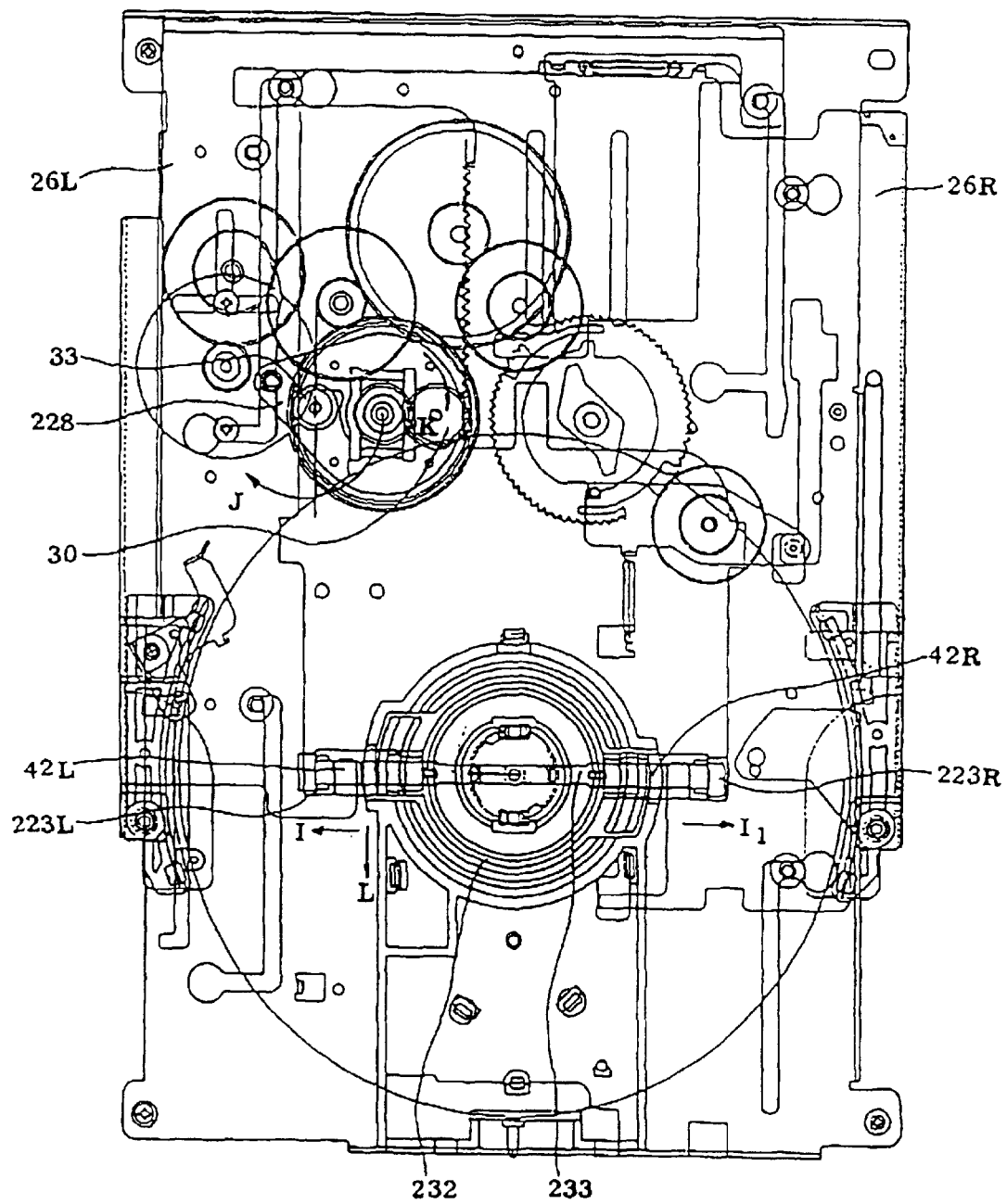
Figure 28:
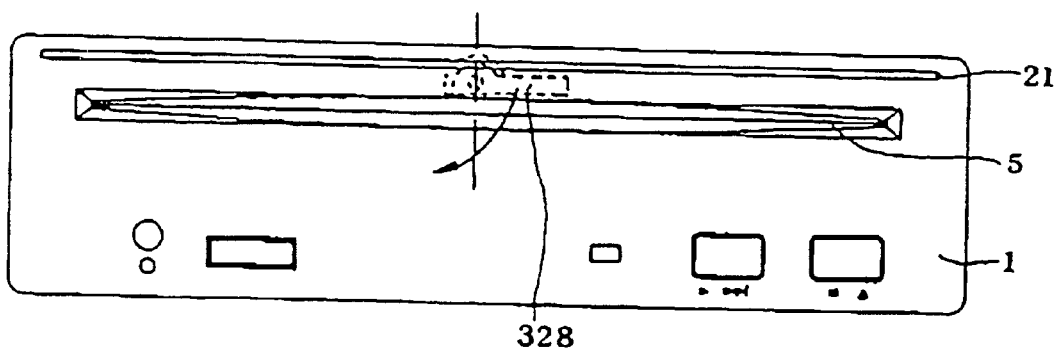
FIG. 28 is a front view of the disc multi-insertion preventing device-mounted housing according to the present invention.

FIG. 26 is a view showing the driving state of the clamper catches 42L,42R and the pick-up base 237 caused by the movement of the first and second carriers 26L,26R. This state corresponds to the disc clamping, the finished state of the disc loading.

In the above disc clamping step, the roller 33 combined with the rotating plate 228 of the planetary gear is moving in the J-direction to push the first carrier 26L in the A-direction. The second carrier 26R is also pushed in the I1-direction by the movement of the gear 30 during the moving gear 30 combined with the rotating plate 228 is moving in the K-direction. As result, the first and second carriers 26L,26R are respectively split in the I and I1 direction.

At that time, the fingers 223L,223R of the first and second carriers 26L,26R is already set in the guiding groove 234 of the clamper catches 42L,42R. Thus, the fingers 223L,223R are moving along the longitudinal rail 230 in the I and I1 directions within the movable range by the longitudinal force of the first and second carriers 26L,26R to move the clamper catches 42L,42R, so that the clamp assembly is released from the holder 236. Further, since the disc 21 is released by the split of the the first and second carriers 26L,26R, the clamp assembly 232 is moving down to the disc 21. At the same time, the turntable 231 of the pick-up base 237 is moving up to chuck the disc, so that the clamping of the disc is finished and the disc is rotated.

As the above disc set state is the same that of FIG. 26, this is rotatable mode of the disc. In the ejecting mode, further, the pick-up base 237 is moving down to separate the turntable from the clamp assemble 232 and then the clamp assembly 232 is again chucked to the clamper catches 42L,42R, as the reverse steps of the loading mode. In this mode, the clamper catches 42L,42R are operated by the operation of the first and second carriers 26L,26R.

The rotating plate 228 of the planetary gear is rotated by the first and second carriers 26L,26R. By the rotation of the rotating plate 228, the pressure to the first and second carriers 26L,26R is removed and the first and second carriers 26L,26R are moving in the L-direction, so that the first and second carriers 26L,26R are left from the guiding groove 234 of the clamper catches 42L,42R. At that time, the clamper catches 42L,42R are contracted in the opposite directions of the I and I1 directions by the restoring force of the elastic member 233 and then the interval beteen both holder 236 is also contracted to restrict the clamp assembly 232 and release the clamping of the disc.

The following is the description of the disc multi-insertion intercepting device as shown in FIGS. 28–32B.

The intercepting device comprises the second carrier 26R operately connected with the driving unit 421, the finger 326 mounted at the end of the second carrier 26R, a moving body 327 to be moved by the dynamic movement of the finger 326 contacted with it, and a protector 328 mounted at the periphery of the entrance of the disc port 5 which is operated by the movement of the moving body 327.

The moving body 327 is fixed by a hinge boss 329 of a clamp cover 336 and contacted with the finger 326 to form the moving contact point 330. Under the moving body 327, a gear 331 is mounted to rotate the contacted object by receiving the movement of the moving body 327 through the moving contact point 330.

The moving range of the moving contact point 330 is determined by forming the guiding groove 332 in the base plate 20. A elastic member 333 is mounted in the clamp cover 333 to pull the end of the moving body 327 when the force is not applied to the moving point 330.

One end of protector 328 is rotatably inserted into the boss 334 of the clamp cover 336 at the inner side of the entrance of the disc port 5. In the other end, the gear receiving the turning effect from the gear 331 of the moving body 327 is mounted.

Figure 29B:
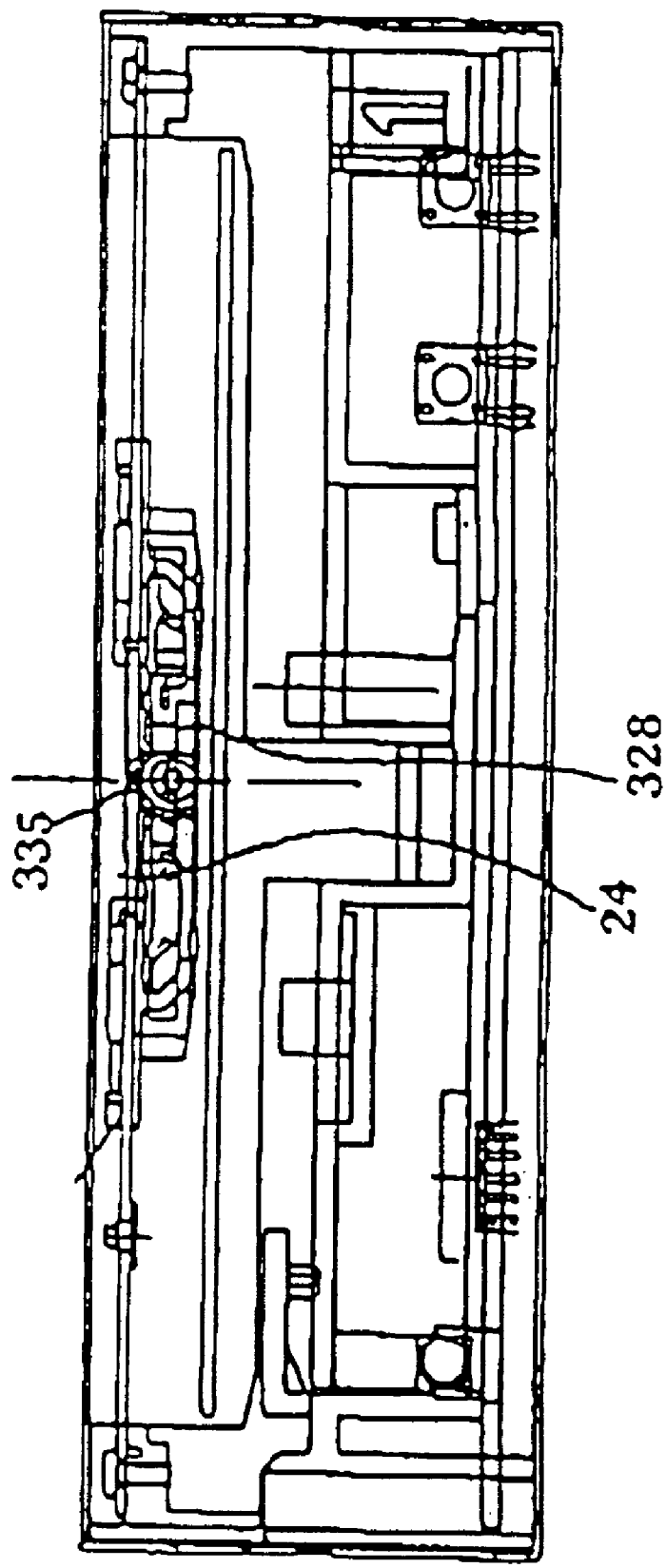

As shown in FIG. 29, the intercepting device of the present invention includes the finger mounted at the end of the second carrier 26R moving along the base plate 20, so that the multi-insertion of the disc through the disc port 5 is mechanically prevented for loading/unloading modes. In the intercepting device, at that time, the protector 328 is horizontally positioned in a row not to shield the disc port 3, so that disc can be inserted.

Figure 30A:
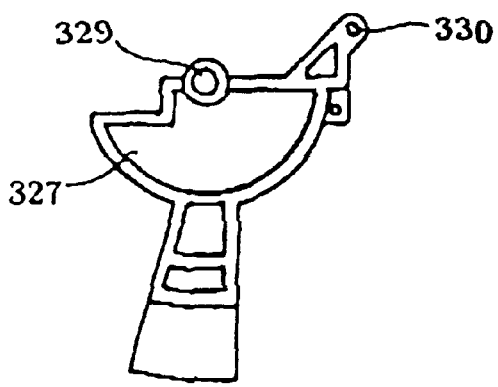
FIGS. 30A, 30B, and 30C are a plan view, a lower side view, and a side view of the disc multi-insertion intercepting device.
Figure 30B:
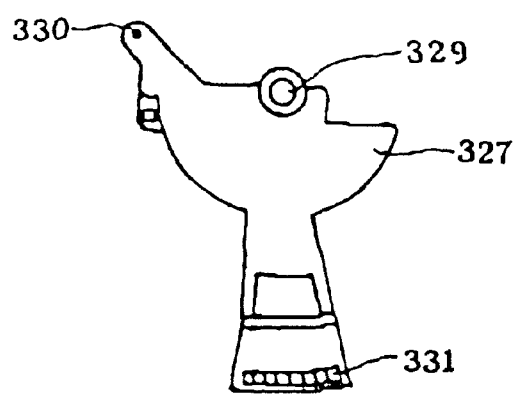
Figure 30C:
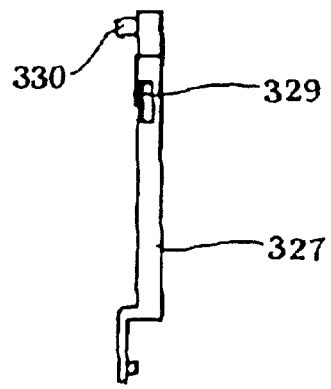

FIGS. 30A, 30B, and 30C are detailed views of the moving body 327. As shown in figures, the moving body 327 having the moving contact point 330 projected from its end is moving in the guiding groove 332 of the base plate 20 by the force of the finger 326, so that the protector 328 is turned around the boss 334 by receiving the turning effect through the gear 335 of the protector 328 to be contact object by the gear 331 at the end of the moving body 327.

Figure 31A:
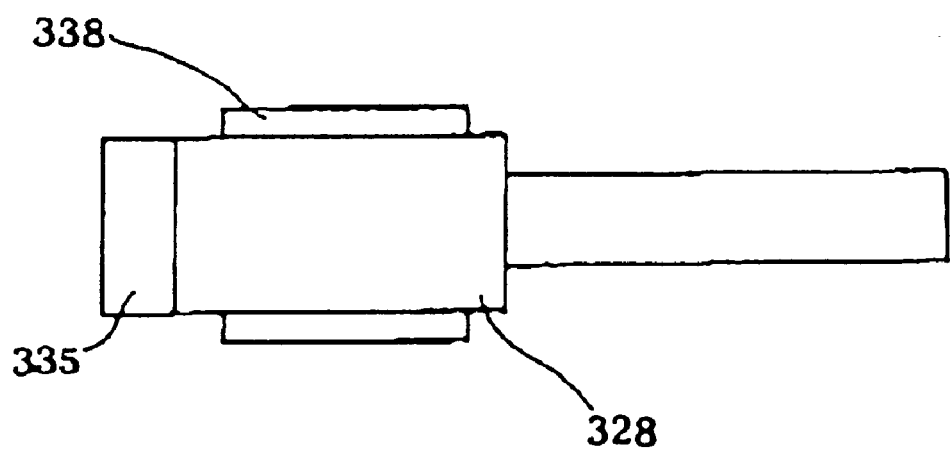
FIGS 31A and 31B are a plan view and a front view showing the shape of the protector of the intercepting device.
Figure 31B:
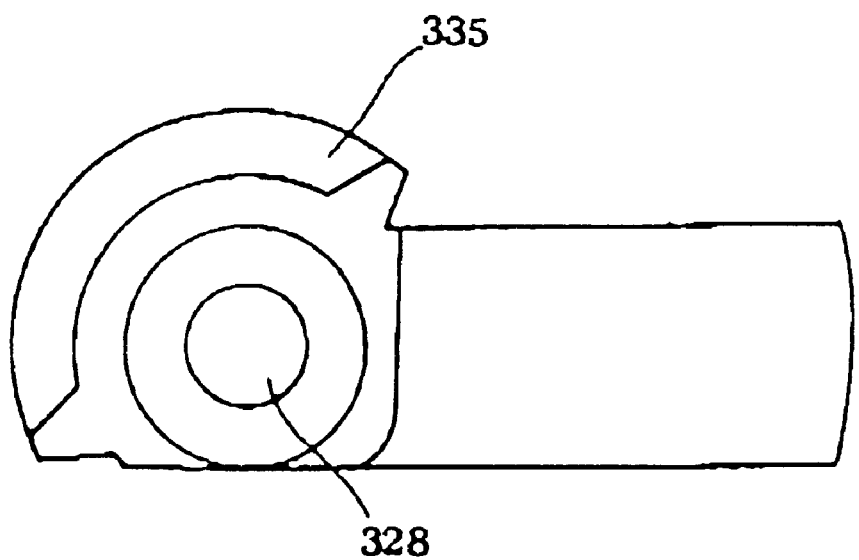

FIGS. 31A and 31B are detailed views of the protector 328. As shown in figures, the protector 327 includes the gear 335 engaged with the gear 331 of the moving body 327 at its outer peripheral and a boss housing 338 for guiding the boss 334. FIG. 32 indicates the disc-loaded state.

Figure 32A:
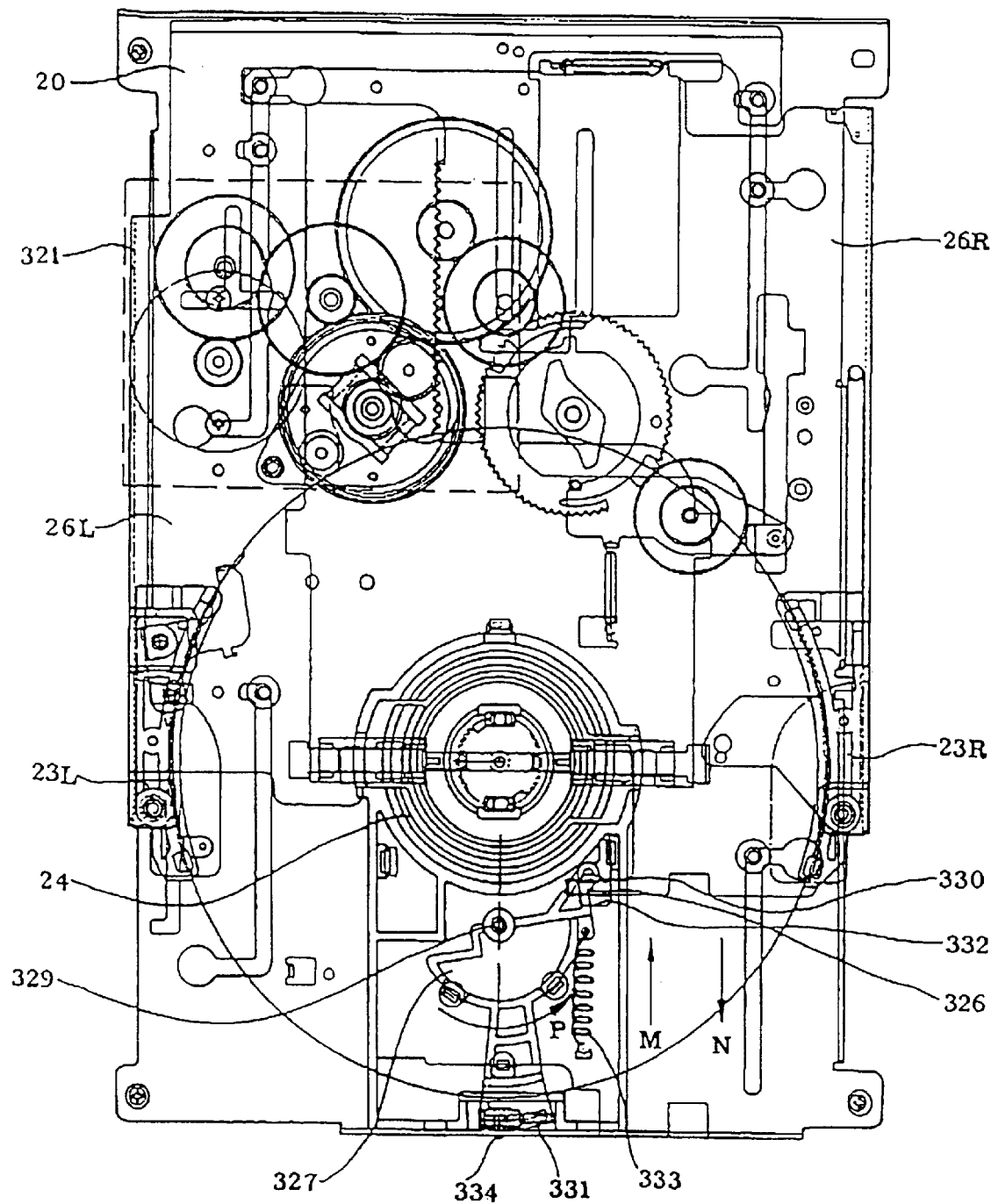
FIGS. 32A and 32B are a plan view and a front view showing the loaded state of the disc loading apparatus.
Figure 32B:
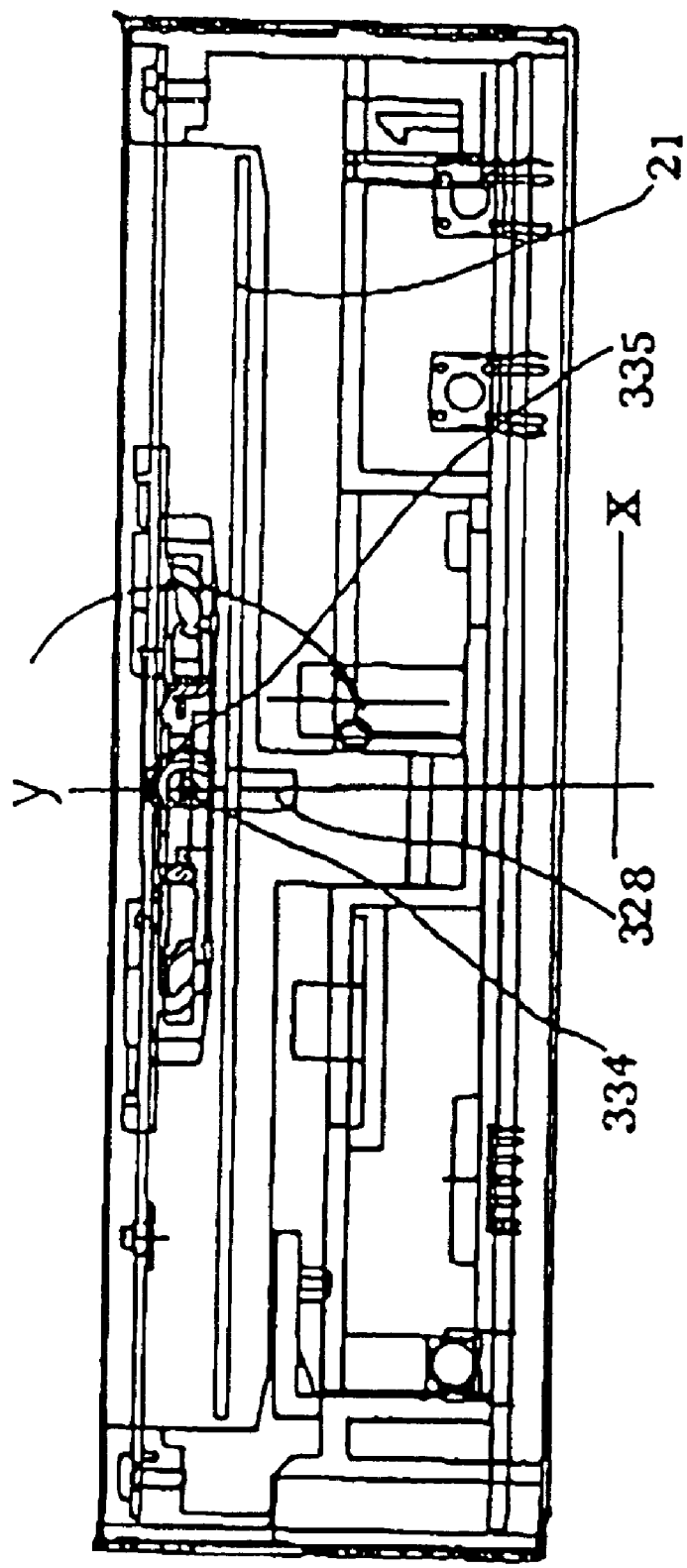

In this embodiment, the disc multi-insertion intercepting device is operately connected with the second carrier 26R in the load step. The loading step, from the initial state of FIG. 29A to finish state of FIG. 32A, is proceeded during the second carrier 26R is sliding in the M-direction along the plate 20. At that time, finger 326 of the second carrier 26R pushes the moving contact point 330 in the M-direction, i.e., the operation direction of the second carrier 26R. By the figner 326, the moving body 327 is turned around the hinge 329 in the P-direction overcoming the elastic force of the elastic member 333. At that time, the gear 335 of the protector 328 engaged with the gear 331 of the moving body 327 is rotated around the boss 334 in the O-direction by the power, so that the protector 328 is positioned in approximate row of the y-axis, as shown in FIG. 32B. As shown above, the protector 328 intercepts the entrance of the disc port 5, so that disc is not reinserted in the player through the disc port 5.

For ejecting mode, in the other hand, the first and second carriers 26L,26R are again moving in the N-direction to eject the disc. At that time, the restriction force of the moving contact point 330 by the finger 326 is released and then the moving object 327 is restored at the position shown in FIG. 29A around the hinge 329 by the elastic force of the elastic member 333. In this process, the protector 328 is returned by the gear 331 to arrange the protector 328 and the entrance of the disc port 5 in row of the x-axis.

The disc ejecting device and the driving cam of the present invention are described accompanying with FIGS. 33–42, as follow.

The ejecting device comprises the driving unit, the power converting gear unit intermittently engaged with the driving unit to transmit the power an object for driving mode, the eject lever unit for engaging with the gear unit and operating the holding device, and the connecting member for connecting the gear unit and the eject lever unit to transmit intermittently the power of the driving unit to the eject lever unit. The driving cam 39 is connected to the ejecting device to transmit the converted power of the driving unit to the disc ejecting device.

The power converting gear unit comprises the loading motor 29, the first gear unit 429 operately connected with the loading motor 29 to operate the second carrier 26R, the first gear unit including the stay gear 31 having moving gear 30, and the second gear unit 429 matched with the first gear unit 429 for the disc eject driving mode. Further, the power converting gear unit includes the driving cam 30 intermittently engaged with the first gear unit 429 and the driven gear 37 engaged with the driving cam 39. The driven gear 37 comprises the first gear 432 engaged with the driving cam 39 and the second gear 433 for transmitting the power of the first gear 432 to the ejecting lever 38.

The driven gear 37 makes the larger turning radius of the first gear 432 than that of the second gear 433 and connected to the driving cam 39. The second gear 433 is engaged with the rack 40 of the ejecting lever 38.

The ejecting lever unit comprises the ejecting lever 38 having rack 40 receiving the power of the driven gear 37 and the ejecting lever holder 435 for setting the ejecting lever 38 having predetermined path in the base plate 20. The regulator of the ejecting device is mounted in the ejecting lever holder 435. The regulator forms the track 436 at the end of the ejecting lever holder 435 and the projection 437 at the holding device 23R. The projection 437 is inserted into the ejecting lever holder 435, so that the rotation of the holding device 23R is controlled according to the position of the ejecting lever holder 435.

Figure 37:
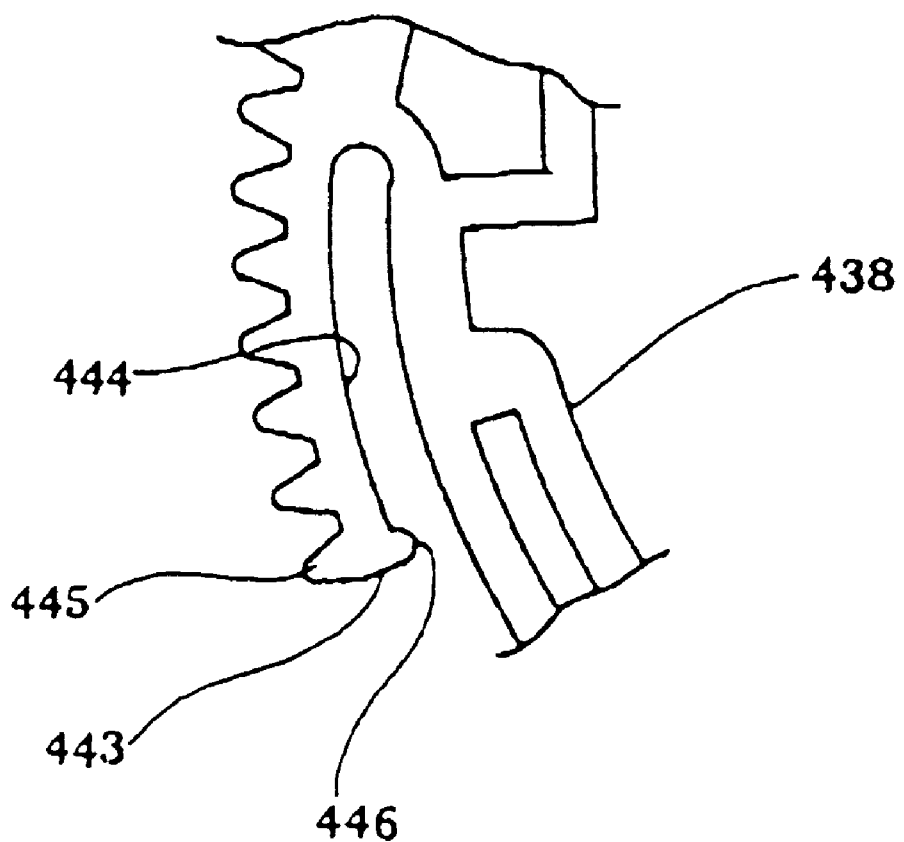
FIG. 37 is a detailed view of the Q unit of the FIG. 36.

The fixing shaft of the end of the connecting member 439 fixing the driven gear 37 is positioned on the guiding groove of the base plate 20 and the fixing shaft 439A of the left end is hung in the cam curve 438 of the driving cam 39. The elastic member 440 is elastically supported in the base plate 20 to adhere the connecting member 439 to the driving cam 39.

as shown in FIGS. 36 and 37, the driving cam 39, which converts the power with the cam curve to transmit the power of the driving unit of the loading apparatus to the first and second carriers 26L,26R and the ejecting device, includes the power losing region 442 into which the power is not transmitted and the gear contact portion 443 which begins to be transmitted the power into the driven gear 37 if necessary. Inner side of the contact portion 443 guiding the engagement of the driving unit and driven gear 37, the expansion space 444 and embossing 446 restricting the expansible variation are formed. The contact portion 443 has a slope 445 at its end. Further, the power losing region 442 is formed out of phase of 180° in the standard of central shaft 447, so that the power of the driving cam 39 is transmitted to the driving unit through the connecting member 439 without cut-off.

The ejecting lever 38 of the ejecting device includes rack 40 and a plurality of hook 448, as shown in FIG. 34.

Accordingly, the ejecting lever 38 is elastically fixed to he stopper groove 449 and mounted in the base plate 20.

Figure 38:
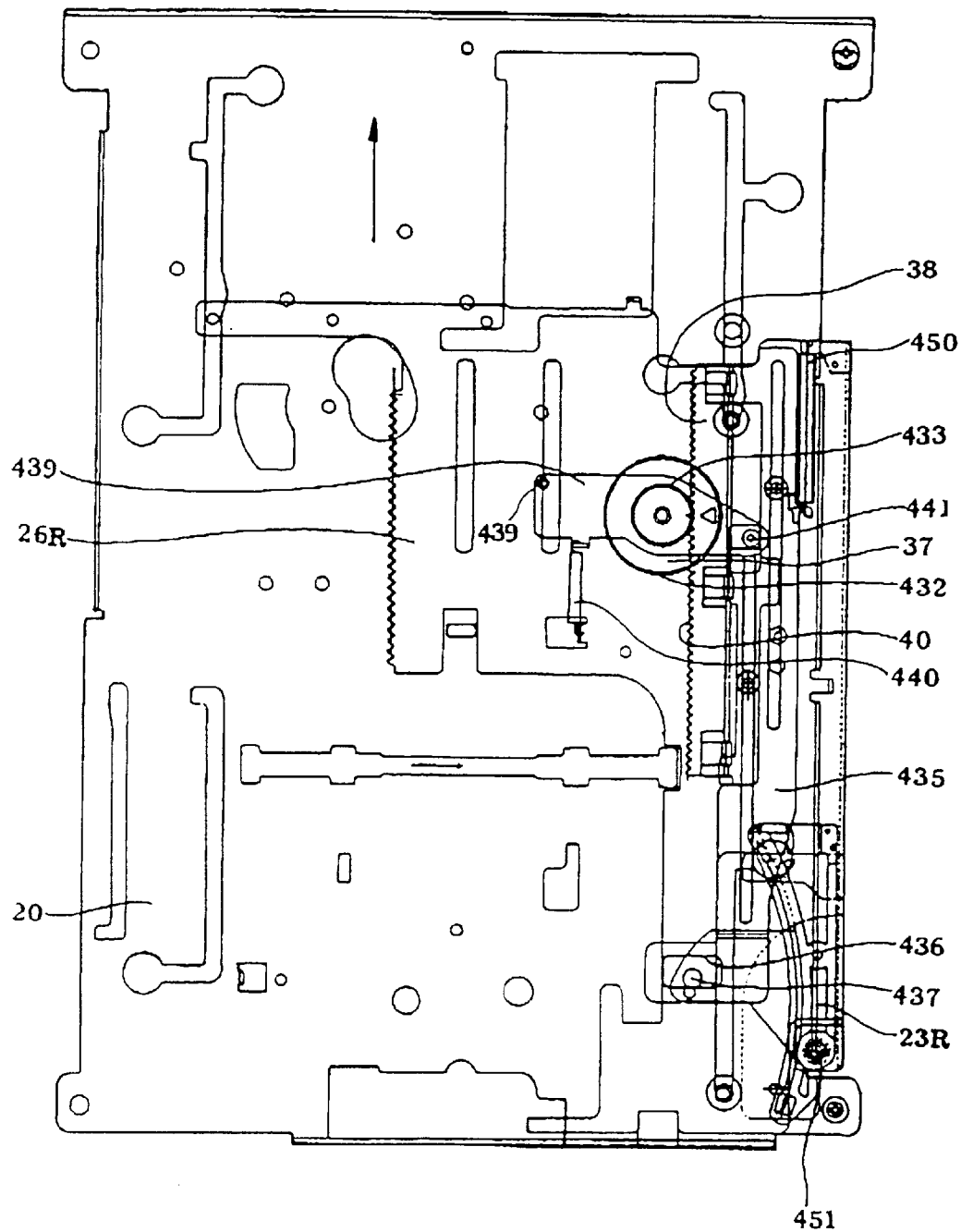
FIG. 38 is a view showing the initial assembling state of the ejecting device.

FIG. 38 is a view showing the initial assembling state of the ejecting device. As shown in figure, the ejecting lever 38 under the second carrier 26R is moving down for the finish of the eject. If the power is lost by the driving cam 39, the ejecting lever 38 is returned by the spring 450 at the right end of the ejecting lever holder. Further, the ejecting lever is relative to the holding device 23R.

Figure 39:
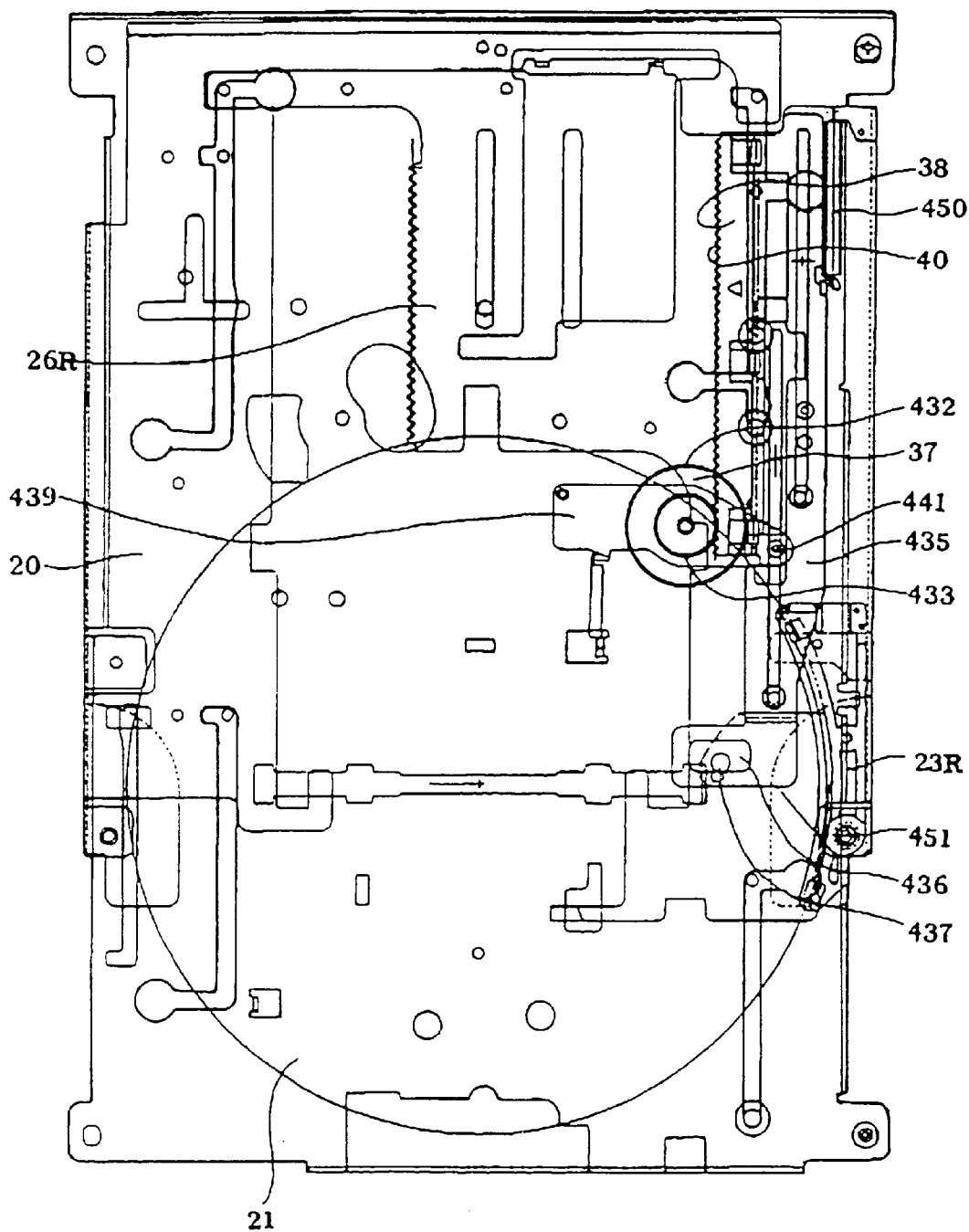
FIG. 39 is a view showing the operation of the disc loading in FIG. 38.
Figure 40:
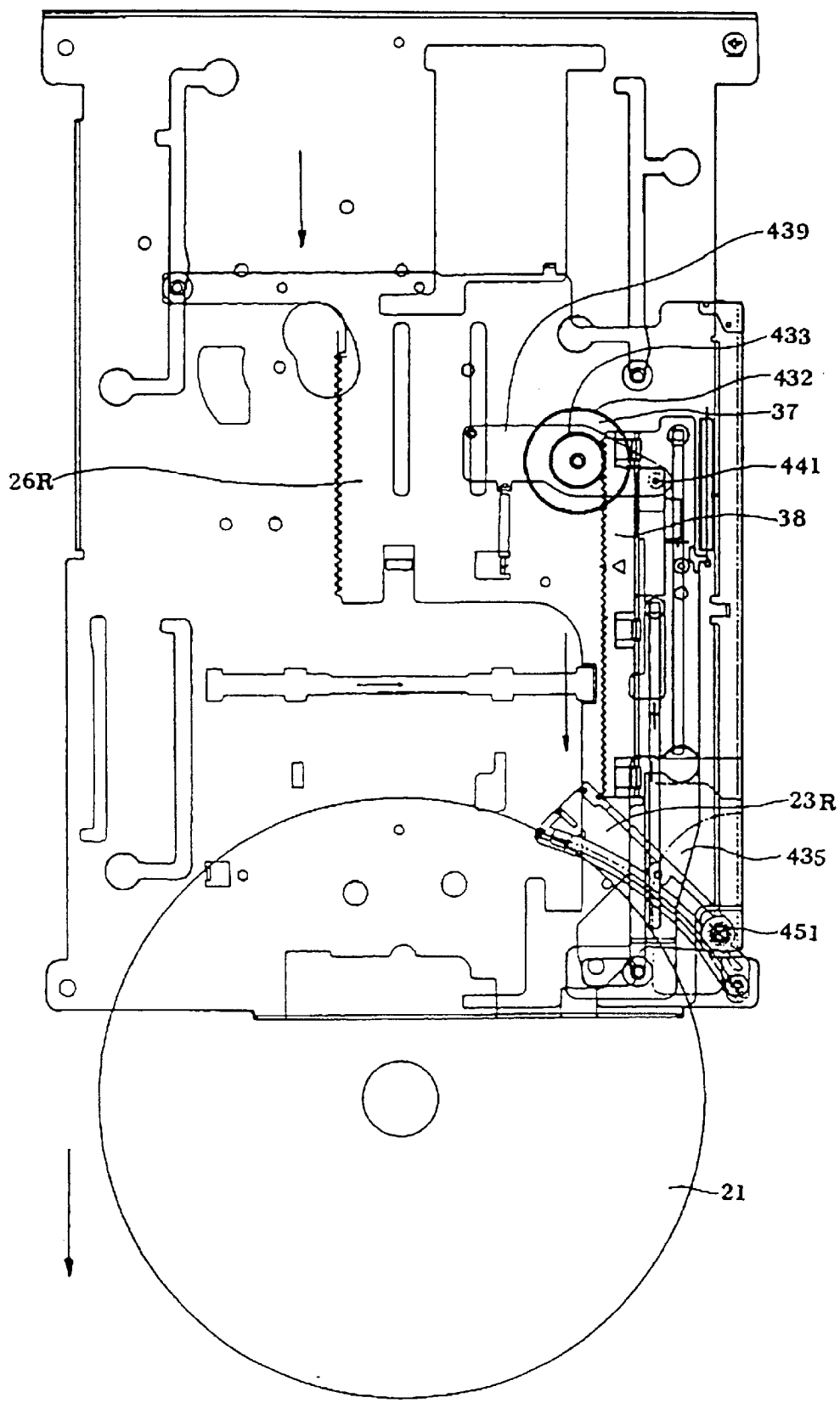
FIG. 40 is a view showing the ejected state of the disc by the ejecting device.
Figure 41:
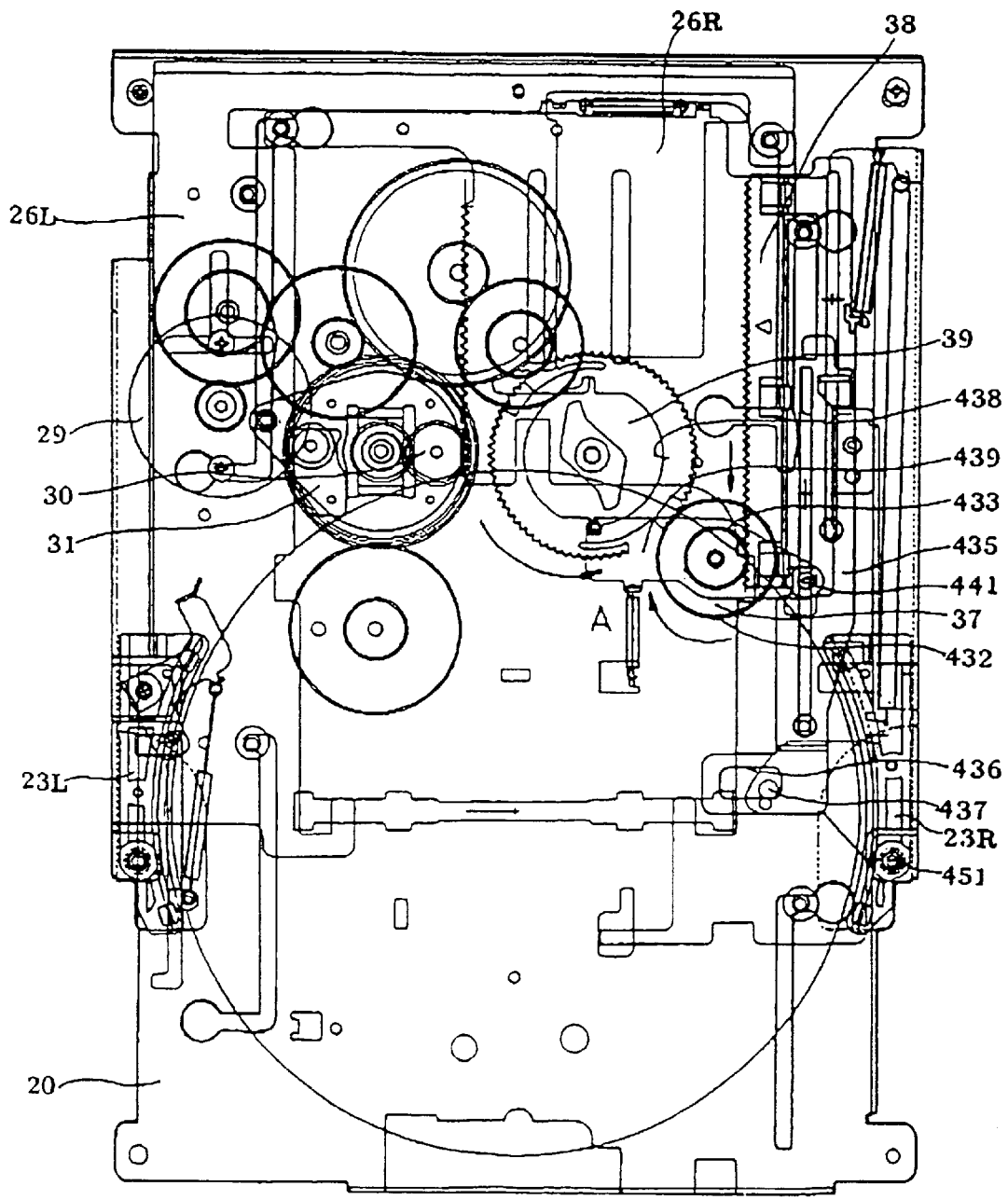
FIG. 41 is a view showing the loaded state of the disc.
Figure 42:
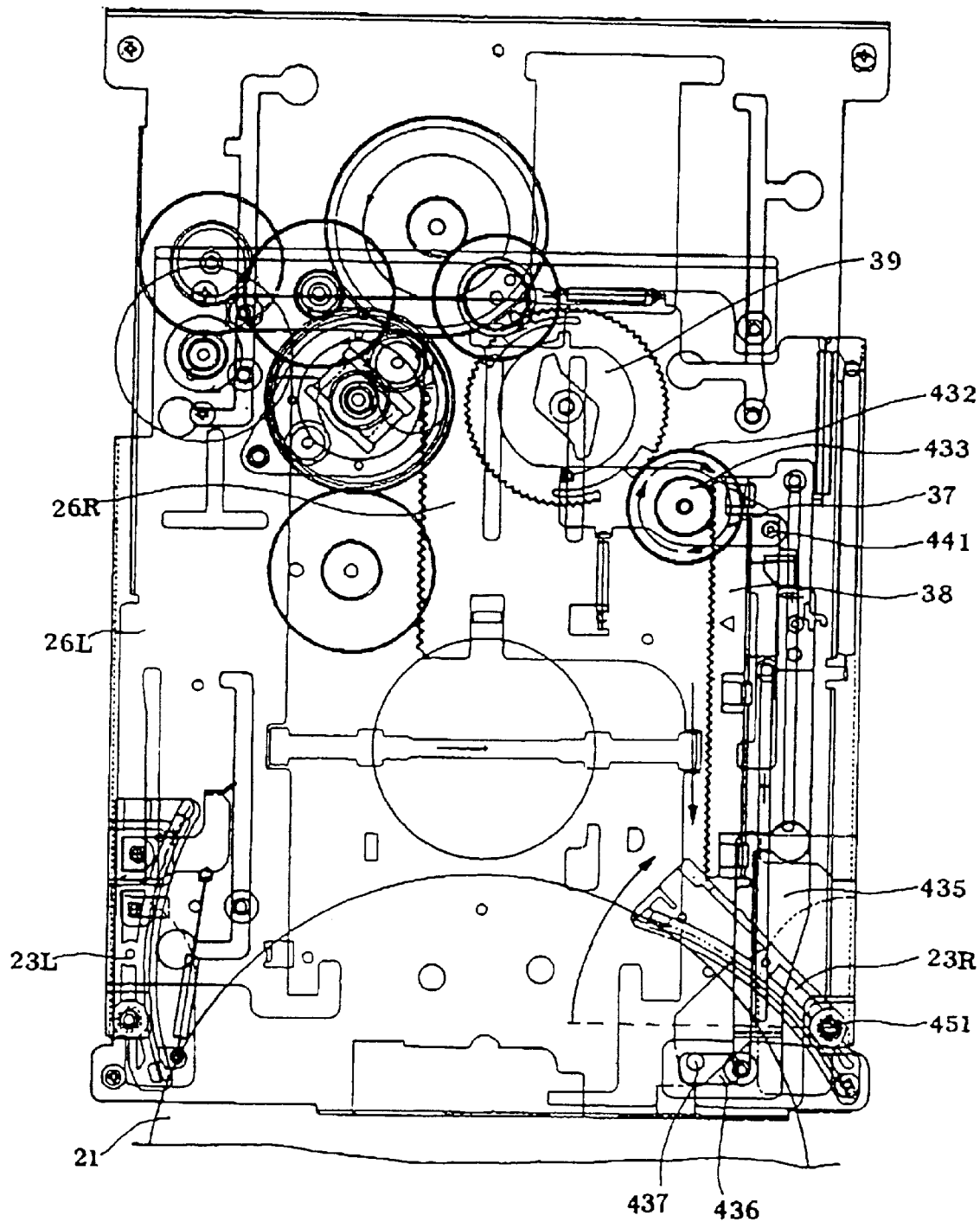
FIG. 42 is a view showing the ejected state of the disc.

FIG. 39 indicates the proceeding state after the loading of the disc and FIG. 40 indicates the finished state of the ejecting of the disc. Further, FIGS. 41 and 42 are views showing the finished state of the loading and the ejecting of the loading apparatus including the ejecting device and the driving cam, respectively.

As shown in FIG. 33, the ejecting device comprises driving cam 39, the driven gear 37 and the ejecting lever unit. The driving unit operates the second carrier 26R for loading and unloading of the disc by the loading motor 29 and the stay gear 31.

The second gear unit 430 matched with the first gear unit 429 is engaged with the driving unit for the ejecting mode to transmit the power to the ejecting device for the driving mode. The driving cam 39 engaged with the first gear unit 429 makes the rotation of the driven gear and this driven gear 39 transmits the turning effect to the ejecting lever 38 through the second gear 433. The ejecting lever unit operates the holding device 23R and the connecting member 439 converts and transmits the power to the ejecting lever unit according to the cam curve 438 of the driving cam 39.

That is, the fixing shaft 439A of the left end of the connecting member 439 is hung to the cam curve 438 and the fixing shaft 441 of the right end is positioned on the guiding groove of the base plate 20, so that the connecting member 39 is rotated counterclockwise when the elastic plate 452 fixed in the first carrier 26R is moving down in the direction indicated as a arrow to push the fixing shaft 441 of the right end. At that time, as shown in FIG. 33, the fixing shaft 439 of the left end pushes the threshold unit 453 of the driving cam 39, so that the driving cam 39 is rotating counterclockwise and the gear contact portion 443 is connected to the gear. When the driving cam 39 is rotating, the gear contact portion 443 out of phase of 180° makes the rotation of the driven gear 37 to transmit the power to the ejecting lever.

When the second carrier 26R is continuously moving down after the elastic plate 452 guides the fixing shaft 441 to the guiding groove of the base plate 20, the elastic plate 452 is also moving down. Thus, the fixing shaft 441 is released from the restriction, so that the elastic member 440 of the connecting member 439 is drawn to restore the connecting member 439, as shown in FIG. 38.

As described above, since the initial position of the fixing shaft 441 is on the guiding groove of the base plate 20, the upper space of the guiding groove is removed. Accordingly, when the second carrier 26R is moving up for loading mode of the second carrier 26R, the upper space remains in case where the elastic plate 452 is pushing the fixing shaft 441, so that the driving cam 39 cannot be rotated because the the fixing shaft 439A is able to push the threshold unit 454 of the driving cam 39.

The ejecting lever unit has the function as a regulator of the holding device 23R. As shown in FIG. 42, when the ejecting lever 38 is moving in the forward direction, the track 436 at the front end of the ejecting lever holder 435 is engaged with the projection 437 of the holding device 23R.

When the ejecting lever 435 is moving by the engagement of the ejecting lever holder 435 and the projection 437, the holding device 23R is rotating around the pin 451 and the disc is ejected from the disc port 5 by the transmission of the variation of the ejecting lever 435 to the holding device 23R. In case of the finished state of the loading, as shown in FIG. 41, the power of the driving unit is not applied to the driving cam 39 and accordingly the ejecting device is not operated. When the driving cam 39 is rotating counterclockwise, in the arrow direction, for the ejecting mode, the driven gear is rotating clockwise and the ejecting lever 38 is moving through the rack 40 of the ejecting lever 38.

FIG. 42 indicates the finished state of the disc ejecting. As shown in figure, the ejecting lever unit makes the turning of the holding device to push it. Further, the driven gear 37 is positioned in the power losing region 442 of the driving cam 39 and the power of the object which is 180° is broken out. Thus, the ejecting lever 38 is restored in the initial position shown in FIG. 33 by the spring 450 and the holding device is also restored.

Hereinafter, the deadlock removing device of the present invention will be described with FIGS. 43–46.

The deadlock removing device comprises the driving unit on the base plate 20 for transmitting the power to the loading plate and the ejecting device, the first driving member, having position restoring characteristics, for transmitting the dynamic variation to the object, which is mounted in the base plate 20, and the second driving member for converting the position variation of the first driving member into the turning effect to operate the driving unit for removing of the deadlock of the disc.

The first driving member comprises the finger plate 526 having the rack 525 transmitting the variation of the moving body to the contacted object along the base plate 20 and the contact portion 524 formed at the position corresponding to the operating groove 536 of the disc housing 1 and the elastic members 527,529 for elastically supporting the finger plate 526 to the base plate 20. The elastic members 527,529 include the controlling member for controlling the dynamic position of the finger plate 526.

The position controlling member of the finger plate 526 includes the slot 528 formed at the suitable position of the finger plate 526 and the regulator pin 529 projected from the base plate 20 and inserted into the slot 528 to restrict the moving range of the finger plate 526 in the length of the slot 528. In the one end of the slot 528, the refractive slot 530 is formed, so that the moving line is variable when the finger plate 526 is moving along the regulator pin 529.

The second driving member comprises the driven gear 531 combined with the front end slot 528a of the finger plate 526 and the rotating shaft variable unit for engaging or separating the driven gear 531 from the gear of the driving unit.

The driven gear 531 includes the first gear 532 fixed by the slot 528a and the pin 529a of the finger plate 526 and the second gear 533 internally contacted with the rack 525 of the finger plate 526 to rotate the first gear 532.

Figure 43A:
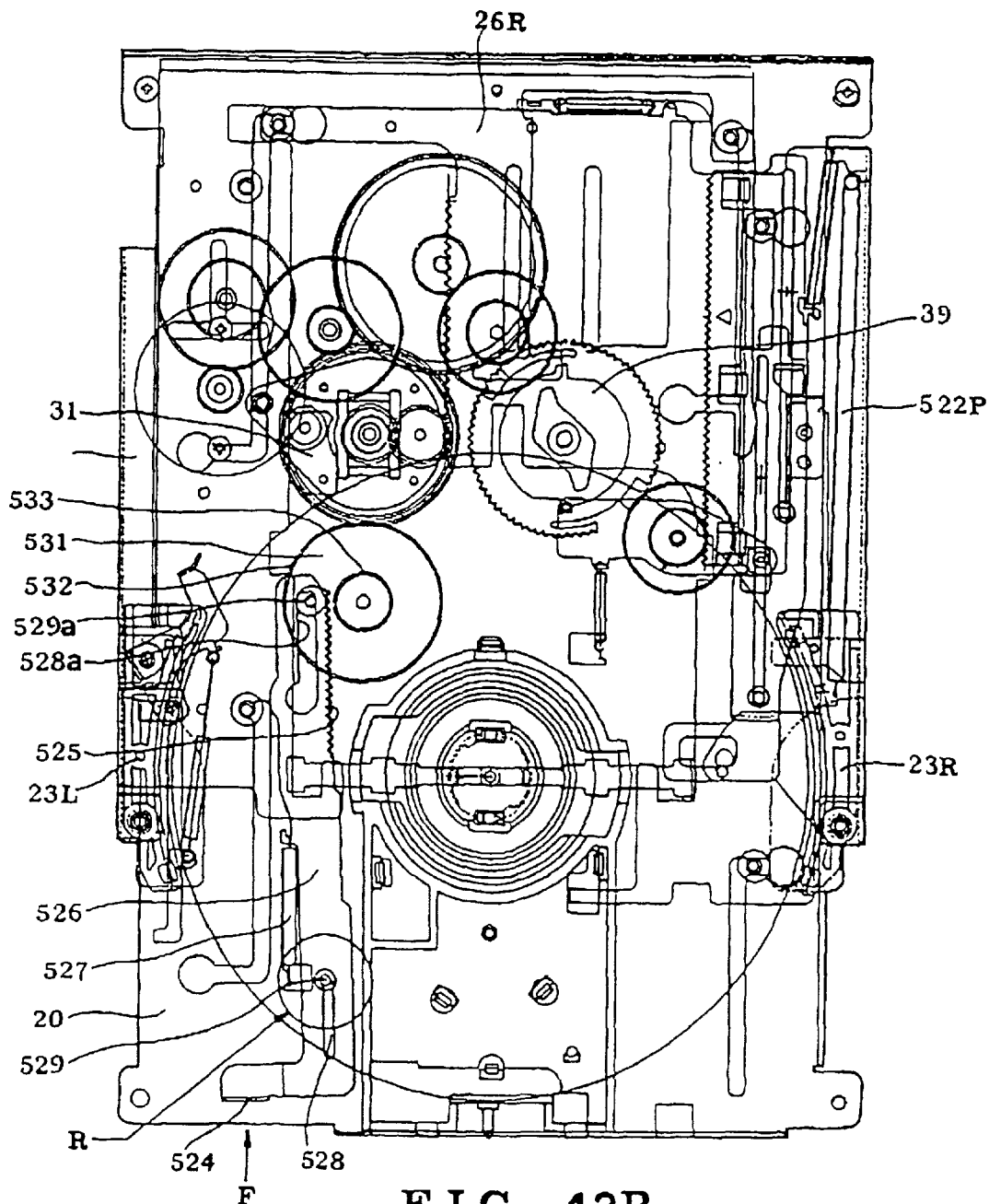
FIGS. 43A and 43B are a plan view and a front view of the disc deadlock removing device.
Figure 43B:
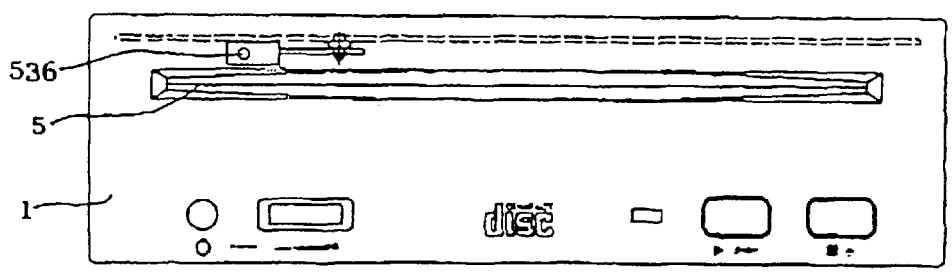

FIG. 43 indicate one example of the deadlock removing device-adapted loading apparatus. In particular, FIG. 43A indicates the example related to the loading apparatus and FIG. 43B indicates the example of the position of the driving unit.

In FIG. 43, the base plate 20, the first and second carriers 26L,26R, the driving unit, and the ejecting device are operately connected around the driving unit.

In the loading and ejecting modes, the movement of the first and second carriers 26L,26R are different in the base plate 20. This movement is executed by receiving the turning effect as a linear effect. As the stay gear 31 and the cam gear 39 is the part applying the power to the first carrier 26L, the second carrier 26R, and the ejecting device, these is engaged with driven object by the rack and pinion relationship to supply the power. Further, the power is applied to the driven object through the various path. For the operation process, if the driving unit is not engaged with the driven object perfectly or the rotating shaft is restricted by the impurities, the power transmitting system becomes abnormal. As a result, the mis-operation is generated. At that time, it is necessary to restore the mis-operation to the original operation by the removing the deadlock.

Figure 44A:
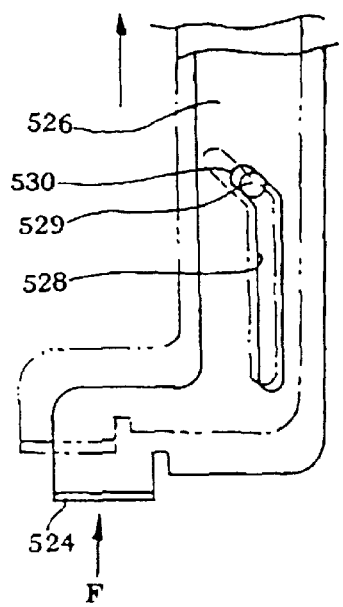
FIG. 44A is a view showing the movement of the driving member for the description of the operation of the deadlock removing device.
Figure 44B:
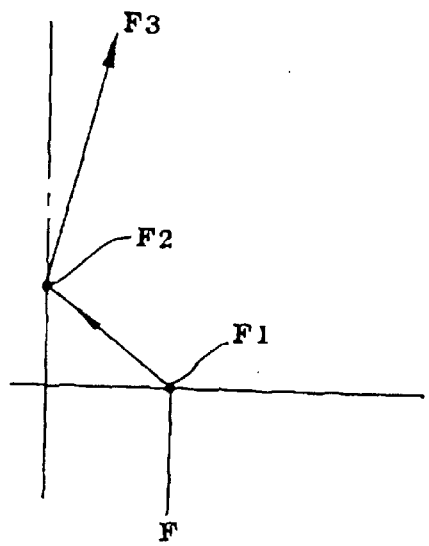
FIG. 44B is a operation diagram of the driving member.
Figure 44C:
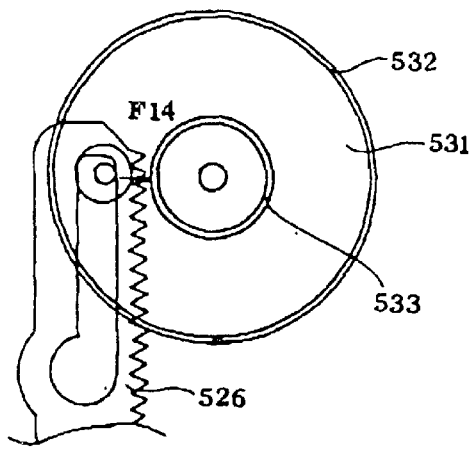
FIG. 44C is a view showing the connection of the gear of the driving member.

FIG. 44 indicates the variation of the first driving member for the external force F. When the external force F is applied to the contact portion 524 of the finger plate 526 as shown in FIG. 44A, the initial force F1 is applied to the slope of the refractive slot 530 inserted into the regulator pin 529. At that time, the finger plate 526 is deviating so much inclination by the refractive slot 530 and the mediate force F2 is again applied. Thereafter, the force F3 modifying the path is applied, so that the rack unit of the finger plate 526 is engaged with the driven gear 531 to rotating the driven gear 531, as shown in FIG. 44C. By the driven gear 531, the external force F is applied to the first gear 533 through the rack 525 and transmitted to the gear of the driving unit, so that the external turning effect is applied to the driving unit.

In the process that the external force F operating the driving unit is transmitted to the second driving member, the finger plate 526 transmits the force F3 to the first gear 533 through the rack 525, so that the engagement of the rack 525 and the first gear 533 is stabilized during the pin 529 is moving the outer side in the standard of the rack 525 by the force F3.

Figure 45:
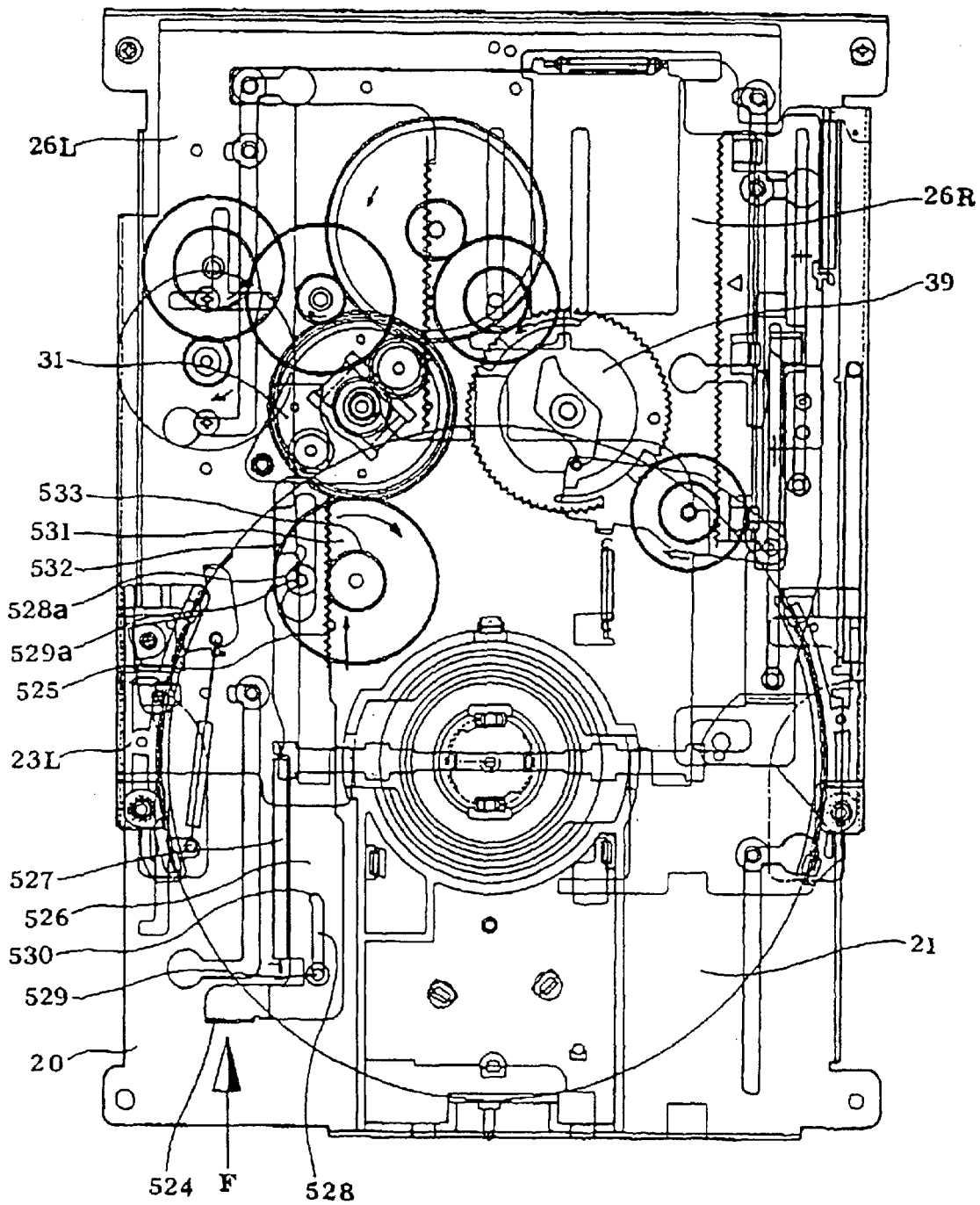
FIG. 45 is a plan view showing the operation of the deadlock removing device.

FIG. 45 is a view showing the loaded state of the loading apparatus. At that time, if the operation is stopped by the deadlock of the gear, the loading plate, and other elements, the external force is applied to the finger plate 526 through the operation groove 536 of the housing 1, so that the driven gear can be operated.

If the external force F is removed, the finger plate 526 is separated from the rack 526 and the first gear 533 by the spring 527, so that the finger plate 526 is restored at the position shown in FIG. 43 and then becomes operation waiting state. The external force can be applied for loading and unloading modes. Further, the finger plate 526 is moving in the base plate 20 by the position controlling member including the slots 528,528a in the moving range same as the length of the slots 528,528a. Further, the refractive slot 530 and the front end 528a are formed at one end of the finger plate 526, so that the moving line is variable when the finger plate 526 is moving along the regulator pins 529,529a, as shown in FIGS. 44B and 44C.

The second driving member does not affect the rotation of the driving unit in general because the rack of the finger plate 526 is engaged or separated from the gear of the driving unit according to the transmission of the power of the finger plate 526.

FIG. 46 indicates the disc ejected state. In this state, the finger plate 526 of the first driving member operates the driven gear 531 of the second driving member in case where the loading plate 526 is moving in the front direction.

The operation stabilizing device of the carrier will be described with FIGS. 47–50, as follow.

The present embodiment comprises the base plate 20, the tracks 622L,622R corresponding to the base plate 20, the first and second carriers 26L,26R inserted to the tracks 622L,622R, the carriers 26L,26R having a plurality of rollers 623a,623b to guide then in the tracks 622L,622R, the first deadlock removing member for removing the deadlock of the driving unit of the first and second carriers 26L,26R from the base plate 20, and the second deadlock removing member for removing the deadlock of the second carrier 26R.

The second deadlock removing member comprises the tracks 622L,622R for guiding the first and second carriers 26L,26R and the notch grooves 626L,626R formed on the extended line of the engagement position of the moving gear 30 of the driving unit and the rack 27 of the second carrier 26R. The rack 27 having slope at its front end is moving along the track 622R in the base plate 20 and internally contacted with the moving gear 30 of the driving unit.

The tracks 622L,622R guide the carriers 26L,26R in the base plate 20. The rollers 623a,623b to be inserted into the tracks 622L,622R are mounted in the base plate 20.

The moving gear 30 is inserted into the track 30 mounted in the base plate 20 and engaged with the rack 27 of the second carrier 26R within the range of the track 34. The moving gear 30 and the stay gear 31 include the rotor 32, the stay gear 31 is operately connected with the loading motor by the engagement with a plurality of gear. Further, the stay gear 31 has the central gear in the its coaxial shaft to supply the turning effect to the moving gear 30. The central gear is internally contacted with the rack 27 of the second carrier 26R along the track 34 independent upon the variation of the first carrier 26R. In the driving unit, the cam gear 39 is mounted to operate the eject lever 38 intermittently according to the mode.

Since the first and second carriers 26L,26R moving in the base plate 20 conveys the disc, the rollers 623a, 623b must be fixed in the tracks 622L,622R of the base plate 20 for the sliding contact between the carriers 26L,26R and the base plate 20. By this sliding contact, the carriers 26L,26R are smoothly moving in the base plate 20.

Further, the carriers 26L,26R are simultaneously set on the base plate 20 and split each other according to the executive mode. Since the tracks 622L,622R have space hole 634, the carriers 26L,26R are guided and the rollers 622L,622R are set.

In this embodiment, since the deadlock removing members are mounted in the rack of the second carrier 26R and the tracks 622L,622R of the base plate 20, the external force is not needed.

FIG. 47 is view showing one example of the rounded notch grooves 626L,626R in the tracks 622L,622R of the base plate 20 and the slope 627 for removing the deadlock formed in the first and second carriers 26L,26R.

The notch grooves 626L,626R in the track of the base plate 20 are set after due consideration of the dynamic characteristics of the carriers 26L,26R, as shown in FIGS. 49 and 50. The front end slope 627 of the rack 27 has a shape corresponding to the case where the moving gear 30 is spur gear.

If the teeth shape of the moving gear is varied, the sectional shape of the rack 27 must also be varied, so that the teeth P of the moving gear is coincided with the rack 27 to prevent the driving lose.

Hereinafter, the pick-up and down device will be described with FIGS. 51–60.

As shown in FIGS. 51–55, the pick-up and down device comprises driving unit, the rotor 35 mounted in the gear unit of the driving unit to be rotating with predetermined turning radius for the executive mode and operately connected with the driving unit, the timing connecting rod 725 for expanding the dynamic variation of the rotor 35 to apply this variation to the driven objec, the pick-up base for converting the movement of the rod 725 into the rotation to operate the pick up base 726, which is connected to the rod 725, and connecting member for moving up and down the pick-up base 726 by the dynamic movement of the pick-up base.

Figure 51A:
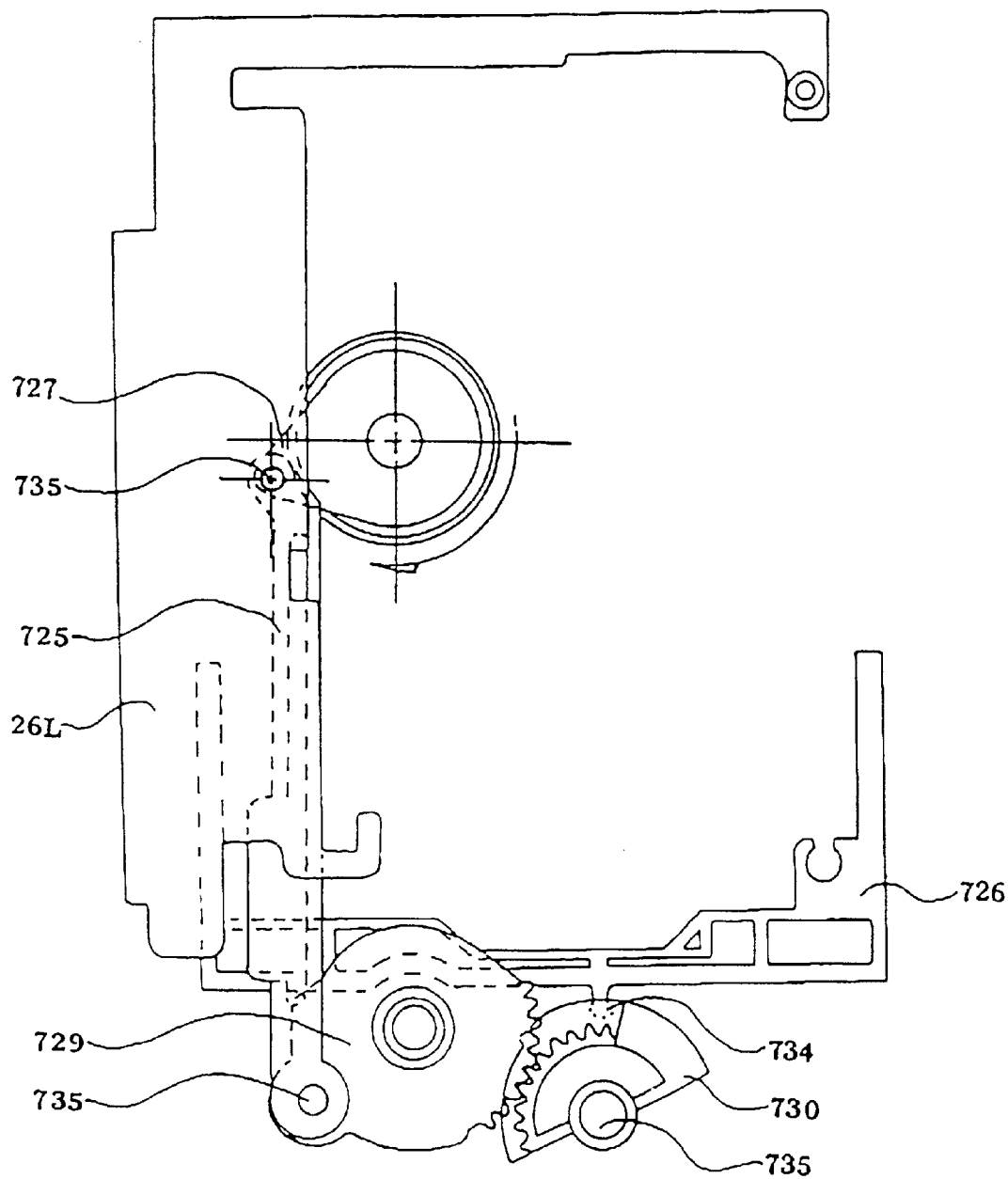
Figure 52A:
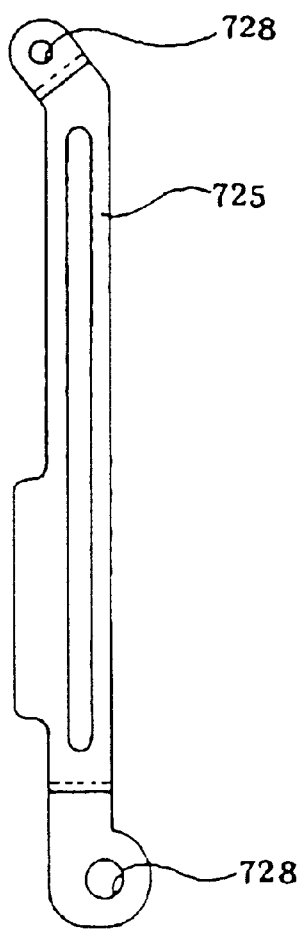
FIGS. 52A and 52B are a plan view and a side view showing the shape of the connecting rod of the up/down device.
Figure 52B:
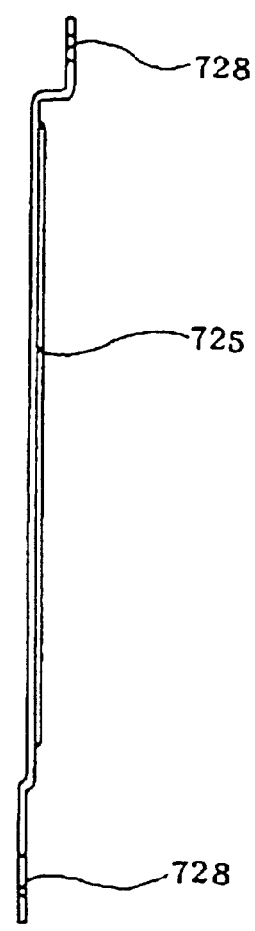

The rotor 35 includes the finger 727 having the pin to variably transmit the turning effect of the driving unit to the contact object, as shown in FIG. 51A. The rotor 35 is operated in the disc centering step. At both ends of the timing connecting rod 725, as shown in FIG. 52, the hinge 728 is formed. The hinge 728 at the front end is mounted in the finger 727 of the rotor 35 and the hinge 728 of the rear end is mounted in the hinge shaft 75 of the timing gear 729.

Figure 57A:
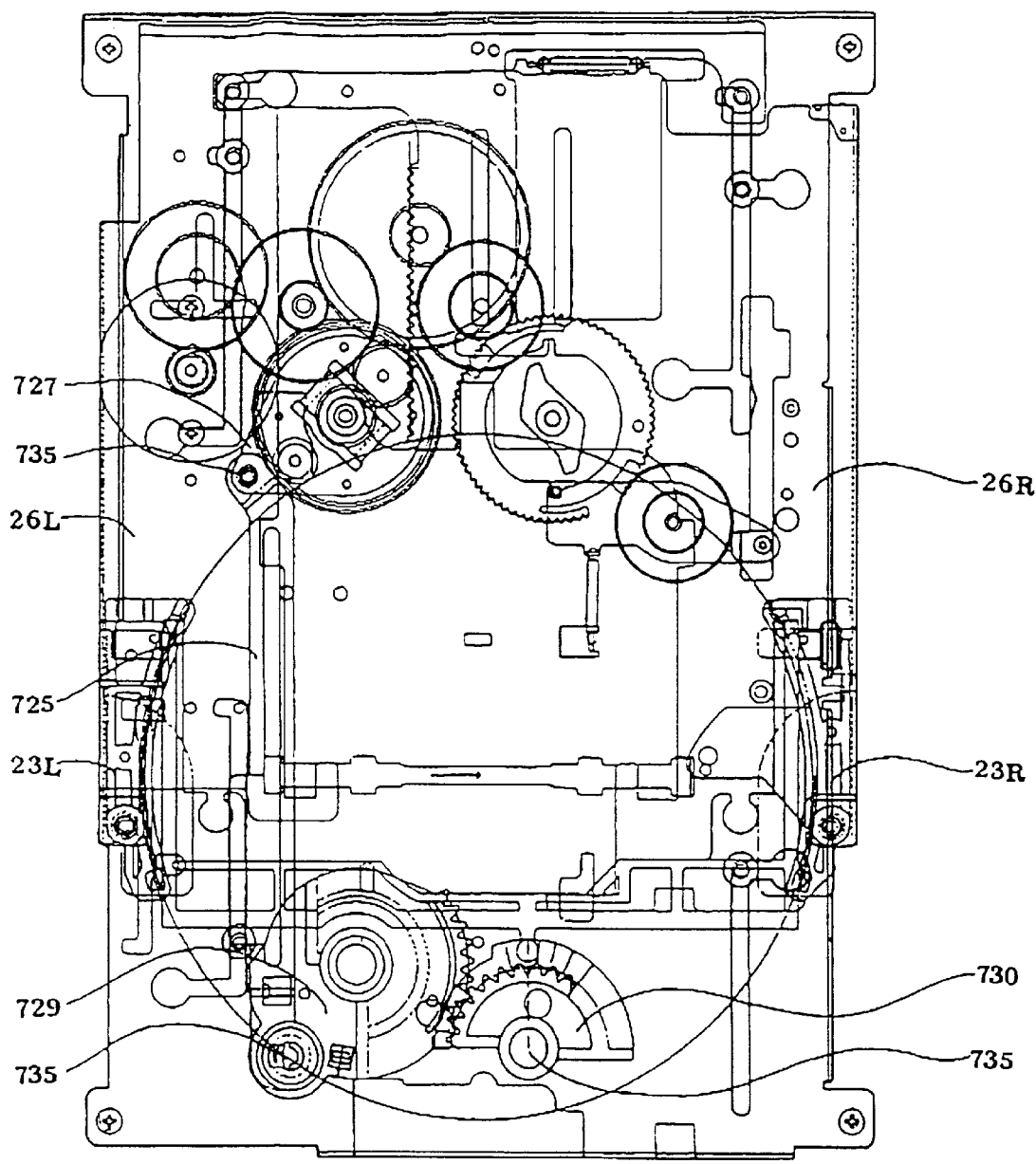
Figure 57B:
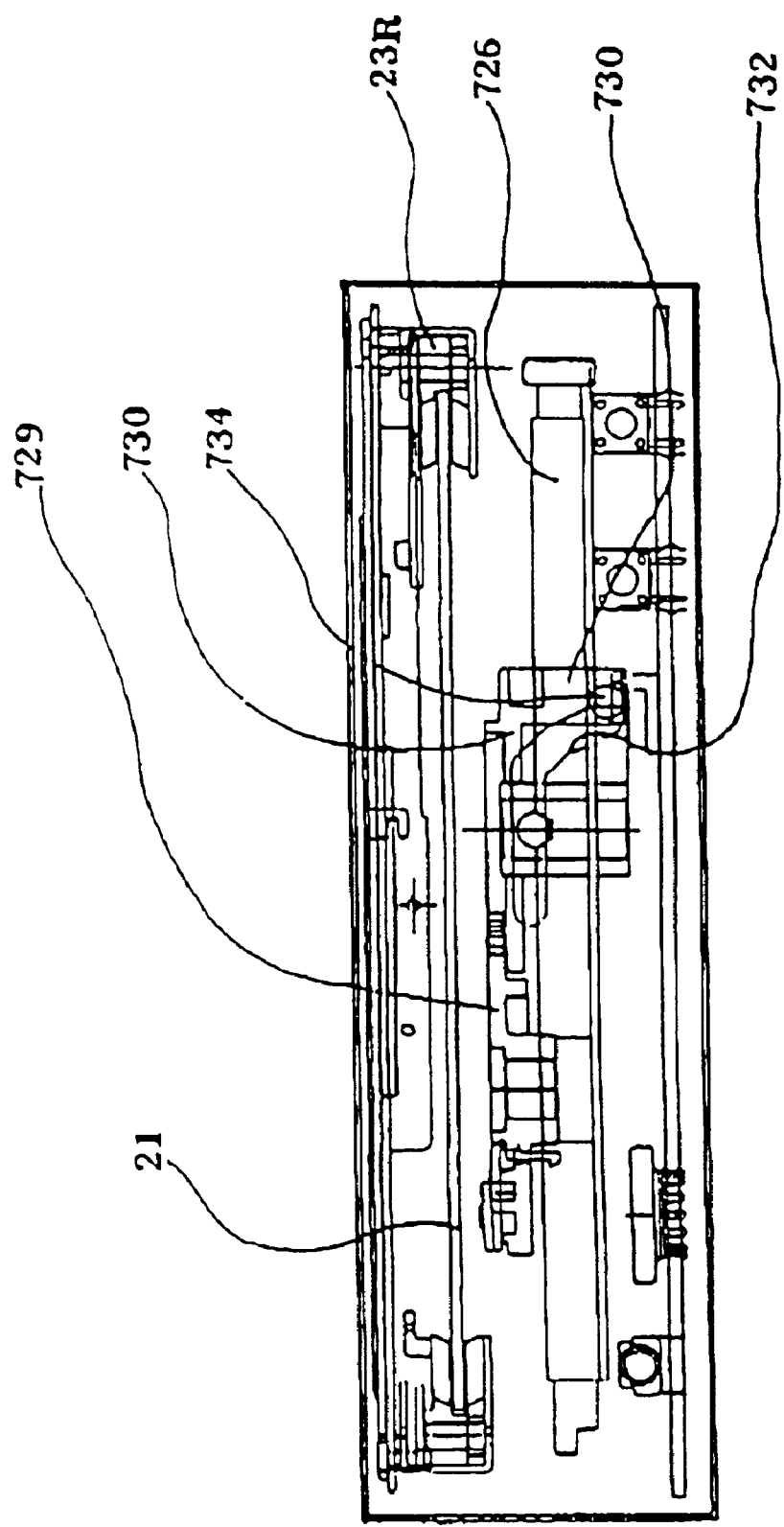

The pick-up base driving member comprises the driven gear 730 to be rotating in the reverse direction of the rotation direction of the timing gear 729, which is engaged with the timing gear 729 and connects the pick-base to the timing gear 729 and the connecting unit for connecting the pick-up base 26 and driven gear 30, as shown in FIGS. 53 and 57.

In the pick-up base connecting unit, the elevator rail 732, is formed on the stair of the driven gear 730. At the central portion of the connecting unit, the ball 734 is mounted at the lower portion of the pick-up base 726 and connected to the rail 732. In other hand, the hinge is mounted in the main base mold at the left and right sides rear the connecting unit, the damper 737 is inserted into the groove at the left and right sides in the front of the connecting unit to connect the connecting unit to the pick-up base 726.

In the present invention, as shown in FIG. 51, the rotor 35 is rotated around the gear shaft of the driving unit in appropriate timing for the loading and ejecting mode. For the disc loading, the rotation of the rotor 37 in the certain direction is transmitted to the timing connecting rod 725 and the timing connecting road 725 is turned around hinged shaft 735. The dynamic movement of the timing connecting rod 725 makes the rotation of the timing gear 729 around the hinge shaft 735 and subsequently the driven gear 730 engaged with the timing gear 729 is also rotated.

Figure 54C:
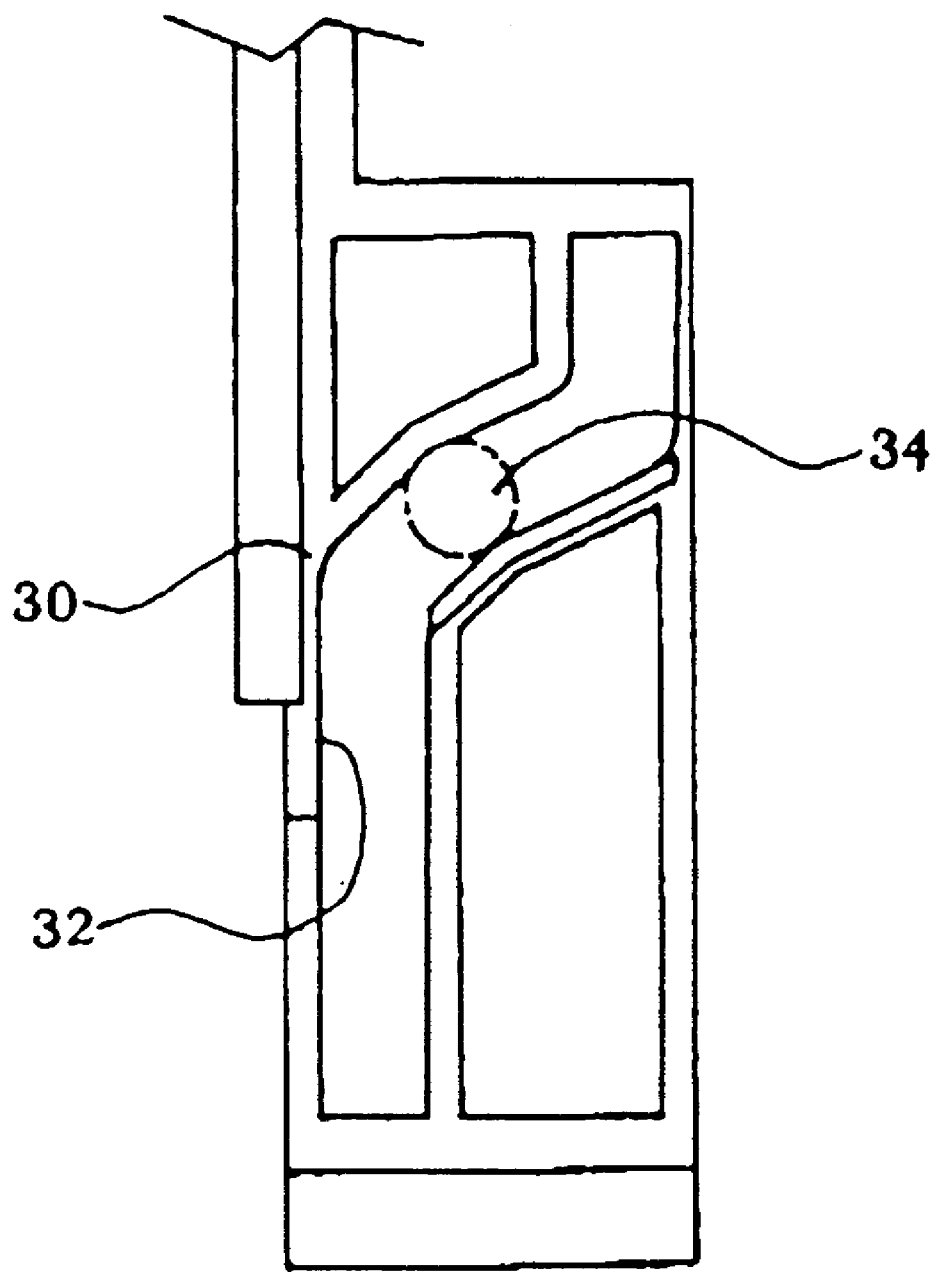
FIG. 54C is a sectional view taken along the line B—B.

The elevator rail 732 is mounted in the driven gear 730, so that the joint 733 of the pick-up base 736 is fixed to the elevator rail 732. By the fixation, the ball 734 at the front of the joint 733 is moving along the elevator rail 732 to the upper portion, as shown in FIG. 54, so that the pick-up base 726 is moving up and the disc 21 is chucked to the turntable 736. At that time, the damper 737 is adhered to the member within the housing 1 to absorb the vibration of the pick-up base 726 or the impact.

In the unloading mode, the rotor 35 is rotating in the reverse direction of the loading direction to pull the connecting rod 725. As a result, the timing gear 729 and the driven gear 730 are turned, so that the ball 734 of the pick-up base 726 is moving down in the reverse direction of the loading direction along the elevator rail 732 to move down the total pick-up base 726 and release the clamping.

In the present apparatus, the loading steps are described in the four steps for easy description. That is, the first step (initial step) is the inserting step of the disc to the first and second carriers 26L,26R, the second step (intermediate step) is the conveying step of the disc by the carriers 26L,26R, the third step (finish waiting step) is the waiting step that the disc 21 is reached to the clamp assembly and centering, the fifth step (finish step) is the clamping step that the disc is chucked to the turntable by the raise of the pick-up base 726.

Figure 55B:
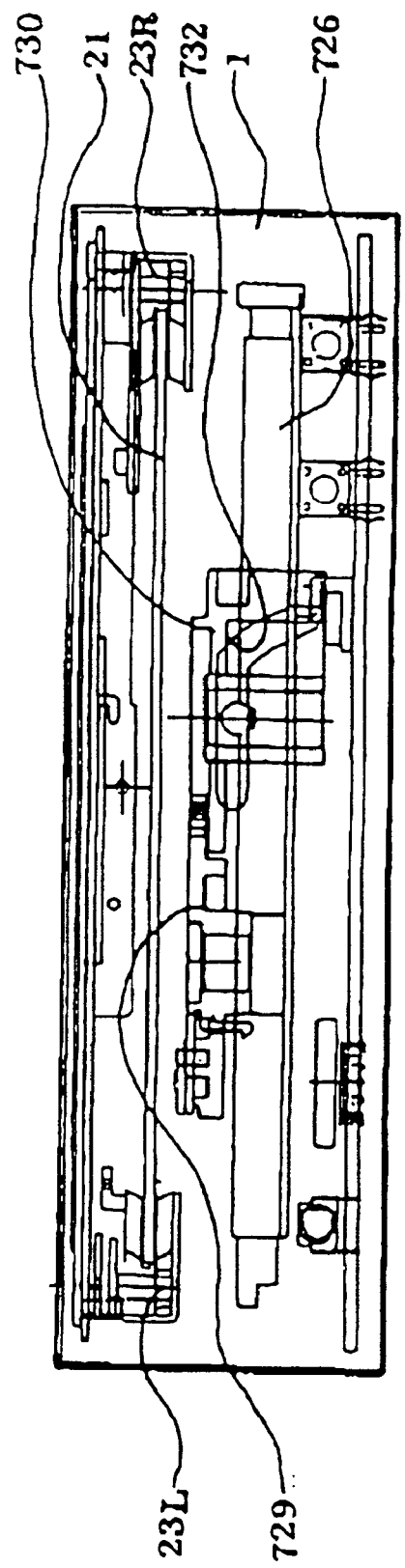
Figure 56A:
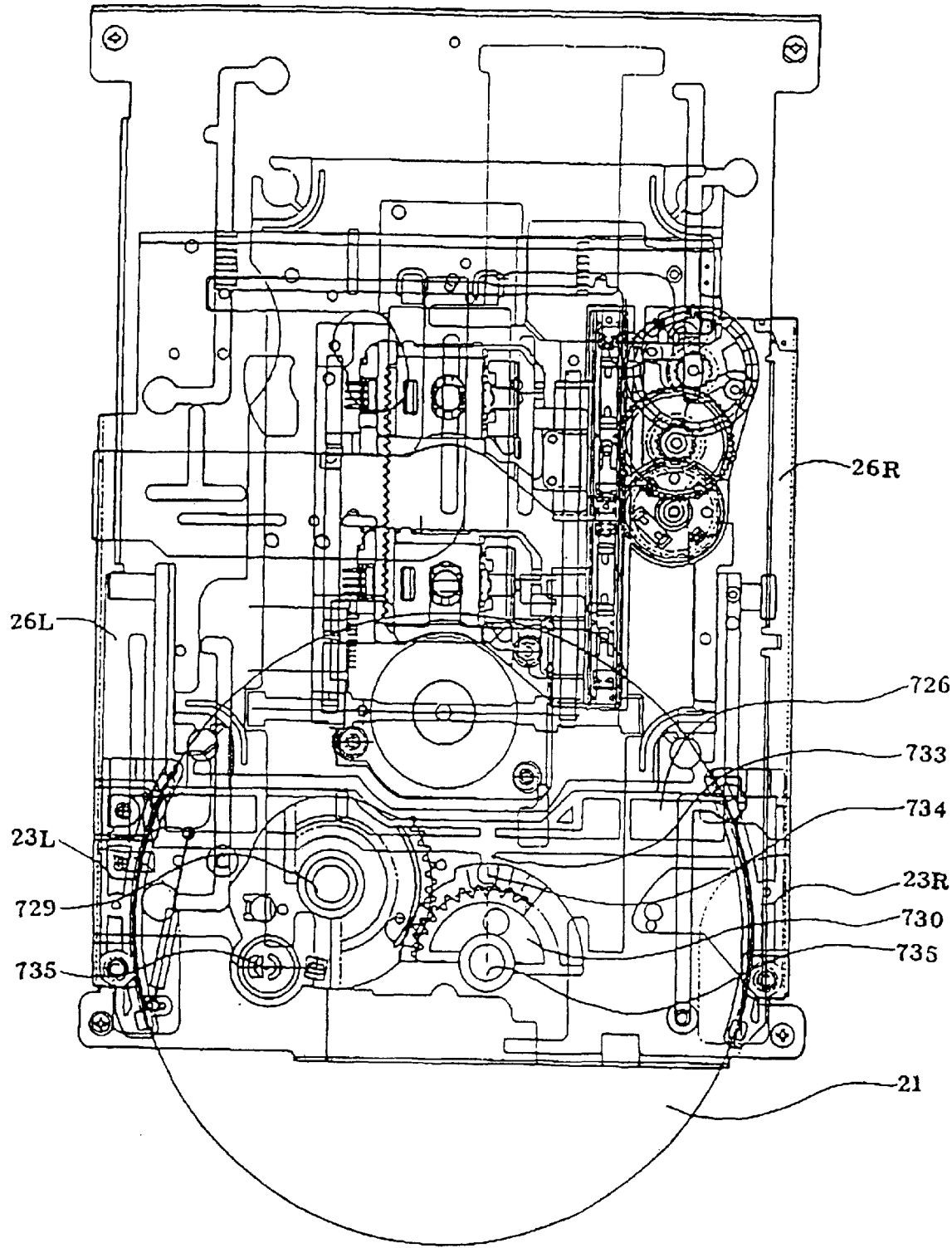

FIGS. 55 and 56 are views showing the first step. As shown in figures, the ball joint 733 and the ball 734 of the pick-up base 726 is positioned in the lower portion of the elevator rail 732. The pick-up base 726 is slanted and the turntable is separated from the clamp assembly 738, as shown in FIG. 56C.

In the third step, as shown in FIG. 57, disc is centering to the clamp assembly 38 and the ball joint 733 is positioned at the lower portion of the elevator rail 732. Further, the turntable 736 is separated from the disc 21, as shown in FIG. 57C.

Figure 58A:
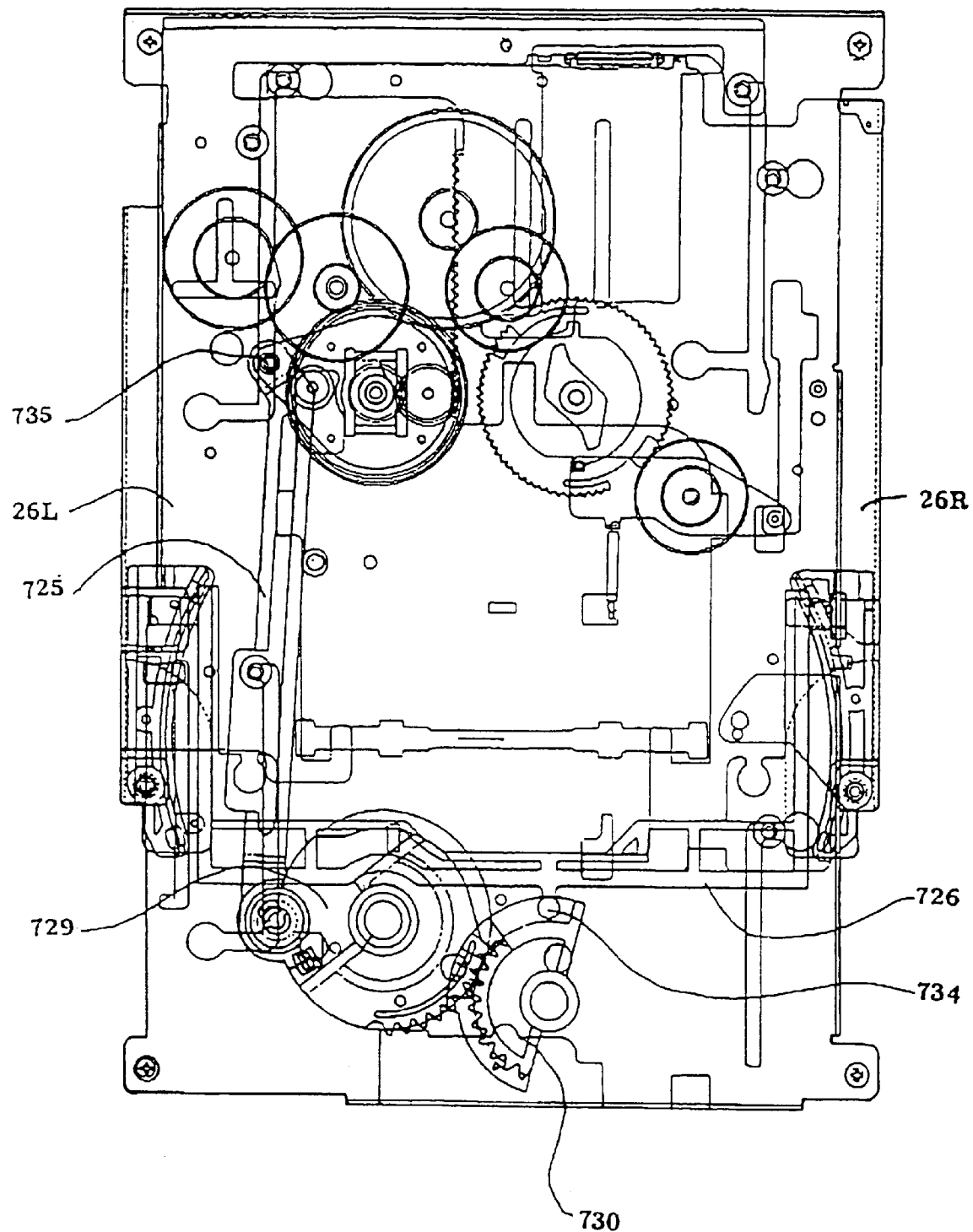
FIGS. 58A, 58B, and 58C are a plan view, a front view, and a side view showing the finish state of the disc loading.
Figure 58B:
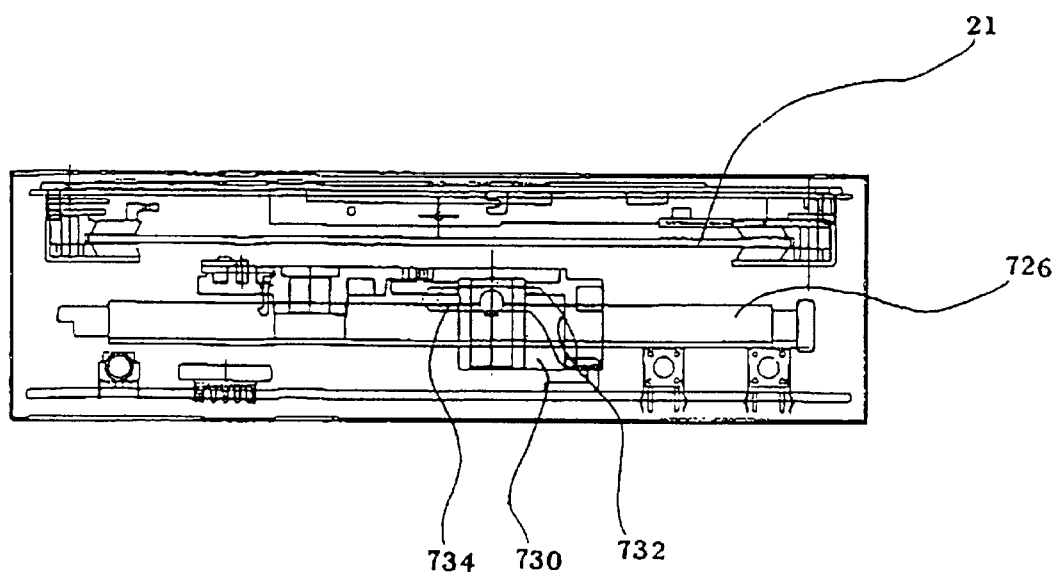
Figure 58C:
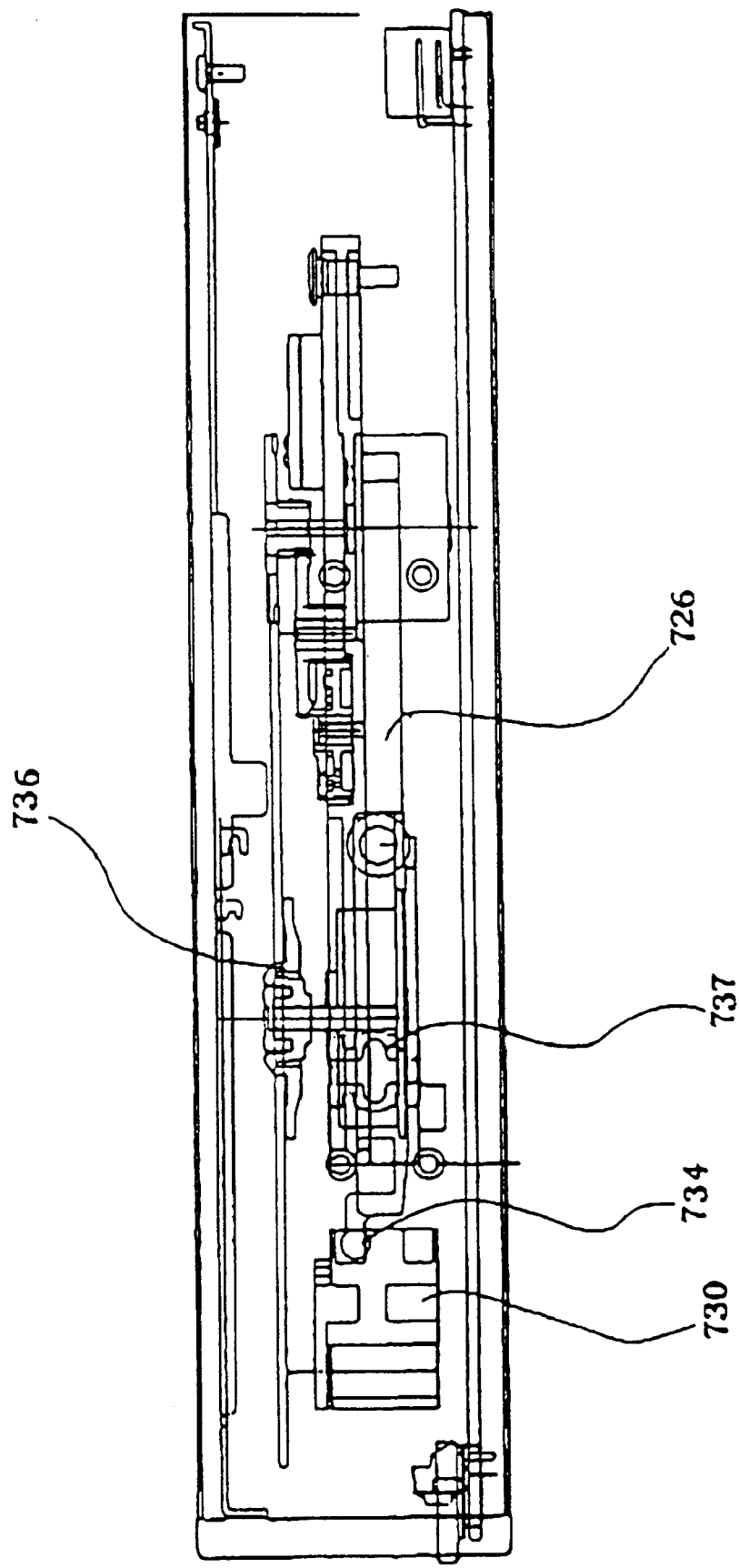

In the fifth step, as shown in FIG. 58, the first and second carriers 26L,26R are split and the rotor 35 is rotating, so that the timing connecting rod 725 is drawn in the longitudinal direction to couple the timing gear 729 and the driven gear 730. As shown in FIG. 58B, the pick-up base 726 is guided in elevator rail 732 through the ball joint 733 and moving up, so that the disc is chucked to the turntable 736.

Figure 59A:
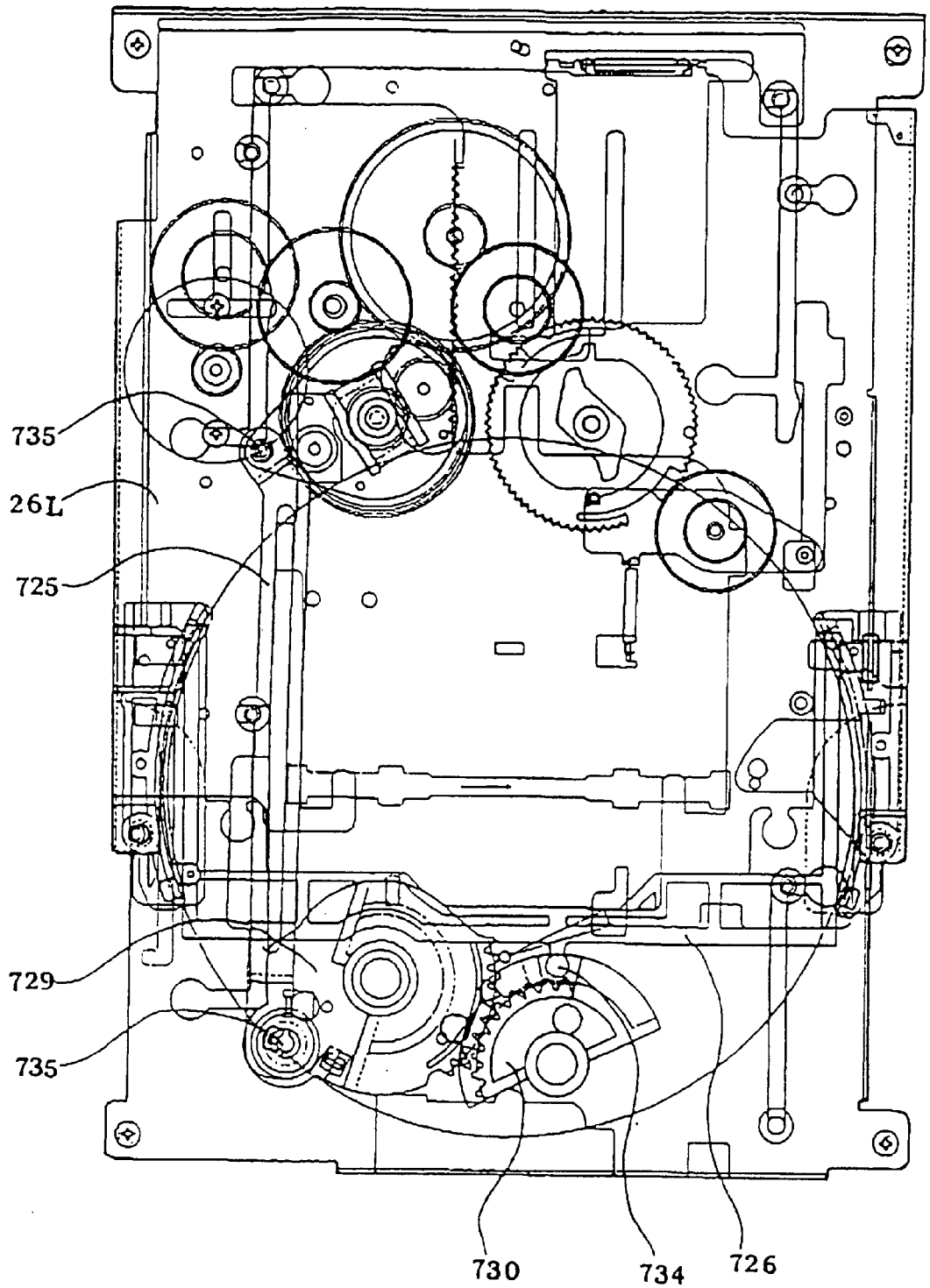
FIGS. 59A, 59B, and 59C are a plan view, a front view, and a side view showing the initial state of the disc ejection.
Figure 59B:
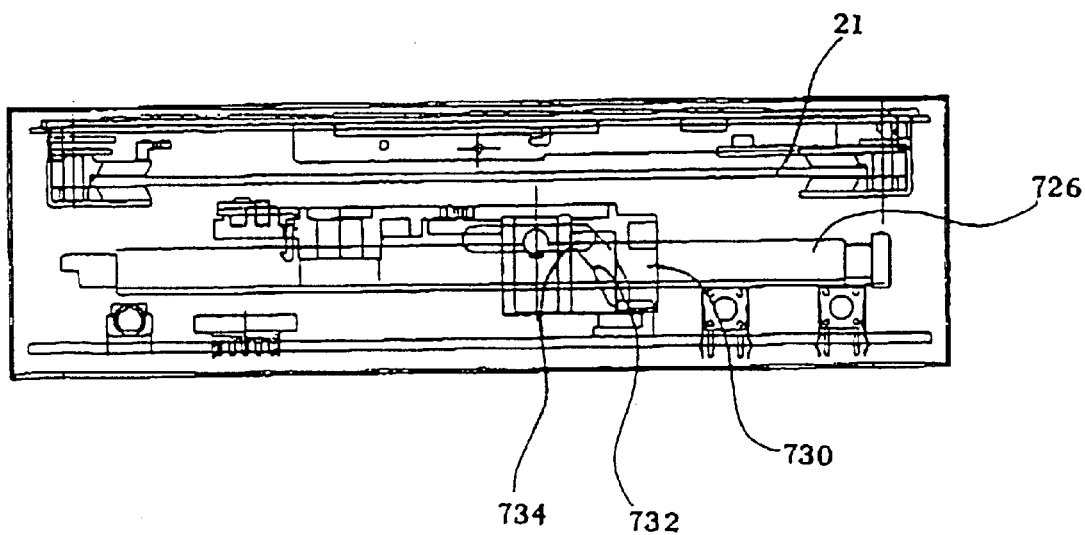
Figure 59C:
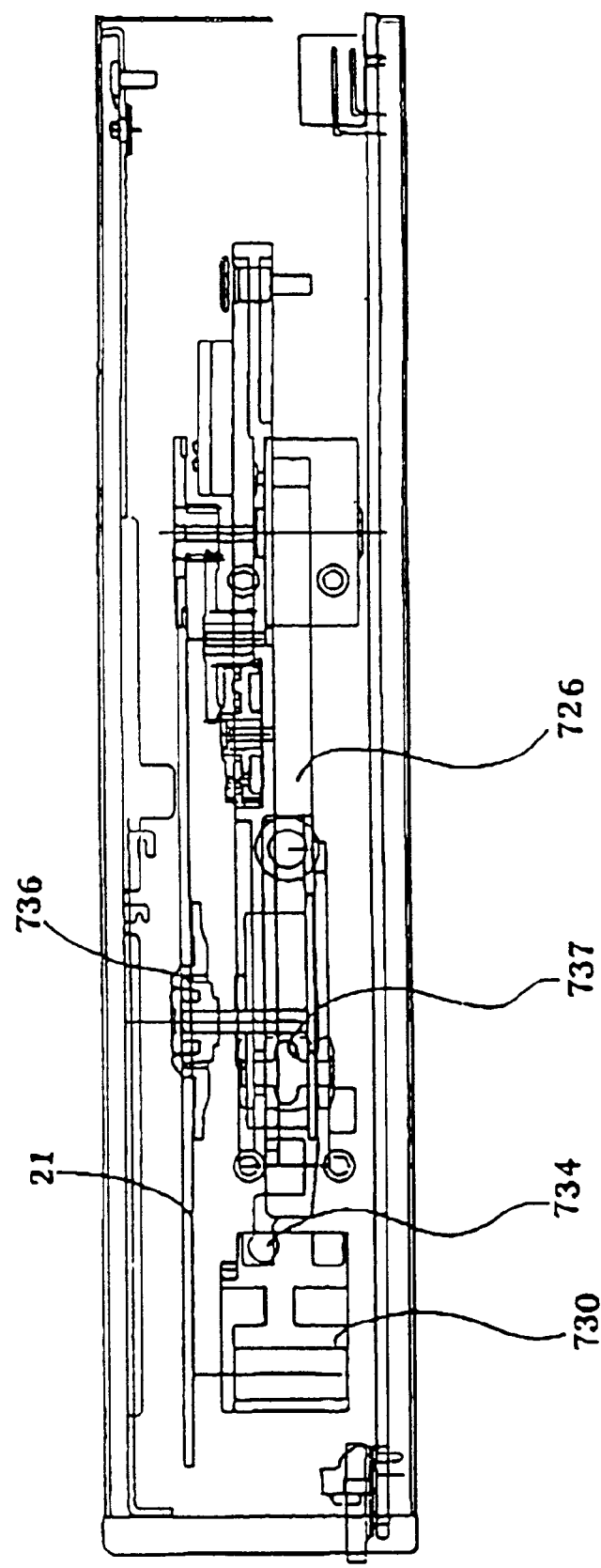

FIG. 59 indicates the initial step of the unloading. In the unloading mode, the rotor 35 is rotating in the reverse direction of the loading direction, so that restore the connecting rod 725 in approximate line and the variation is transmitted to the timing gear 729, as shown in FIG. 59A. The timing gear is turned to operate the driven gear 730 to slowly move the ball joint 733 to the outer direction, as shown in FIG. 59B. At that time, as shown in FIG. 59C, the pick-up base is not released from the clamp assembly in case where the ball joint 733 is positioned in the upper portion of the elevator rail 732. That means the waiting state.

Figure 60A:
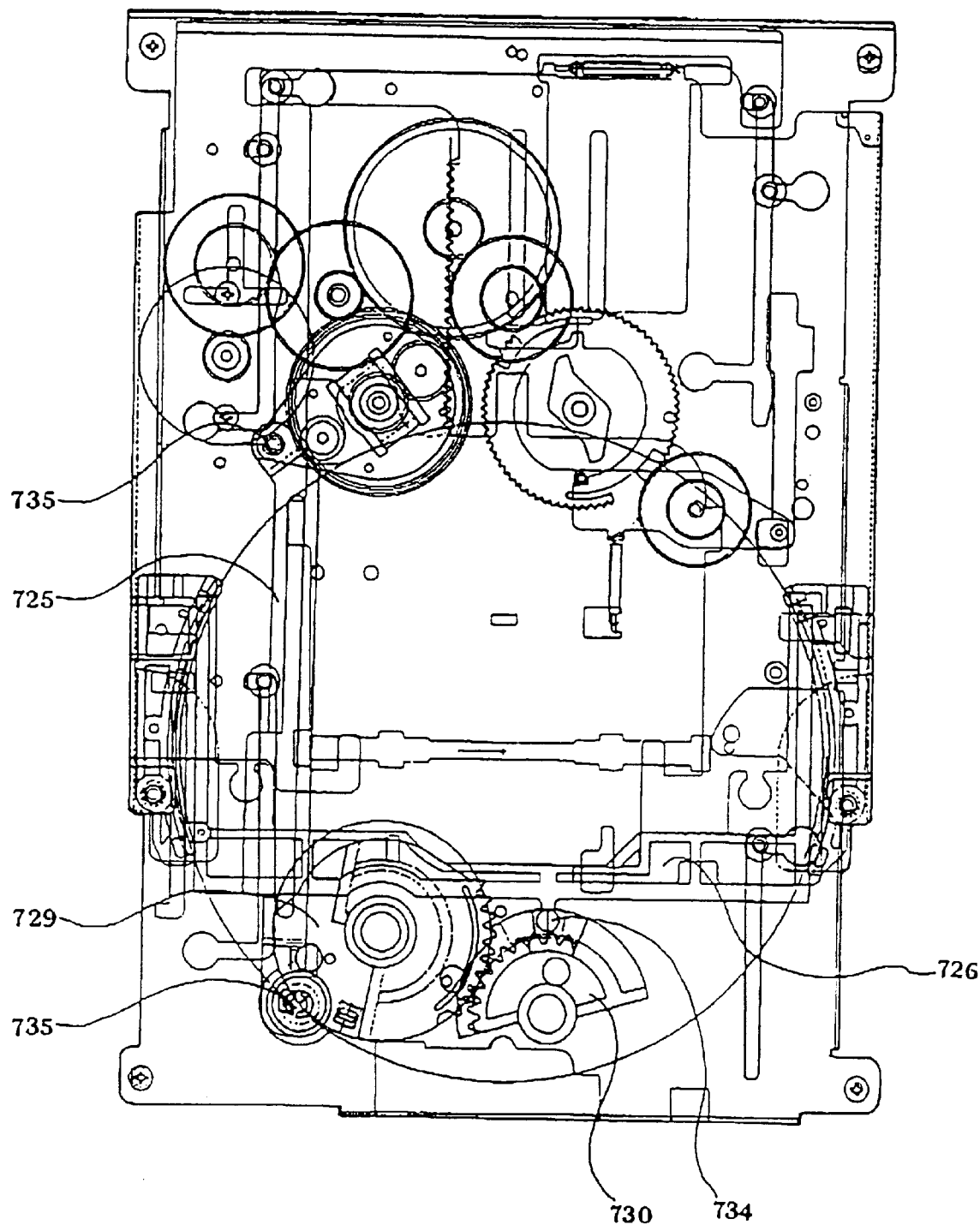
FIGS. 60A, 60B, and 60C are a plan view, a front view, and a side view showing the finish state of the disc ejection.
Figure 60B:
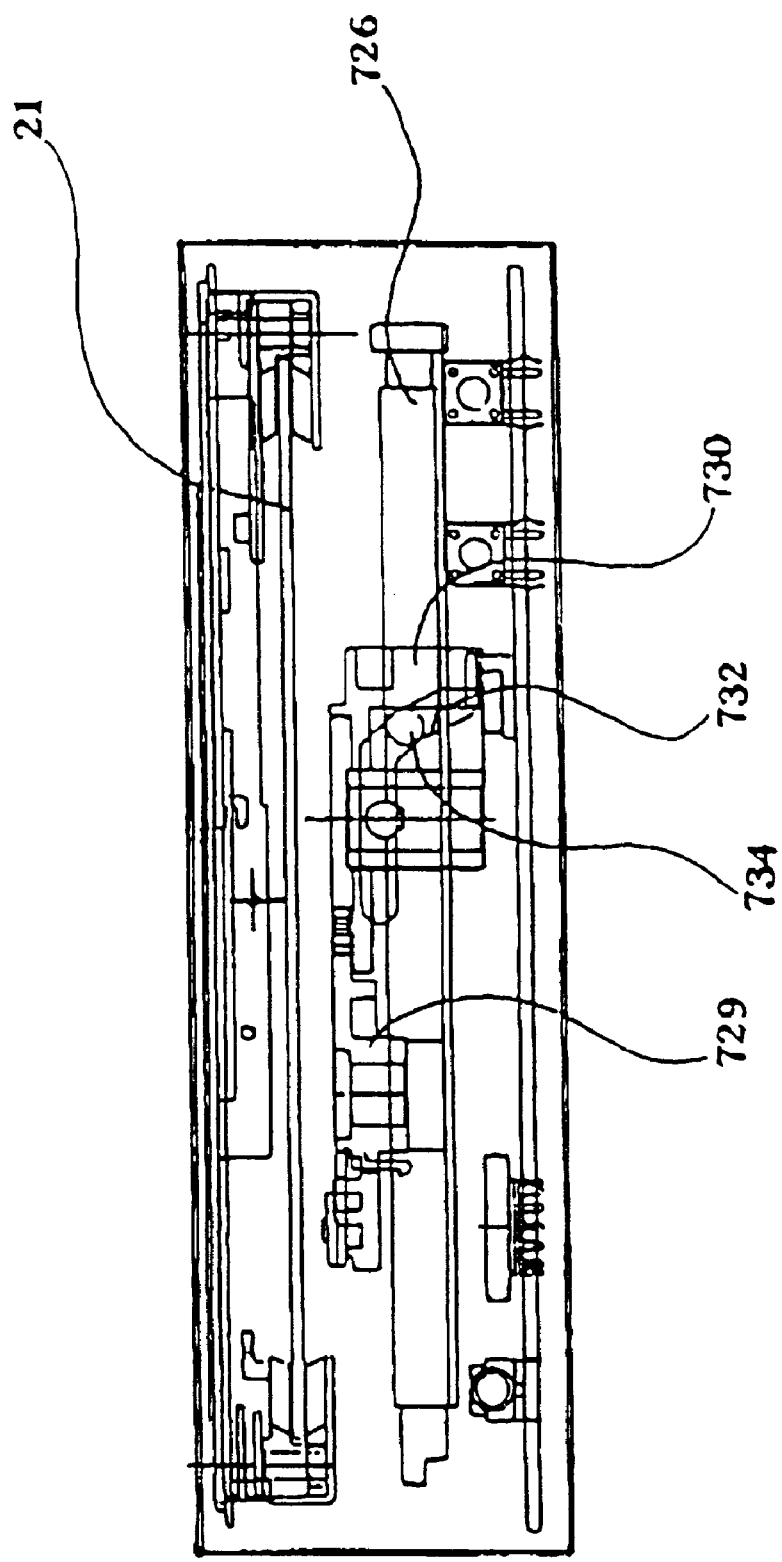
Figure 60C:
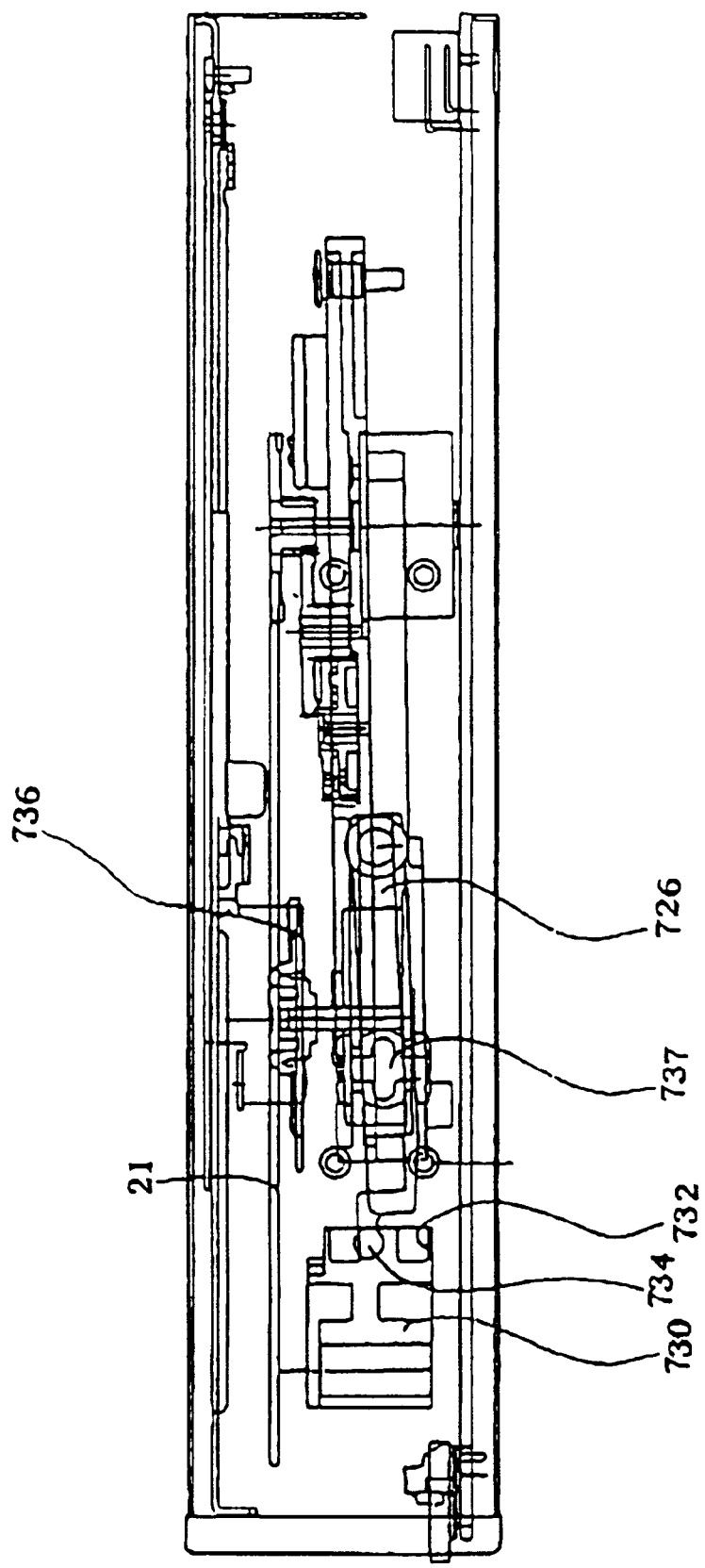

FIG. 60 is a view showing the clamping released state. When the rotor 35 pushes the connecting rod 725, as shown in FIG. 60A, the timing gear 729 is more rotating to rotate the driven gear so much, so that the ball joint 733 is sliding in the lower portion along the slant groove of the elevator rail 732. As a result, the pick-up base is separated from the disc 21 and the clamping is released.

Therefore, the pick-up base is correctly operated according to the driving timing for disc loading and ejecting.

While the described embodiment represents the preferred form of the present invention, it is to be understood that modifications will occur to those skilled in that art without departing from the spirit of the invention. The scope of the invention is therefore to be determined solely by the appended claim.

What is claimed is:

1. An apparatus for loading a disc, comprising:
    a disc holding member including
        disc holding grooves for holding the disc to guide the disc along a base plate and
        a disc detecting member for detecting the disc;
    a loading plate for transporting the disc held by the disc holding member in a plane;
    a driving member for driving the loading plate along said base plate; and
    an ejecting member having an eject lever engaged with a cam gear for ejecting the disc, the cam gear being intermittently engaged with a gear of the driving member for transporting power from the driving member to the eject lever, wherein the ejecting member and the driving member are operatively connected.

2. The apparatus according to claim 1, wherein an inner curvature portion is formed on the disc holding grooves.

3. The apparatus according to claim 1, wherein the loading plate includes:
    a first carrier for carrying the disc chucked into the disc holding grooves to a predetermined position along the base plate; and
    a second carrier having a rack gear engaged with the driving member and connected to the first carrier.

4. The apparatus according to claim 3, wherein the loading plate includes means for guiding the first and second carriers to connect the first carrier into the second carrier.

5. The apparatus according to claim 3, wherein the driving member comprises:
    a loading motor; and
    a stay gear contacted with the second carrier according to a position variation of the second carrier, power from the loading motor being applied to the stay gear.

6. The apparatus according to claim 5, wherein the stay gear comprises:
    a center gear on the stay gear for transporting power to the stay gear; and
    a roller contacted with the first carrier.

7. The apparatus according to claim 6, wherein the stay gear is guided in the base plate and is supported elastically by a rotor receiving a position variation of the first carrier through the roller.

* * * * *